(12) United States Patent
Thurman et al.

(10) Patent No.: US 9,731,179 B2
(45) Date of Patent: Aug. 15, 2017

(54) BAT CUSTOMIZATION SYSTEM

(71) Applicant: WILSON SPORTING GOODS CO., Chicago, IL (US)

(72) Inventors: Robert T. Thurman, Plainfield, IL (US); Ty B. Goodwin, Vancouver, WA (US); Joshua S. Stenzler, Portland, OR (US); Mark A. Fritzke, Portland, OR (US); Bradley L. Gaff, Woodridge, IL (US); Jeffrey A. Flood, Sandy, OR (US); Sean S. Epling, Portland, OR (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 14/447,584

(22) Filed: Jul. 30, 2014

(65) Prior Publication Data

US 2014/0342853 A1  Nov. 20, 2014

Related U.S. Application Data

(63) Continuation-in-part of application No. 14/041,707, filed on Sep. 30, 2013.

(Continued)

(51) Int. Cl.

| A63B 59/06 | (2006.01) |
|---|---|
| A63B 59/00 | (2015.01) |
| G06Q 30/06 | (2012.01) |
| A63B 60/54 | (2015.01) |
| A63B 60/42 | (2015.01) |
| A63B 59/50 | (2015.01) |
| A63B 59/54 | (2015.01) |

(Continued)

(52) U.S. Cl.
CPC .......... *A63B 59/0074* (2013.01); *A63B 59/50* (2015.10); *A63B 60/42* (2015.10); *A63B 60/54* (2015.10); *G06Q 30/0621* (2013.01); *A63B 59/54* (2015.10); *A63B 60/04* (2015.10); *A63B 60/16* (2015.10); *A63B 60/52* (2015.10); *A63B 71/0045* (2013.01); *A63B 2102/18* (2015.10); *A63B 2209/00* (2013.01); *A63B 2210/50* (2013.01); *A63B 2220/833* (2013.01); *A63B 2225/09* (2013.01); *A63B 2225/50* (2013.01)

(58) Field of Classification Search
CPC . A63B 59/06; A63B 59/0033; A63B 2102/18; A63B 2102/182; A63B 59/50–59/58; A63B 2059/581; A63B 60/16
USPC .......................... 473/457, 519, 520, 564–568
See application file for complete search history.

(56) References Cited

U.S. PATENT DOCUMENTS

| 1,026,990 A | 5/1912 | Matson |
| 1,499,128 A * | 6/1924 | Shroyer, Jr. .................... 473/519 |

(Continued)

FOREIGN PATENT DOCUMENTS

WO  9535135  12/1995

*Primary Examiner* — Mark Graham
(74) *Attorney, Agent, or Firm* — Terence P. O'Brien; Todd A. Rathe

(57) ABSTRACT

An apparatus for engagement with a barrel of a bat includes a cup and at least one cover. The cup is secured for securement to a distal end of the barrel of the bat. The cup defines a cavity and includes a first connector portion. The at least one cover has a second connector portion cooperating with the first connector portion to releasably secure the cover to the cup over the cavity.

19 Claims, 44 Drawing Sheets

Related U.S. Application Data

(60) Provisional application No. 61/756,089, filed on Jan. 24, 2013, provisional application No. 61/860,532, filed on Jul. 31, 2013.

(51) Int. Cl.
- *A63B 71/00* (2006.01)
- *A63B 60/52* (2015.01)
- *A63B 60/16* (2015.01)
- *A63B 102/18* (2015.01)
- *A63B 60/04* (2015.01)

(56) References Cited

U.S. PATENT DOCUMENTS

| | | | |
|---|---|---|---|
| 1,665,195 A * | 4/1928 | Cohn | 473/520 |
| 3,116,926 A * | 1/1964 | Owen et al. | 473/457 |
| 3,380,305 A * | 4/1968 | Charell | 73/379.04 |
| 3,811,596 A * | 5/1974 | Wilson | 220/315 |
| 3,876,204 A | 4/1975 | Moore et al. | |
| 3,897,058 A | 7/1975 | Koch | |
| 3,963,239 A | 6/1976 | Fujii | |
| 4,090,709 A | 5/1978 | Fujii | |
| 4,759,219 A * | 7/1988 | Cobb et al. | 73/493 |
| 4,819,941 A * | 4/1989 | Tanaka | 473/234 |
| 4,834,376 A | 5/1989 | Steinberg | |
| 4,951,948 A | 8/1990 | Peng | |
| 5,114,144 A | 5/1992 | Baum | |
| 5,219,164 A | 6/1993 | Peng | |
| 5,277,421 A * | 1/1994 | Rewolinski | 473/457 |
| 5,303,917 A | 4/1994 | Uke | |
| 5,380,003 A | 1/1995 | Lanctot | |
| 5,456,461 A | 10/1995 | Sullivan | |
| 5,624,114 A | 4/1997 | Kelsey | |
| 5,674,138 A | 10/1997 | Nolan | |
| 5,711,726 A | 1/1998 | Powers | |
| 5,954,602 A * | 9/1999 | Eggiman et al. | 473/566 |
| 6,173,610 B1 | 1/2001 | Pace | |
| 6,280,353 B1 * | 8/2001 | Brundage | 473/457 |
| 6,402,634 B2 | 6/2002 | Lee et al. | |
| 6,443,860 B1 | 9/2002 | Byrne et al. | |
| 6,485,382 B1 | 11/2002 | Chen | |
| 6,511,392 B1 | 1/2003 | Chohan | |
| 6,530,852 B2 | 3/2003 | Rios | |
| 6,547,673 B2 | 4/2003 | Roark | |
| 6,569,042 B2 | 5/2003 | LaChance et al. | |
| 6,682,447 B1 | 1/2004 | Black | |
| 6,692,386 B2 | 2/2004 | Brundage | |
| 6,830,520 B1 * | 12/2004 | Bollar | 473/457 |
| 6,869,373 B1 | 3/2005 | Byrne et al. | |
| 6,875,137 B2 | 4/2005 | Forsythe et al. | |
| 6,905,429 B2 | 6/2005 | Forsythe et al. | |
| 6,939,237 B1 | 9/2005 | Voden | |
| 6,969,330 B1 | 11/2005 | Meeker | |
| 7,014,580 B2 | 3/2006 | Forsythe et al. | |
| 7,140,248 B1 | 11/2006 | Brundage | |
| 7,140,988 B1 | 11/2006 | Hinman | |
| 7,198,581 B1 * | 4/2007 | Black | 473/454 |
| 7,232,387 B1 * | 6/2007 | Heald et al. | 473/566 |
| 7,311,620 B1 | 12/2007 | Heald et al. | |
| 7,381,141 B2 | 6/2008 | Van Nguyen | |
| 7,399,242 B1 | 7/2008 | Smith | |
| 7,704,159 B1 | 4/2010 | McDonald | |
| 7,798,926 B1 | 9/2010 | Hsu | |
| 7,909,705 B2 | 3/2011 | Gill et al. | |
| 7,914,404 B2 | 3/2011 | Giannetti et al. | |
| 7,993,219 B2 * | 8/2011 | Whitney et al. | 473/457 |
| 8,052,547 B2 | 11/2011 | Nusbaum et al. | |
| 8,083,620 B2 | 12/2011 | Sims et al. | |
| 8,241,156 B2 | 8/2012 | Sims et al. | |
| 8,282,516 B2 | 10/2012 | Chauvin et al. | |
| 8,317,640 B2 | 11/2012 | Cruz et al. | |
| 8,348,862 B2 | 1/2013 | Chu | |
| 8,425,353 B2 | 4/2013 | Jones et al. | |
| 8,827,846 B2 * | 9/2014 | Shocklee | 473/453 |
| 2002/0061796 A1 | 5/2002 | Rios | |
| 2002/0094888 A1 | 7/2002 | LaChance et al. | |
| 2004/0043846 A1 * | 3/2004 | Haynes | 473/564 |
| 2005/0059515 A1 | 3/2005 | Chang | |
| 2005/0143203 A1 | 6/2005 | Souders et al. | |
| 2005/0176531 A1 * | 8/2005 | Fitzgerald et al. | 473/564 |
| 2006/0229147 A1 | 10/2006 | Nusbaum et al. | |
| 2006/0252586 A1 | 11/2006 | Nguyen | |
| 2007/0173357 A1 | 7/2007 | Mauer et al. | |
| 2007/0191156 A1 | 8/2007 | Van Nguyen | |
| 2008/0058132 A1 * | 3/2008 | Nguyen | 473/564 |
| 2008/0064538 A1 | 3/2008 | McNamee et al. | |
| 2008/0070725 A1 | 3/2008 | Davis | |
| 2008/0085792 A1 | 4/2008 | Sims et al. | |
| 2008/0220914 A1 | 9/2008 | Shaw et al. | |
| 2008/0305895 A1 * | 12/2008 | Gant | 473/453 |
| 2009/0221388 A1 | 9/2009 | Giannetti et al. | |
| 2011/0077111 A1 * | 3/2011 | Chauvin et al. | 473/566 |
| 2011/0098141 A1 | 4/2011 | Burger | |
| 2011/0111892 A1 | 5/2011 | Thouin et al. | |
| 2011/0269581 A1 * | 11/2011 | Chen | 473/519 |
| 2011/0319204 A1 | 12/2011 | Chang | |
| 2012/0088612 A1 * | 4/2012 | Johnson | 473/422 |
| 2012/0270685 A1 * | 10/2012 | Lindsey et al. | 473/422 |
| 2013/0073248 A1 * | 3/2013 | Perkins et al. | 702/141 |
| 2013/0095941 A1 * | 4/2013 | Bentley et al. | 473/223 |
| 2013/0196795 A1 | 8/2013 | Shocklee | |
| 2015/0202510 A1 * | 7/2015 | Appleton et al. | 473/446 |

* cited by examiner

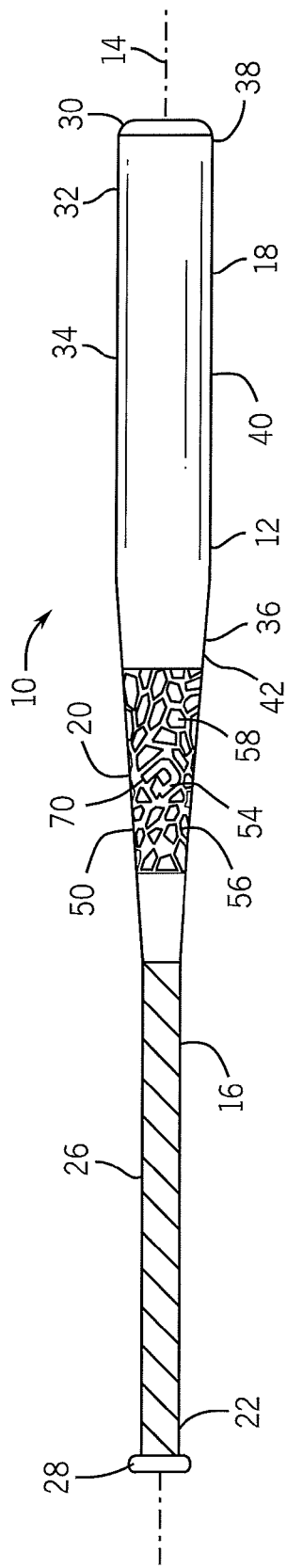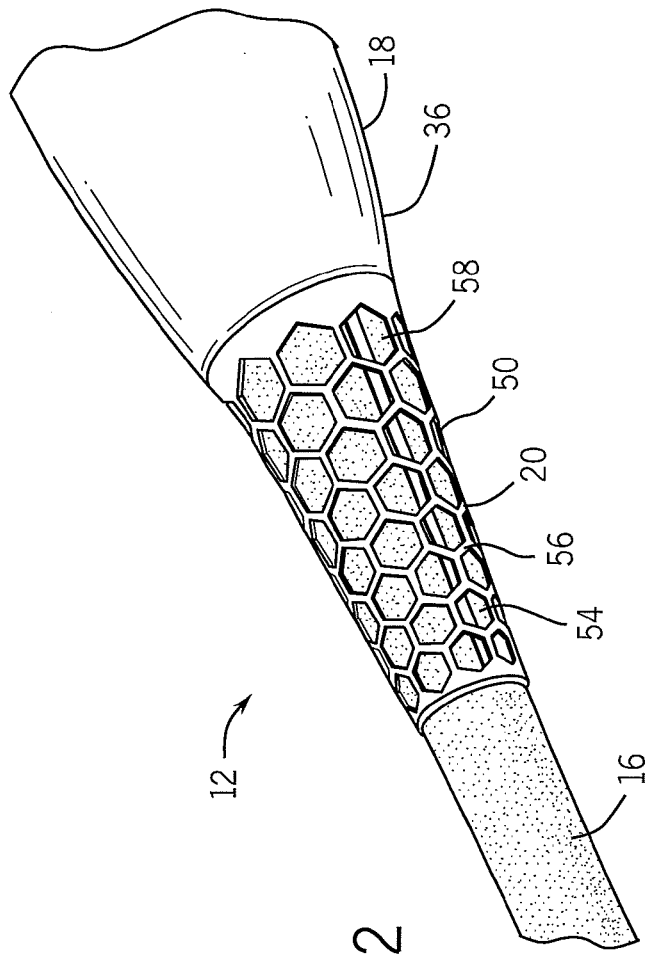
FIG. 1
FIG. 2

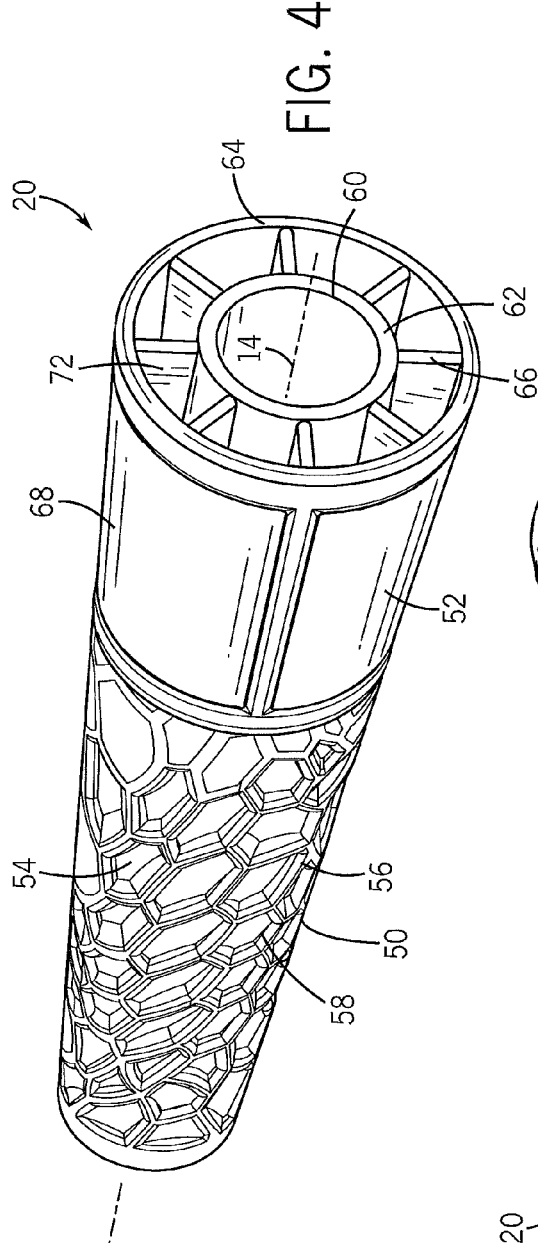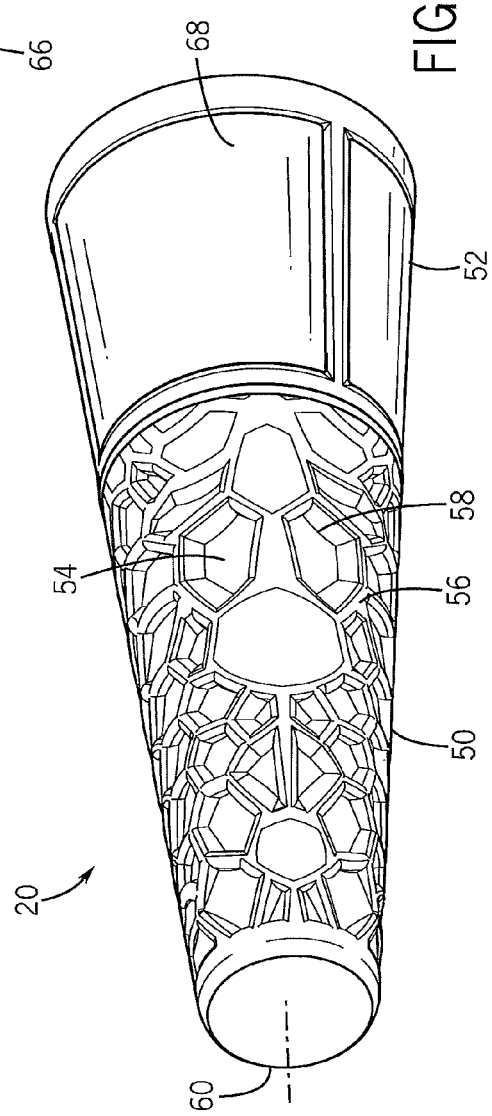

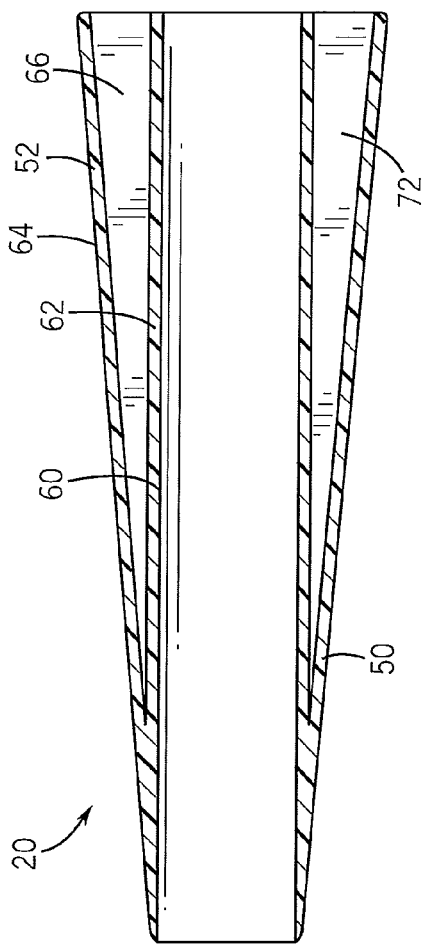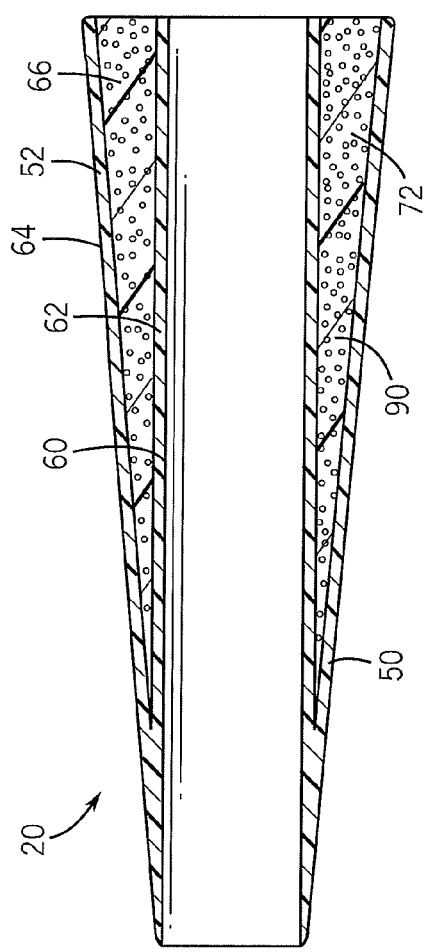

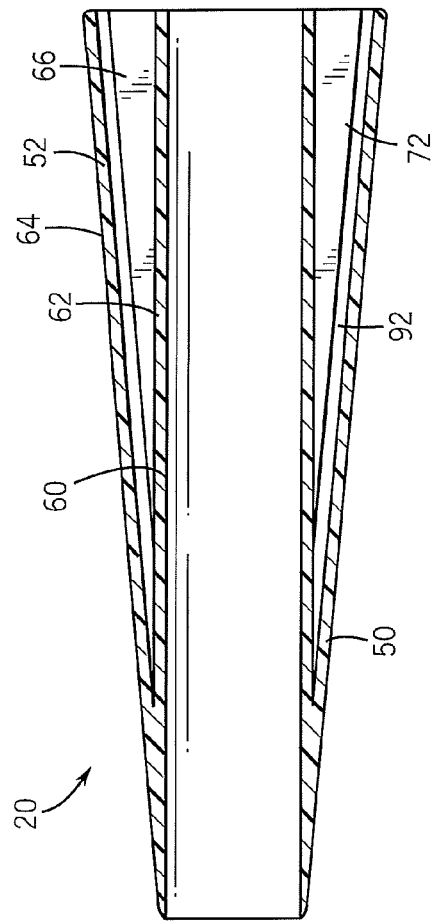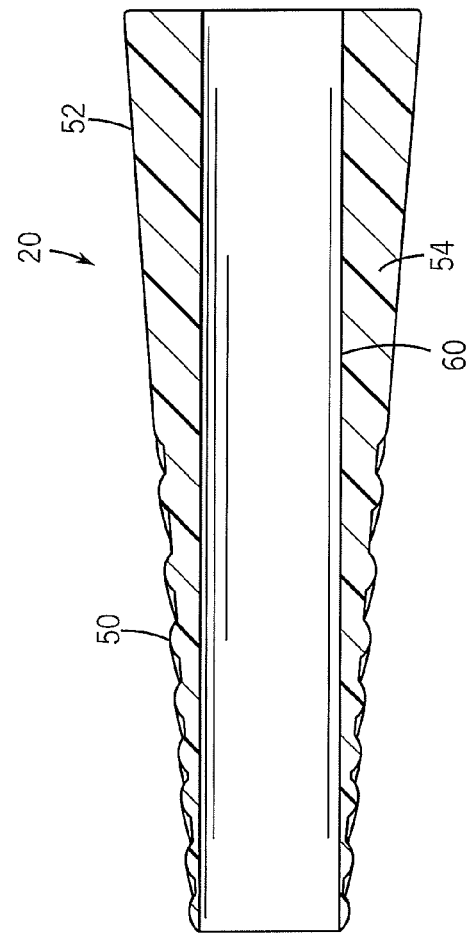

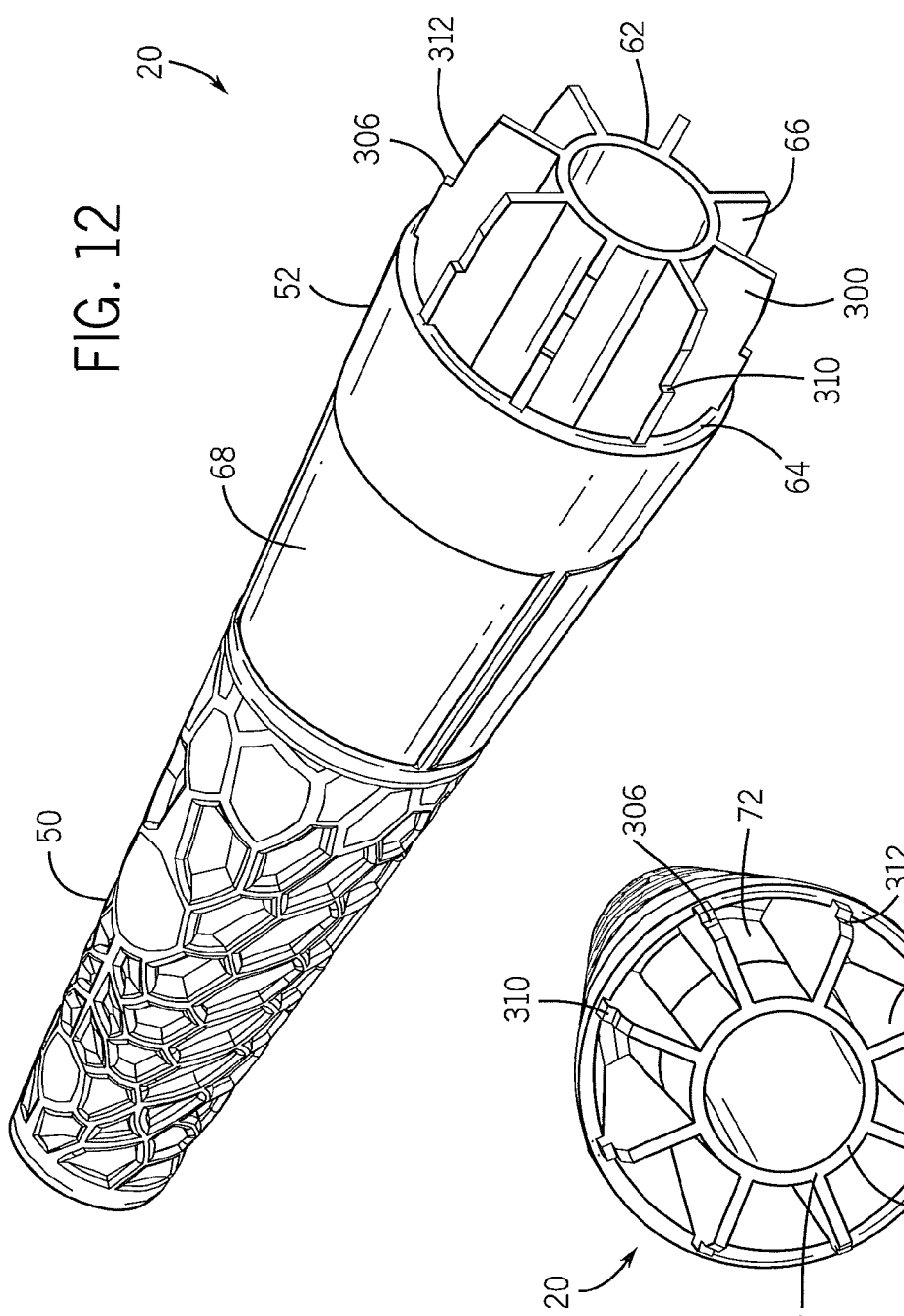
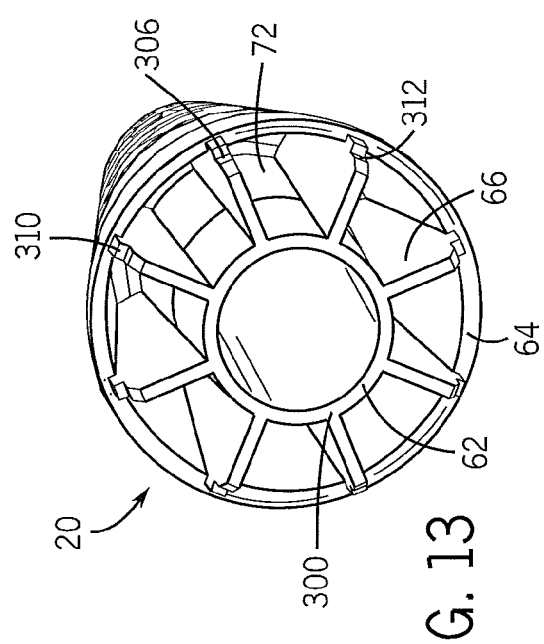

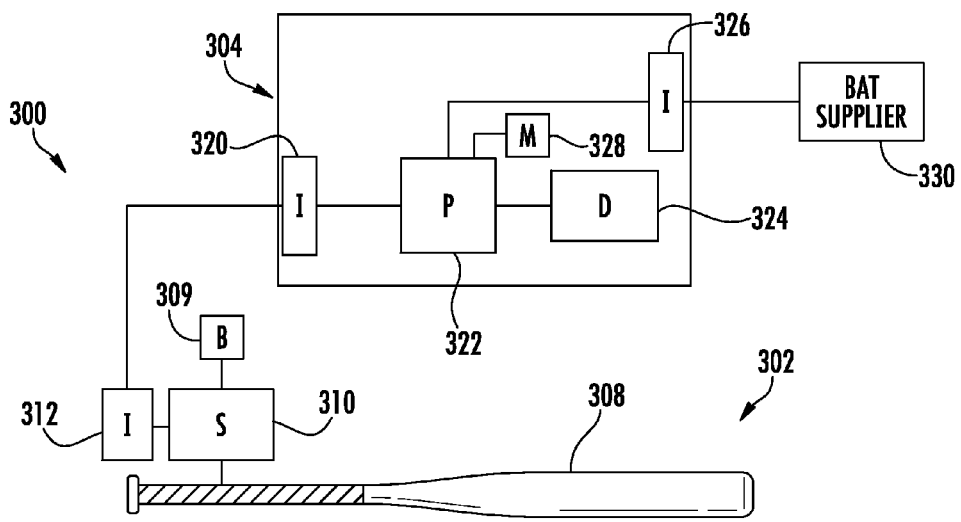
FIG. 26
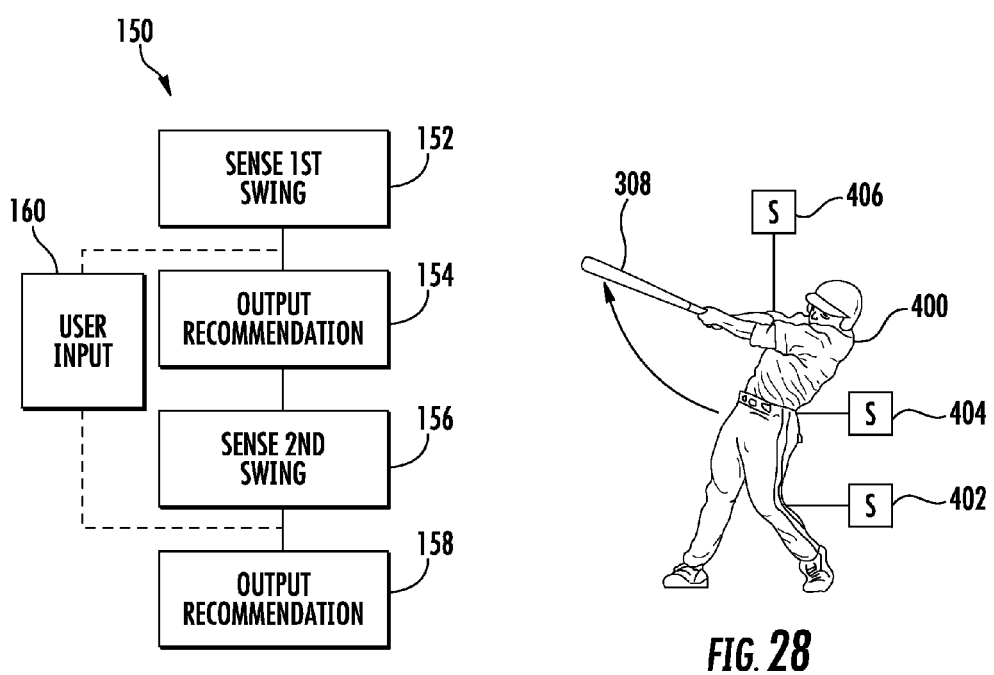
FIG. 27
FIG. 28

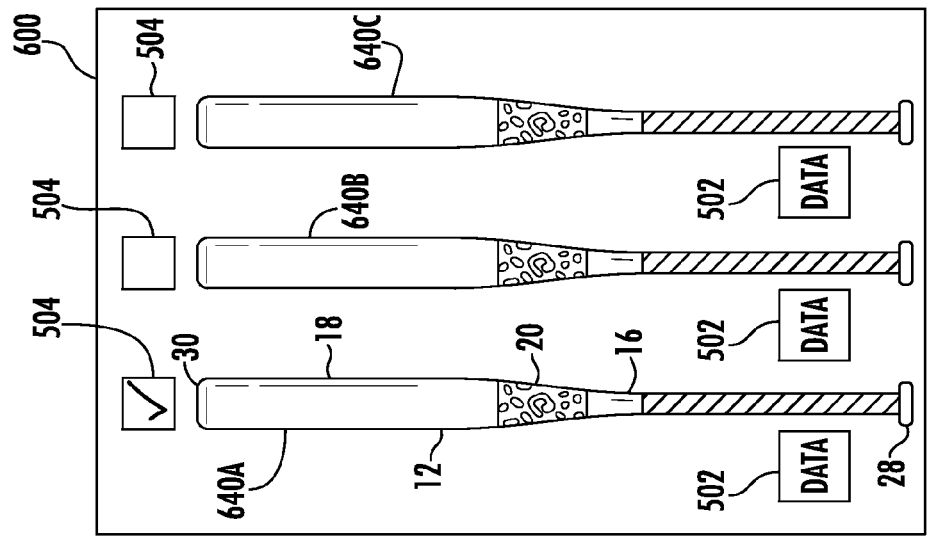
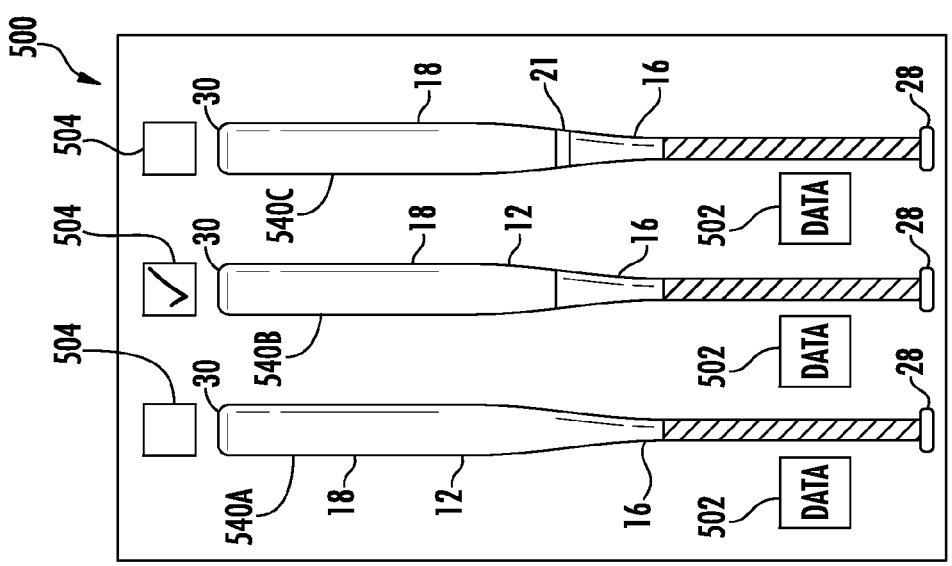

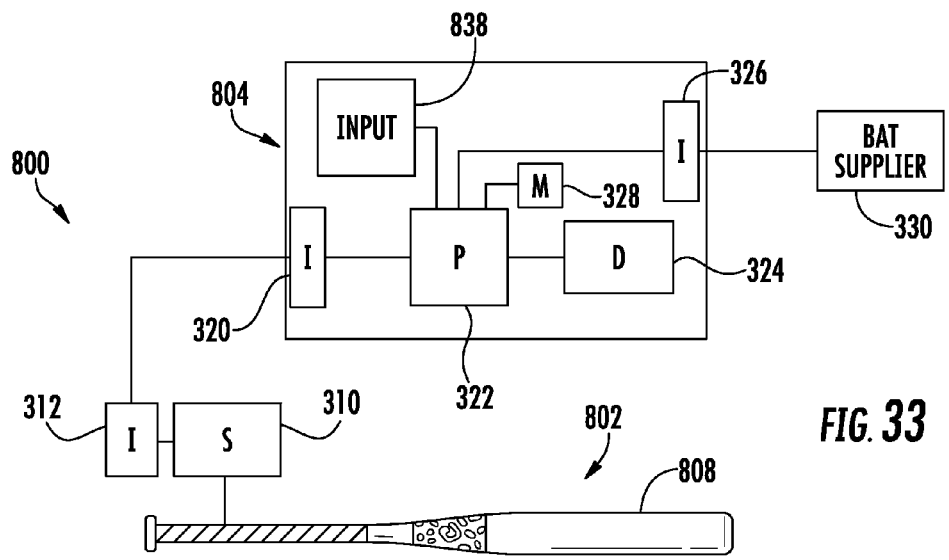
FIG. 33
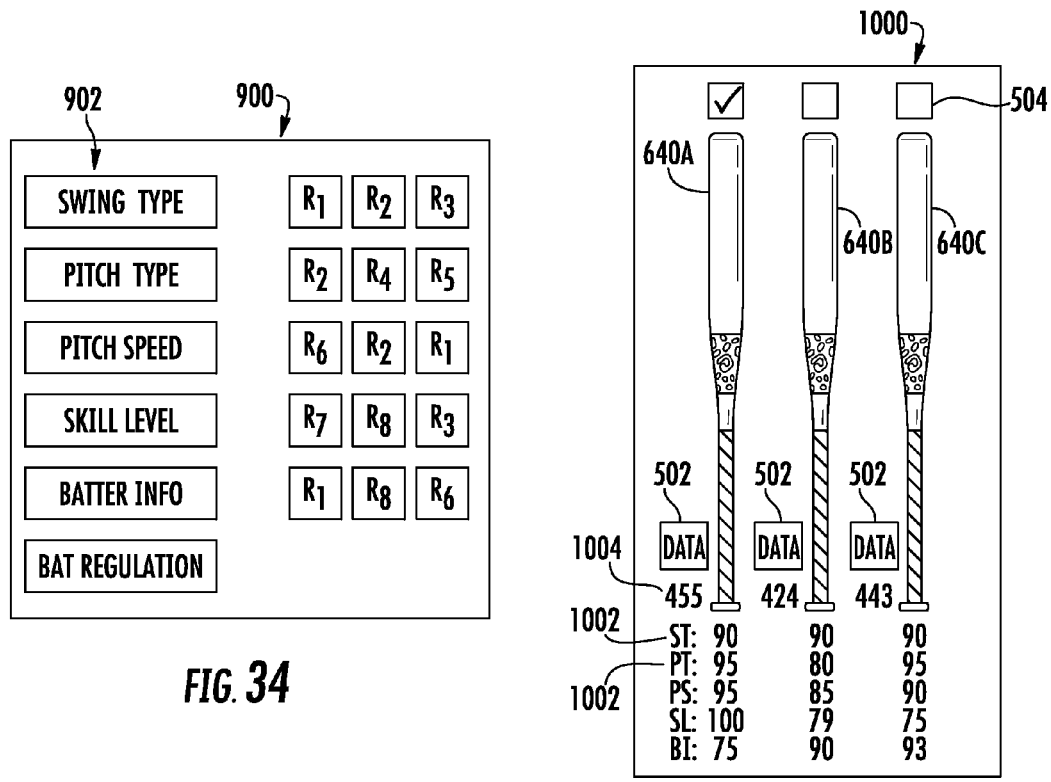
FIG. 34
FIG. 35

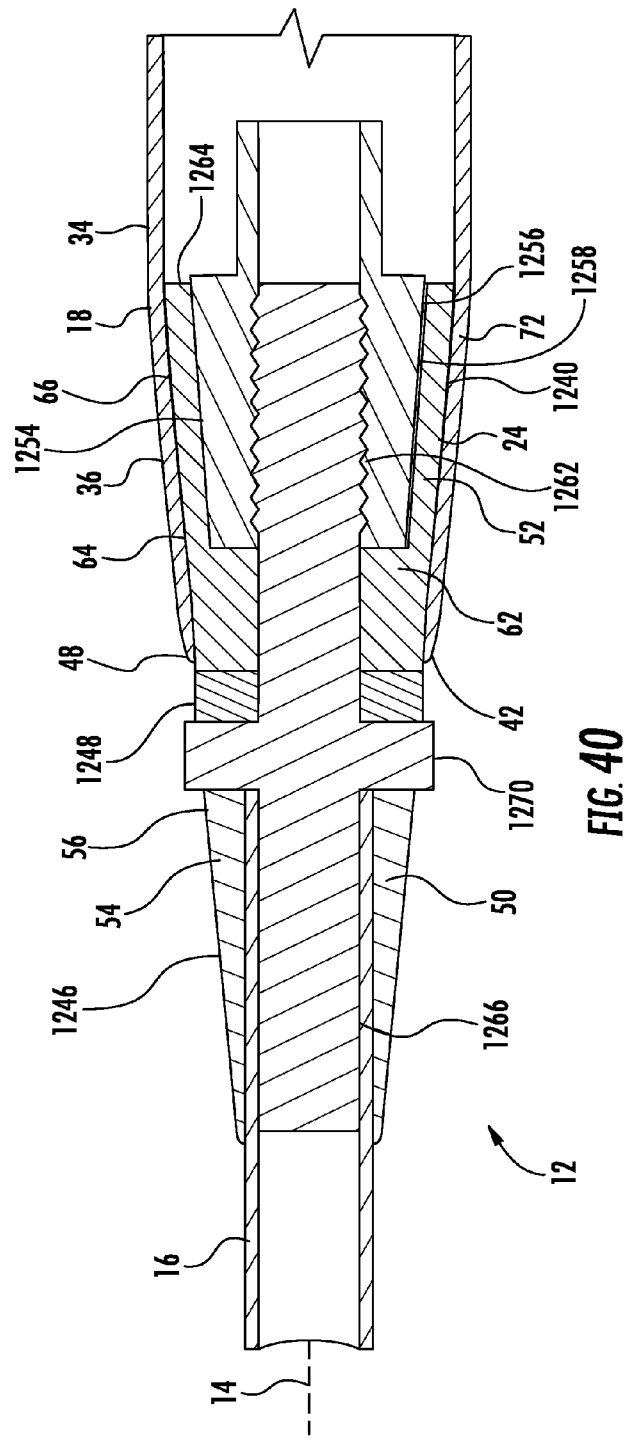
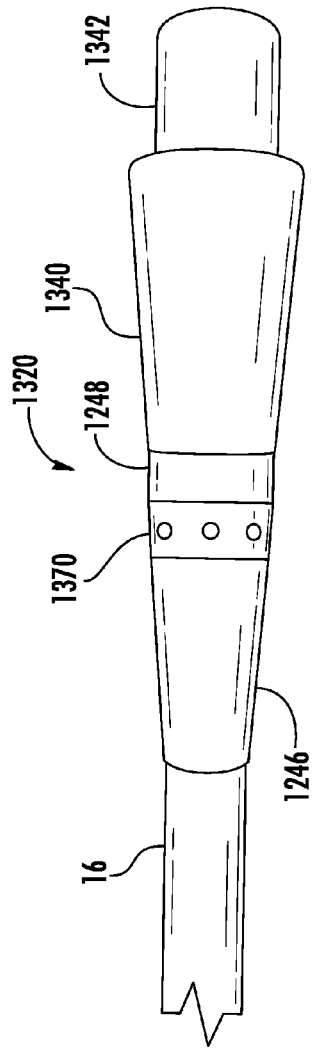
FIG. 40
FIG. 41

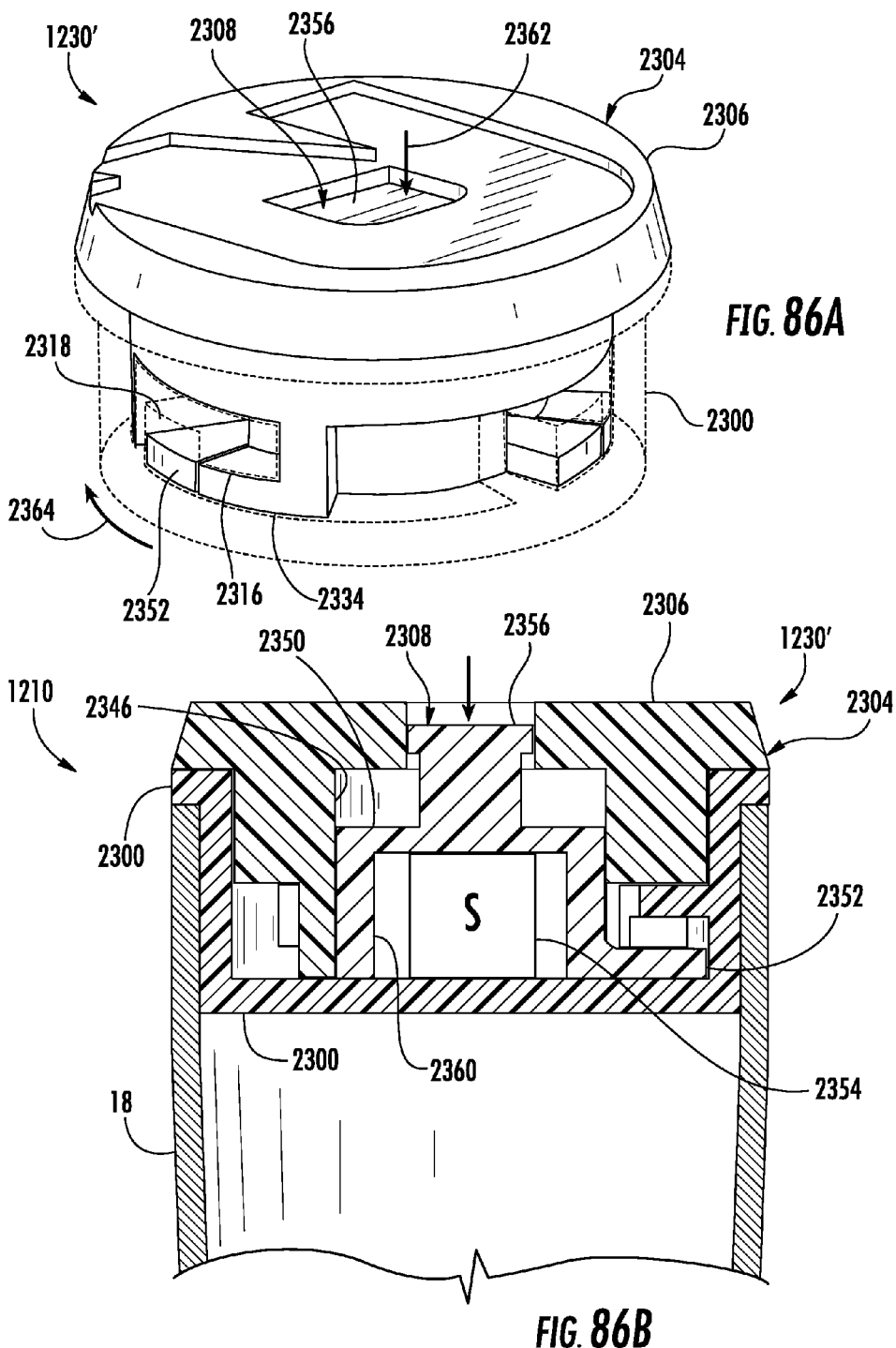

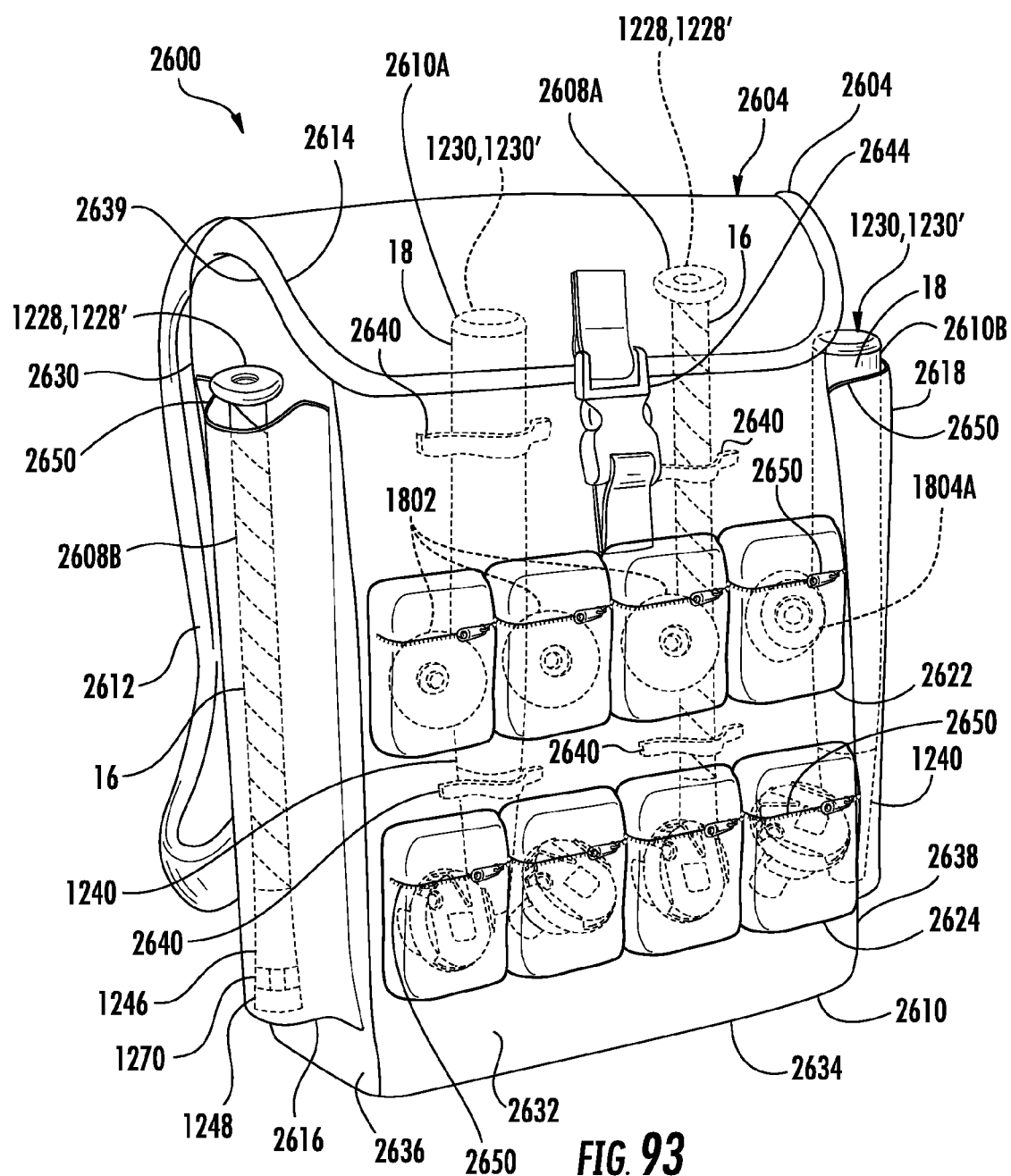

BAT CUSTOMIZATION SYSTEM

RELATED U.S. APPLICATION DATA

The present application is a continuation-in-part of U.S. patent application Ser. No. 14/041,707 titled SYSTEM FOR CUSTOMIZING A BALL BAT, and filed on Sep. 30, 2013, which claims priority to U.S. Provisional Patent Application Ser. No. 61/756,089 filed on Jan. 24, 2013. The present application also claims priority to U.S. Provisional Patent Application Ser. No. 61/860,532 filed on Jul. 31, 2013, which is hereby incorporated by reference in their entirety. The present application is related to co-pending U.S. patent application Ser. Nos. 14/447,569, 14/447,576 and 14/447,588, filed on the same day herewith, the full disclosure of which is hereby incorporated by reference.

BACKGROUND OF THE INVENTION

Baseball and softball bats are well known sporting goods. The materials used to form bats have changed and become more varied overtime, including materials such as wood, aluminum, other alloys, fiber composite materials and combinations thereof. Additionally, the construction of ball bats has also evolved and become more varied overtime. For example, many current ball bats are formed of separate handle and barrel portions. In many instances, the incorporation of new materials and compositions for ball bats has led to increased durability, reliability and performance. The new materials and compositions have also increased the number of bat configurations and choices available to ball players. Still further, the number of baseball and/or softball organizations has also increased overtime. Such baseball and softball organizations periodically publish and update equipment standards and/or requirements including performance limitations for ball bats.

The current state of ball bats includes some drawbacks. The cost of many existing bat constructions can be very high due to the complexity of the construction, the cost of the materials, and the time required to produce the finished ball bat. The wide variety of available or potential bat constructions can make it difficult or confusing for player, coaches and/or parents to select a bat that best meets their needs. The wide variety of bat constructions and materials can make it difficult for bat retailers to know which bats to stock. Additionally, many bat models have long production lead times. Additionally, although bat construction and composition has evolved and become more varied overtime, many ball bats still provide excessive shock and/or vibration to the player upon hitting a ball, particularly on off-center impacts or impacts away from the sweet spot of the ball bat.

Accordingly several needs still exist in the ball bat industry. A need exists for bat configurations that provide exceptional performance, durability and reliability characteristics without excessive material and/or manufacturing costs. What is needed is a bat construction that offers more design flexibility and exceptional performance in a cost effective and efficient manner. It would be desirable to provide a bat construction and system that is cost effective, allows for customization of the bat, short production lead times and exceptional performance. A need exists for a ball bat that provides exceptional feel to the player, even upon off center impacts with the ball. It would also be advantageous to provide an efficient, easy to use tool, system or method that would allow a user to customize his or her bat and obtain a bat that matches that player's particular needs including design, skill level, performance and durability. What is needed is a system that can guide, direct and/or assist a player, coach or parent to the best bat, bat components or bat construction for his or her needs. It is also desirable to provide a ball bat with a unique appealing appearance that looks great and performs well.

BRIEF DESCRIPTION OF THE DRAWINGS

FIG. 1 is a side view of a ball bat in accordance with an example embodiment of the present invention.

FIG. 2 is a side perspective view of the coupling of a handle portion and a barrel portion of the bat in accordance with an example embodiment of the present invention.

FIG. 4 is a side perspective view of a tapered element of the ball bat of FIG. 1.

FIG. 5 is another side perspective view of the tapered element of FIG. 4.

FIGS. 8a through 8c illustrate longitudinal cross-sectional views of a tapered element of a ball bat in accordance with alternative example embodiments of the present invention.

FIG. 9 is longitudinal cross-sectional view of a tapered element of a ball bat in accordance with another alternative example embodiment of the present invention.

FIG. 12 is a side perspective view of a tapered element in accordance with an alternative example embodiment of the present invention.

FIG. 13 is a distal end perspective view of the element of FIG. 12.

FIG. 26 is a schematic diagram of an example bat customization system.

FIG. 27 is a flow diagram of an example method that may be carried out by the bat customization system of FIG. 26.

FIG. 28 is a diagram of an example test swing being detected by the bat customization system of FIG. 26.

FIG. 29 is a diagram of an example output that may be visibly presented on a display by the customization system of FIG. 26.

FIG. 30 is a diagram of another example output that is visibly presented on a display by the customization system of FIG. 26.

FIG. 33 is a schematic illustration of another example bat customization system.

FIG. 34 is a diagram of an example output being visibly presented on a display by the customization system of FIG. 33.

FIG. 35 is a diagram of another example output being visibly presented on display by the customization system of FIG. 33.

FIG. 40 is a sectional view of a portion of the bat of FIG. 37.

FIG. 41 is a fragmentary side view of a portion of an alternative implementation of the bat of FIG. 37.

FIG. 86A is a top perspective view of the end cap of FIG. 85 within the cup of FIG. 80 with the pushbutton being depressed and a bayonet tab of the end cap in alignment with an overlying notch of a bayonet hook of the cup.

FIG. 86B is a sectional view of the end cap and cup of FIG. 86A.

FIG. 93 is a rear perspective view of an example carrier and customization kit or system.

DETAILED DESCRIPTION OF EXAMPLE IMPLEMENTATIONS

Figure 3:
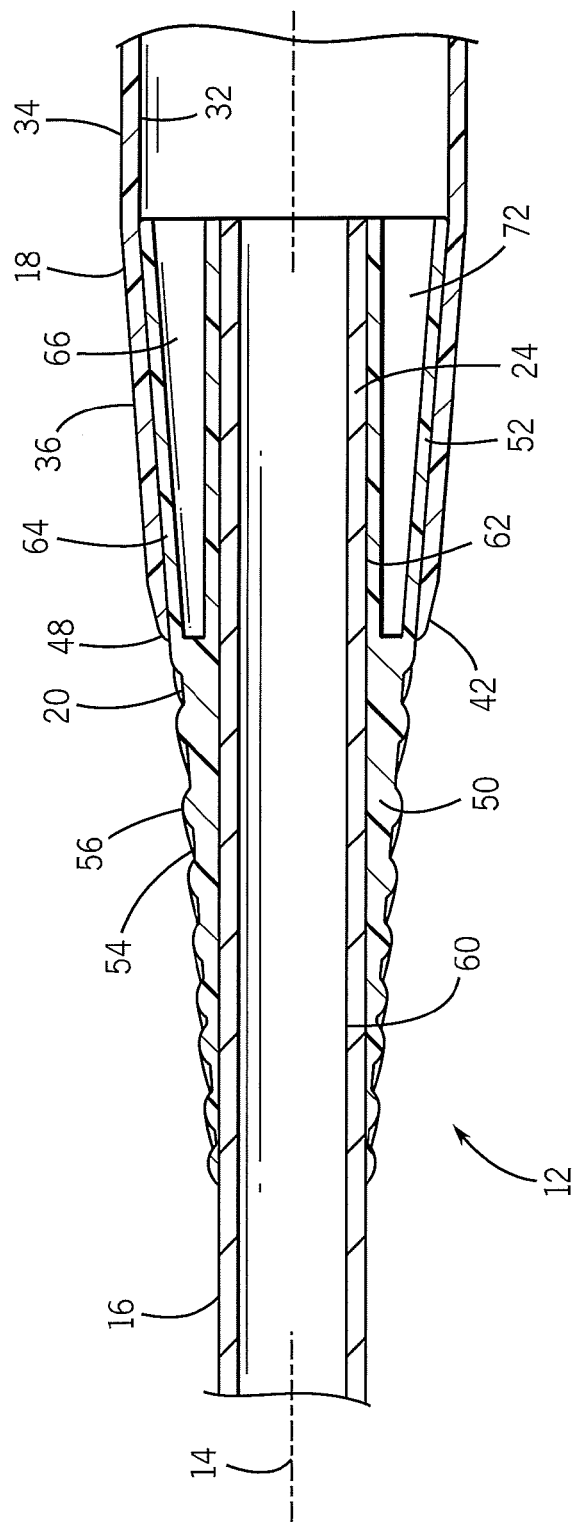
FIG. 3 is a longitudinal cross-sectional view of the coupling of the handle portion of the bat to the barrel portion of the ball bat of FIG. 1.

Referring to FIG. 1, a ball bat is generally indicated at 10. The ball bat 10 of FIG. 1 is configured as a baseball bat; however, the invention can also be formed as a softball bat, a rubber ball bat, or other form of ball bat. The bat 10 includes a frame 12 extending along a longitudinal axis 14. The tubular frame 12 can be sized to meet the needs of a specific player, a specific application, or any other related need. The frame 12 can be sized in a variety of different weights, lengths and diameters to meet such needs. For example, the weight of the frame 12 can be formed within the range of 15 ounces to 36 ounces, the length of the frame can be formed within the range of 24 to 36 inches, and the maximum diameter of the barrel portion 18 can range from 1.5 to 3.5 inches.

The frame 12 has a relatively small diameter handle portion 16, a relatively larger diameter barrel portion 18 (also referred as a hitting or impact portion), and an intermediate tapered element 20. The handle and barrel portions 16 and 18 and the intermediate tapered element 20 are formed as separate structures, which are connected or coupled together. This multi-piece frame construction enables each of the three components to be formed of different materials or similar materials to match a particular player need or application.

Referring to FIGS. 1 and 3, the handle portion 16 is an elongate tubular structure that extends along the axis 14. The handle portion 16 includes having a proximal end region 22 and a distal end region 24. Preferably, the handle portion 16 is sized for gripping by the user and includes a grip 26, which is wrapped around and extends longitudinally along the handle portion 16, and a knob 28 is connected to the proximal end 22 of the handle portion 16. The distal end region 24 is coupled to the element 20. The handle portion 16 is preferably a cylindrical structure having a uniform outer diameter along its length. The handle portion 16 can also have a uniform inner diameter along its length. In alternative implementations, the handle portion can be formed with a distal end that outwardly extends to form a frustoconical shape or tapered shape.

The handle portion 16 is formed of a strong, generally flexible, lightweight material, preferably a fiber composite material. Alternatively, the handle portion 16 can be formed of other materials such as an aluminum alloy, a titanium alloy, steel, other alloys, a thermoplastic material, a thermoset material, wood or combinations thereof. In other alternative embodiments, the handle can have slightly tapered or non-cylindrical shapes.

As used herein, the terms "composite material" or "fiber composite material" refer to a plurality of fibers impregnated (or permeated throughout) with a resin. In one example embodiment, the fibers can be systematically aligned through the use of one or more creels, and drawn through a die with a resin to produce a pultrusion, as discussed further below. In an alternative example embodiment, the fibers can be co-axially aligned in sheets or layers, braided or weaved in sheets or layers, and/or chopped and randomly dispersed in one or more layers. The composite material may be formed of a single layer or multiple layers comprising a matrix of fibers impregnated with resin. In particularly example implementations, the number layers can range from 3 to 8. In other implementations, the number of layers can be greater than 8. In multiple layer constructions, the fibers can be aligned in different directions (or angles) with respect to the longitudinal axis 14 including 0 degrees, 90 degrees and angular positions between 0 to 90 degrees, and/or in braids or weaves from layer to layer. For composite materials formed in a pultrusion process, the angles can range from 0 to 90 degrees. In some implementations, the layers may be separated at least partially by one or more scrims or veils. When used, the scrim or veil will generally separate two adjacent layers and inhibit resin flow between layers during curing. Scrims or veils can also be used to reduce shear stress between layers of the composite material. The scrim or veils can be formed of glass, nylon or thermoplastic materials. In one particular embodiment, the scrim or veil can be used to enable sliding or independent movement between layers of the composite material. The fibers are formed of a high tensile strength material such as graphite. Alternatively, the fibers can be formed of other materials such as, for example, glass, carbon, boron, basalt, carrot, Kevlar®, Spectra®, poly-para-phenylene-2, 6-benzobisoxazole (PBO), hemp and combinations thereof. In one set of example embodiments, the resin is preferably a thermosetting resin such as epoxy or polyester resins. In other sets of example embodiments, the resin can be a thermoplastic resin. The composite material is typically wrapped about a mandrel and/or a comparable structure (or drawn through a die in pultrusion), and cured under heat and/or pressure. While curing, the resin is configured to flow and fully disperse and impregnate the matrix of fibers.

The barrel portion 18 of the frame 12 is "tubular," "generally tubular," or "substantially tubular," each of these terms is intended to encompass softball style bats having a substantially cylindrical impact (or "barrel") portion as well as baseball style bats having barrel portions with generally frusto-conical characteristics in some locations. Alternatively, other hollow, tubular shapes can also be used. The barrel portion 18 extends along the axis 14 and has an inner surface 32 and an outer surface 34. The barrel portion 18 includes a proximal region 36, a distal region 38 spaced apart by a central region 40. The barrel portion 18 is configured for impacting a ball (not shown), and preferably is formed of a strong, durable and resilient material, such as, an aluminum alloy. In alternative example embodiments, the proximal member 36 can be formed of one or more composite materials, a titanium alloy, a scandium alloy, steel, other alloys, a thermoplastic material, a thermoset material, wood or combinations thereof.

The bat 10 further includes an end cap 30 attached to the distal region 38 of the barrel portion 18 to substantially enclose the distal region 38. In one example embodiment, the end cap 30 is bonded to the distal region 38 through an epoxy. Alternatively, the end cap can be coupled to the distal region through other adhesives, chemical bonding, thermal bonding, an interference fit, other press-fit connections and combinations thereof.

Referring to FIGS. 1 through 7, a example embodiment of the intermediate tapered element 20 is shown in greater detail. The element 20 is a transitional member that connects the handle portion 16 to the barrel portion 18. In one example embodiment, the element 20 includes a tapered proximal region 50 and a barrel engaging region 52. In particularly example embodiments, the barrel engaging region 52 can also be tapered similar to the proximal region 50 such that the element has a frustoconical shape.

The element 20 can be formed of a single material, or two or more different materials. In one example embodiment, the element 20 includes a base layer 54 formed of a first material and an outer layer 56 formed of a second material. The first and second materials are preferably formed of lightweight, tough durable materials, such as engineered thermoplastic polyurethane (ETPU). Alternatively, the first and second material can be formed of other materials, such as thermoplastic materials, thermoset materials, a composite material, a fiber composite material, aluminum, an alloy, wood, and combinations thereof. The first material preferably has a durometer value (hardness value) within the range of 45 on the Shore D hardness scale to 150 on the Shore R hardness scale. In a particularly example embodiment, the first material has a durometer value within the range of 100 to 140 on the Shore R hardness scale. The first material preferably has a durometer value in or near the Shore R hardness scale. One important aspect of the present invention is that although the first material of the element 20 is formed of a hard material, the element 20 significantly reduces the level of undesirable vibrational and shock energy extending from the barrel portion 18 to the handle portion 16 upon impact with a ball. The second material preferably has a durometer value within the range of 20 on the Shore A scale to 120 on the Shore R scale. In a particularly example embodiment, when the element is formed with a second material, the second material has a durometer within the range of 20 to 90 on the Shore A scale. The first and second materials can be different materials or the same material but with different characteristics, such as hardness. The first material is preferably harder or has a Shore durometer value that is greater than the second material. In an alternative example embodiment, the first and second materials can have the same or similar hardness values. In another alternative embodiment, the second material can have a hardness value that is greater than the first material.

Incorporation of the outer layer 56 provides additional design flexibility to the element. In embodiments where the second material of the outer layer 56 has a lower durometer value than the base layer 54, the outer layer 56 has a different feel when touched. The outer layer 56 may be continuous and entirely cover the base layer 54, or the outer layer 56 can be formed into a variety of different shapes or patterns with portions of the base layer 54 visible through one or more openings 58 defined in the outer layer 56. FIG. 1, FIG. 2 and FIGS. 4-6 illustrate three separate examples of configurations of the outer layer 56 wherein portions of the base layer 54 are visible through the openings 58 in the outer layer 56. The three examples are representative samples and are not intended to be limiting. The present invention contemplates the use of other designs, patterns, shapes, and graphical and/or alphanumeric indicia. In one example embodiment, the outer layer 56 can be configured to form graphical and/or alphanumeric indicia 70 representative of a trademark (such as, for example, the DeMarini® "D" registered trademark), a service mark, a design, a logo, a certification mark, a warning, an instruction, other markings or combinations thereof. The outer layer 56 is preferably slightly raised with respect to the base layer 54 such that the graphic, design or pattern taken by the outer layer 56 is more pronounced, three dimensional and visible. Additionally, the base layer 54 can be formed in one color or multiple colors, and the outer layer 56 can be formed in a different color, or a different combination of colors. In other example embodiments, the base layer 54 and the outer layer 56 can use the same color or the same color combinations. The outer layer 56 can also have a different texture than the base layer 54.

The element 20 is preferably an injection molded member produced in an injection mold or operation using an injection molding apparatus. The injection molding apparatus can include an injection mold having a mold cavity that defines the shape of the element 20 (or one half of the element). In one example embodiment, the element 20 is injection molded over the handle portion 16. The handle portion 16 extends within the mold (and essentially forms part of the mold) and the first material of the element 20 is injection molded about the handle portion. The injection molding of the element 20 over the handle portion 16 is referred to as over-molding of the element 20 to the handle portion 16. The mold can be a split mold having two major sections. The thermoplastic material can be injected into the mold cavity from an injection molding extruder. The thermoplastic material can be supplied through an inlet tube to the interior of the extruder, which is heated to reduce the viscosity of the thermoplastic material and make it flowable. A piston or screw can be used to force the flowable thermoplastic material out of the extruder into a manifold system, which can be heated. The manifold system can include one, two, three or more flow paths for routing the flowable thermoplastic material to injection ports. The locations of the injection ports are preferably spaced apart to enable the thermoplastic material to readily flow and fill the mold cavity in an efficient and timely manner. The injection of the flowable thermoplastic material can be performed in stages through the use of one or more valves. One or more sensors, such as pressure and/or temperature sensors, can be utilized with the mold to determine when the flowable thermoplastic material has reached selected locations within the mold cavity. When the flow of the thermoplastic material reaches a predetermined value, such as a predetermined pressure at one of the pressure sensors, the valve can reposition and reroute or redirect the flow of the thermoplastic material down a second flowpath through a second injection port. In alternative example embodiments, other forms of injection mold apparatuses can be used. The type of mold, the number of flow paths, the number of injections ports or gates, the number of valves, the configuration of the valves, the type of extruder or other injection mechanism, the configuration, pressure, temperature and order of the flow and introduction of the thermoplastic material can be varied. The injection molding apparatus described above is one example and is not intended to be limiting. One of skill in the art understands that a wide variety of injection molding apparatuses can be used to achieve the desired result from injection molding process or operation.

In one example embodiment, the distal end region 24 of the handle portion 16 can be inserted into the injection mold such that the element 20 is injection molded around the distal end region 24. The distal end region 24 of the handle portion 16 is preferably unfinished and roughened to enhance the bonding from the molding of the element 20 to the region 24. The over-molding of the element 20 to the distal end region 24 of the handle region 16 produces an exceptional bond between the two components. As the injection molded first material of element 20 cures it shrinks slightly and further increases the bond strength of the element 20 to the handle portion 16. Accordingly, the element 20 is shrink-fit to the handle portion 16. Importantly, in the over-molding process, no separate adhesive or additional fastener is required. Therefore, in a example embodiment, the element 20 is over-molded to the handle portion 16 without the use of a separate adhesive or one or more mechanical fasteners. The bonding and shrinkage of the first material of the element 20 to the handle portion 16 provides and exceptionally strong connection. Empirical testing of the bond of the element 20 to the distal end region 24 found a resistance to separation of the element 20 molded to the handle portion 16, even when placed under a 5000 lbf load.

In an alternative example embodiment, the element can be molded or injection molded apart from the handle portion and attached to the handle portion after it has been formed. In still other example embodiments, the element can be coupled to the handle portion by one or more intermediate layers of material or fasteners.

When the element 20 is formed with a base layer 54 and an outer layer 56, the outer layer 56 is preferably over-molded to the base layer 54. The base layer 54 is initially molded and allowed to cure. The base layer 54 is then placed into a secondary mold where the outer layer 56 is over-molded over the base layer 54. The over-molding operation provides an exceptional bond between the base layer 54 and the outer layer 56. The second material of the outer layer 56 flows and fills the secondary mold about the base layer 54 to form the element 20. The first and second materials may be hydroscopic to some degree. Therefore, it is preferable for the over-molding of the outer layer 56 to the base layer 54 to occur relatively soon after the base layer 54 has cured.

The distal ends of the element 20 and the handle portion 16 may terminate at the same point along the axis 14. Alternatively, the distal end region 24 of the handle portion 16 may extend slightly further than the element 20, such that a small amount of the distal end region 24 extends beyond the distal end of the element 20. In another alternative example embodiment, the element 20 may extend slightly beyond the distal end region 24 of the handle portion 16. In an alternative example embodiment, the element 20 can be injection molded in two pieces, then placed about the distal end region 24 and molded to the distal end region 24 under heat and pressure in a separate mold.

In alternative embodiments, the element 20 may be connected to the handle portion 16 through chemical bonding, thermal bonding, one or more fasteners, an adhesive layer, an intermediate bonding layer, or combinations thereof.

Figure 6:
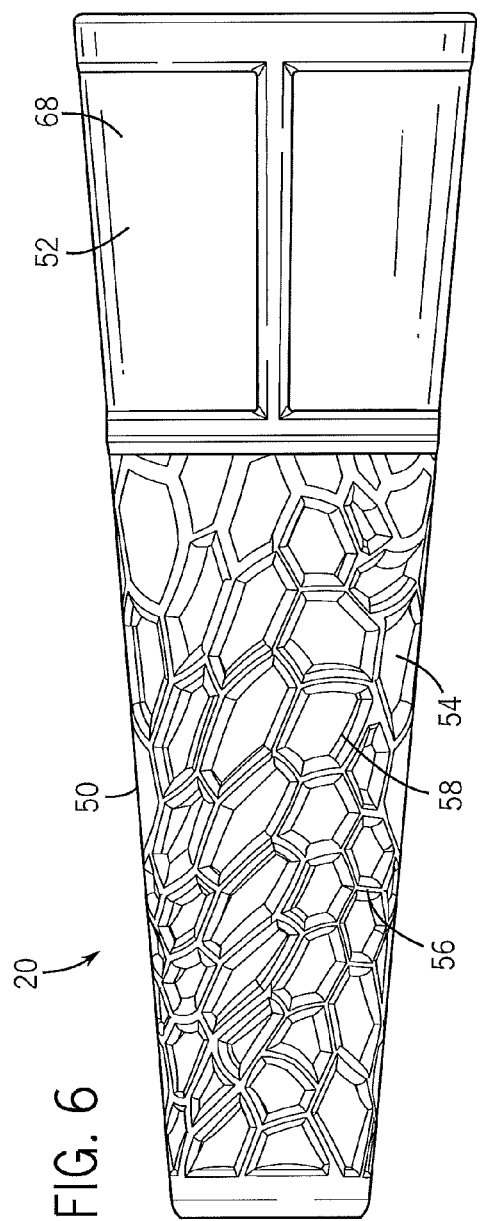
FIG. 6 is a side view of the tapered element of FIG. 4.
Figure 7:
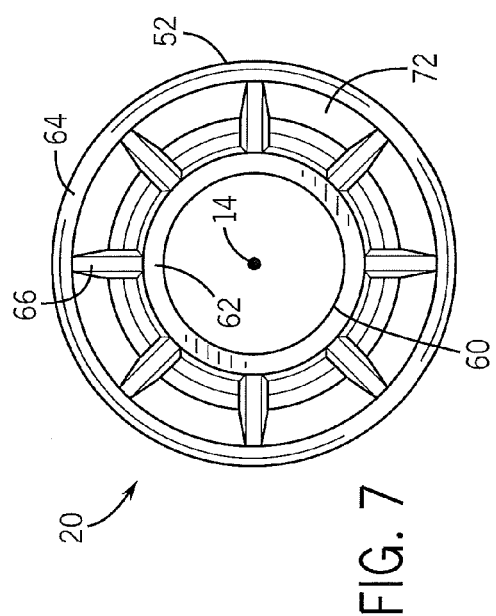
FIG. 7 is a distal end view of the tapered element of FIG. 4.

Referring to FIGS. 3 through 7, the element 20 defines a longitudinally extending through bore 60 for receiving the handle portion 16. The barrel engaging region 52 of the element 20 can include a tubular wall 62 that also defines the bore 60, and an outer wall 64 that is spaced apart from the tubular wall 62 by at least one rib 66. The rib 66 can extend radially with respect to the axis 14 from the tubular wall 62 to the outer wall 64. In a example embodiment, the tubular wall 62 and the outer wall 64 define one or more cavities 72 between the ribs 66, or between the tubular wall 62 and the outer wall 64. The cavities 72 preferably extend at least 40 percent of the length of the element 20. In alternative example embodiments, the cavities can extend over less than 40 percent of the length of the element 20 or more than 40 percent of the length of the element 20. In FIGS. 4 and 7, the element 20 is shown with eight ribs 66. In alternative example embodiments, the number of ribs 66 can be one, two, three, four, five or more. Preferably, the ribs 66 are evenly spaced or angled apart about the element 20. The ribs 66 provide structural integrity to the element 20 while allowing less material to be used, reduced weight and lower material cost to produce the element 20.

Referring to FIGS. 4 through 6, the barrel engaging portion 52 of the element 20 preferably has a generally tapered or frustoconical shape. The outer surface of the barrel engaging portion 52 preferably defines a plurality of recesses 68. The recesses 68 facilitate the engagement of the barrel engaging portion 52 to the proximal end region 36 of the barrel portion 18 by allowing excess adhesive or other bonding agent to flow within the recess 68 and cure. The recesses 68 facilitate the flow of such adhesives, particularly fast curing adhesives, during the assembly process. The recesses 68 can provide for a more efficient, and/or varied bond line between the barrel engaging portion 52 of the element 20 and the proximal end region 36 of the barrel portion 18. In one particularly example embodiment, one or more locations of the barrel engaging portion 52 between the recesses 68 may directly contact the proximal end region 36 while the adhesive fills the recesses to bond the element 20 to the proximal end region 36. Three recesses 68 are shown in the example embodiment of FIGS. 4 through 6. However, in alternate example embodiments, other numbers of recesses can be used. In other alternative example embodiments, the shape of the recesses can be varied into one or more different shapes, and/or the depth of the recesses can be varied one or more different depth or variable depths. In another alternative example embodiment, the barrel engaging portion can be formed with a plurality of projections to facilitate the engagement of the element to the barrel portion. In another alternative example embodiment, the barrel engaging portion can be formed with one or more recesses or without one or more projections.

Referring to FIGS. 1 through 3, the frustoconical shape of the barrel engaging region 52 of the element 20 diverges outwardly from the axis 14. The frusto-conical shaped barrel engaging region 52 preferably telescopically engages the proximal end region 36 of the barrel portion 18. The proximal region 36 of the barrel portion 18 generally converges toward the axis 14 to form a frusto-conical shape that is complementary to the shape of the barrel engaging region 52 thereby providing a telescopic interlocking mechanical engagement. The engagement can include an adhesive.

The element 20 is preferably formed as a one piece integral structure that connects the handle portion 16 to the barrel portion 18. The element 20 preferably completely isolates the barrel portion 18 from the handle portion 16 such that no direct contact exists between the handle portion 16 and the barrel portion 18. The one-piece, integral structure means that once formed the element cannot be disassembled into two or more pieces. The one-piece, integral structural cannot be separated into two or more pieces without essentially destroying the element 20. By way of example, the knob 28 and end cap 30 of a ball bat are typically not integral to the bat frame. The knob 28 and/or the end cap 30 can often be removed without destroying either component. If two portions, parts or components of a bat can be separated by removing one or more fasteners, and/or by removing, dissolving or otherwise separating a separate adhesive, the portions, parts or components do not form a one-piece, integral structure. The element 20 reduces unwanted shock and/or vibrational energy generated from impact of the barrel portion 18 with a pitched ball from as it extends up and along the frame 12 to the user's hands. The transition from the dissimilar materials of the barrel portion 18, the element 20 and the handle portion 16 further contributes to dampen or lessen the severity of the shock and/or vibrational energy felt by the batter holding the handle portion 16 during or immediately following impact with the ball. The engagement of the handle to the element and the element to the barrel portion is preferably a non-threaded engagement. Significantly, the element 20 can be configured to essentially decouple vibration and/or shock dampening from stiffness. Generally speaking, if one wished to reduce the shock and/or vibration felt by a batter upon hitting a ball, a soft, flexible, and/or elastomeric material would often be used to provide such dampening. The soft, flexible and/or elastomeric material would also have the effect of reducing the overall stiffness of the bat. Accordingly, reducing the shock and/or vibration felt by a batter when hitting a bat is typically associated with a reduction in the stiffness of the bat. Importantly, the element 20 provides an additional level of design flexibility in that the element can be formed with a high level of stiffness (or resistance to bending) and a high durometer (or a very hard material) but also provides exceptional vibration and/or shock reduction. The decoupling of these stiffness to shock and/or vibration dampening (or damping), and/or the decoupling of hardness to shock and/or vibration dampening are unique attributes provided by incorporation of the element 20 into the ball bat 10 and further increase the design flexibility of a bat designer. The element 20 can be used to significantly reduce the vibration and/or shock energy felt by a batter when impacting a ball (especially off-center impacts) without reducing the stiffness of the ball bat or without reducing the hardness of the element. In other embodiments, the element can be configured to be softer and/or more flexible. The described bat and system provides a player or bat designer with the ability to tailor, tune or customize a bat to meet any need, application or player type.

The bat frame 12 formed of the handle portion 16, the barrel portion 18 and the element 20 has a total length. The handle portion 16 has a length that less than 70 percent of the total length of the bat frame 12. In other example embodiments, the length of the handle portion is less than 60 percent of the total length of the bat frame 12.

Referring to FIG. 8a, an alternative example embodiment of the intermediate tapered element 20 is illustrated. The element 20 includes the proximal region 50 and the barrel engaging region 52. The tubular wall 62 defines the bore 60, and the outer wall 64 is spaced apart from the tubular wall 62 by a plurality of the ribs 66. The ribs 66 extend along the entire barrel engaging region 52 and into the proximal region 50 of the element 20 to define the cavities 72 that extend over at least 70 percent of the length of the element 20. In an alternative example embodiment, the element can be configured such that the cavities extend over at least 60 percent of the length of the element.

Referring to FIG. 8b, the cavities 72 defined by the tubular wall 62, the outer wall 64 and the ribs 66 can be at least partially filled with a filling material 90. In one example embodiment, the filling material 90 can be cellular material. In other example embodiments, the filling material 90 can be any material or combination of materials intended to alter one or more of the following characteristics of the element 20 and the bat 10, such as the weight or weight distribution of the bat, the perceived swing weight of the bat, the sound produced by the bat or the element upon impact with a ball, the vibration and/or shock dampening level of the bat upon impact, and the durability of the element. The filling material 90 can be a urethane, an ETPU, a cellular foam, a thermoplastic material, a thermoset material, a metal, wood, one or more weight elements, or combinations thereof.

Referring to FIG. 8c, in another alternative example embodiment, one or more of the ribs 66 may extend from one of the tubular wall 62 and the outer wall 64 to the other of the tubular wall 62 and the outer wall 64 without actually extending all the way to the other of the walls. In this manner, a gap 92 or space exists between the rib 66 and the outer wall 64 (or if the rib extends from the outer wall toward the tubular wall, then a space will exist between the rib and the tubular wall) thereby making adjacent cavities 72 continuous or a single cavity. The radial size of the gap 92 can be generally constant along the longitudinal length of the element. In one particularly example embodiment, the gap 92 (measured radially from the longitudinal axis between the rib and the outer wall (or the tubular wall) is within the range of 0.005 to 0.100 inch. In other alternative example embodiments, other the gap may have other dimensions less than 0.005 inch or greater than 0.100 inch. The gap 92 may allow for greater flexing or flexibility, or controlled or stepped flexibility, of the element 20 during use. The gap 92 can also be employed to alter the feel, sound, weight, vibration dampening level or other characteristic of the element 20 or the bat 10 as a whole. In other example embodiments, the radial size of the gap 92 can become smaller or larger as at it extends along the longitudinal axis 14.

Referring to FIG. 9, in another alternative example embodiment, the element 20 can be formed without ribs and without cavities. Accordingly, the element 20 can be one continuous piece of material, such as a continuous base layer 54. In one particularly example embodiment, the element is continuous without any cavities or enlarged openings. In another alternative example embodiment, the element 20 can be formed of continuous material comprised of the base layer 54 and the over-molded outer layer 56.

Figure 10:
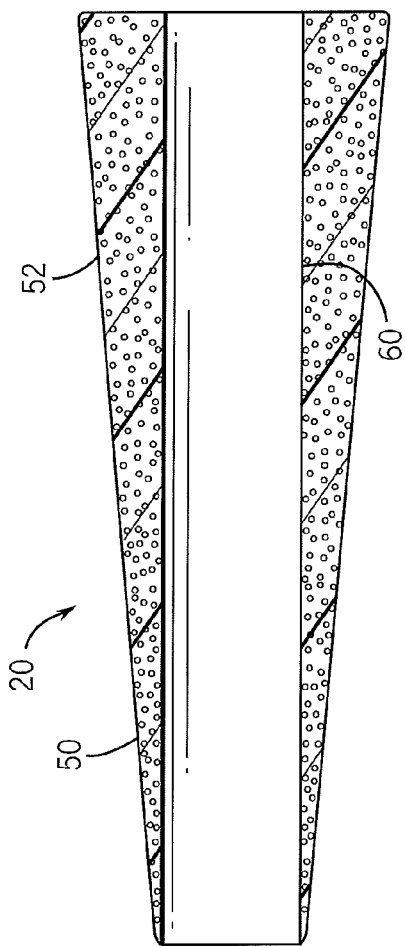
FIG. 10 is a longitudinal cross-sectional view of a tapered element of a ball bat in accordance with another alternative example embodiment of the present invention.

Referring to FIG. 10, in another alternative example embodiment, the element 20 can be formed a cellular material, and without ribs or cavities. The cellular material can be open cell material or closed cell material. The median size of the cells can also be varied depending upon the desired characteristics of the element 20. In another alternative example embodiment, the element formed of a cellular material can also be formed with at least one rib and a plurality of cavities.

Figure 11:
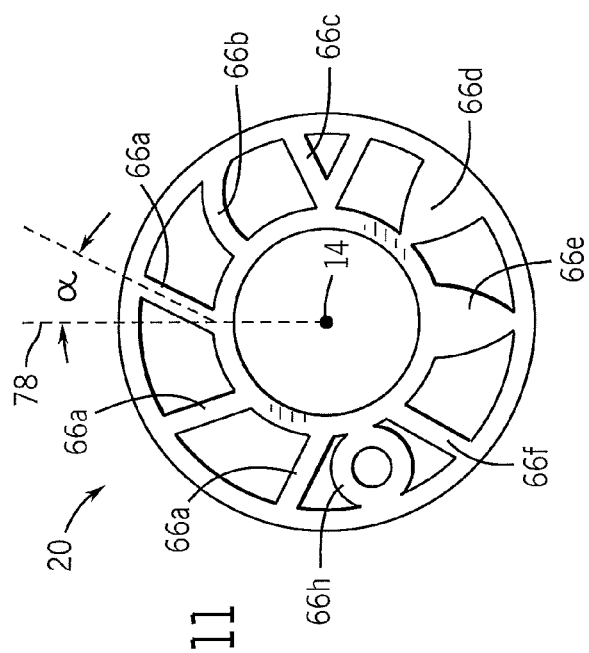
FIG. 11 is a distal end view of a tapered element of a ball bat in accordance with another alternative example embodiment of the present invention.

Referring to FIG. 11, alternative example embodiments of the rib of the element are illustrated. In particular, a variety of different shaped ribs 66 are illustrated. The ribs 66 can be generally planar and can generally extend radially from the tubular wall 62 to the outer wall 64 as illustrated in the embodiment of FIGS. 4 and 7. In alternative example embodiments, the ribs 66a can extend at angle α with respect to a plane 78 extending through and along the axis 14. The angle α can range from plus or minus 1 to 45 degrees from the plane 78. In another implementation, the angle α can range from plus or minus 1 to 90 degrees from the plane 78. Although only three ribs 66a are illustrated, it is understood that the element 20 can be formed with any number of the ribs 66a alone or in combination with one or more of the other shaped ribs. Other configurations for the ribs 66 are also illustrated. The rib 66b is curved at it extends from the tubular wall 62 to the outer wall 64. The rib 66c separates as it extends from the tubular wall 62 to the outer wall 64. The ribs 66d and 66e vary in thickness as they extend from the wall 62 to the wall 64. The rib 66f extends at a sharp angle from the tubular wall 62 to the outer wall 64.

The rib 66h extends from the tubular wall 62 to the outer wall 64 in an ovular or circular shape. The present invention contemplates one or more of the illustrated ribs, or combinations of the illustrated ribs, to be used in the element. In other alternative embodiments, the one or more ribs may spirally extend along the element. In other alternative embodiments, the ribs may form a lattice structure. In still other alternative embodiments, the ribs may form other geometric or curved shapes.

Figure 14:
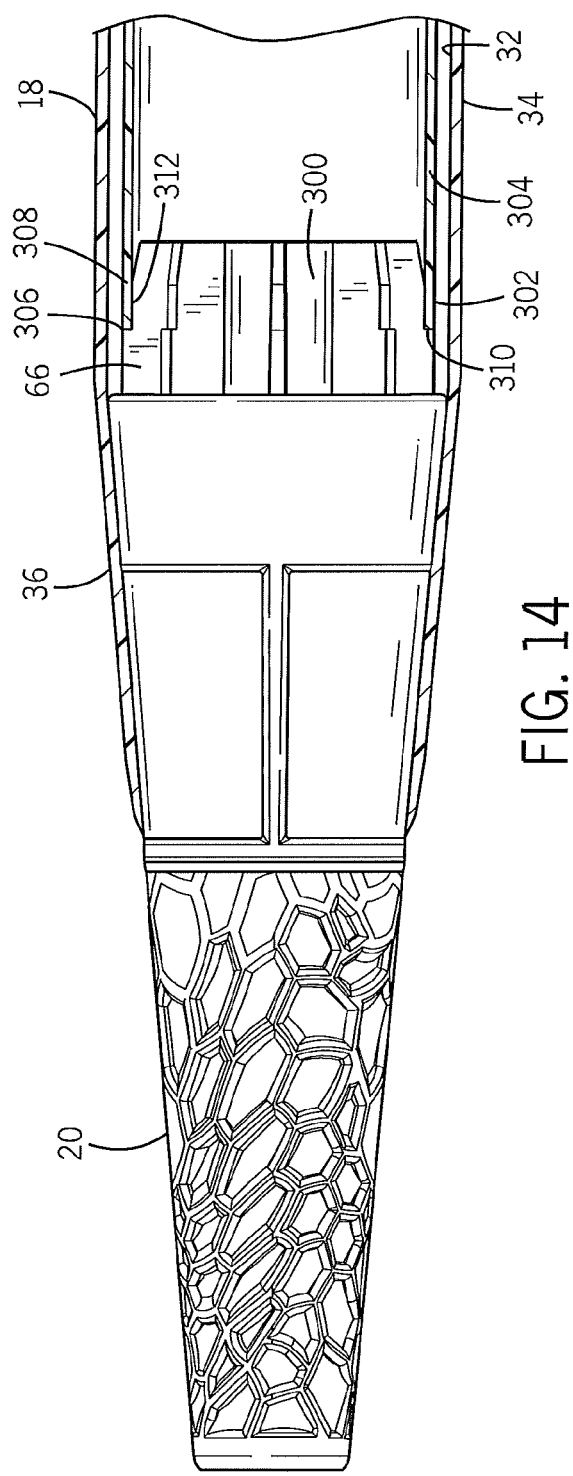
FIG. 14 is a side view of the element of FIG. 12 and a longitudinal cross-sectional view of a portion of the barrel portion and an insert.

Referring to FIGS. 12 through 14, another alternative example embodiment of the present invention is illustrated. The element 20 can be formed with an insert engaging portion 170 for engaging a proximal end region 172 of an insert 174. The insert engaging portion 170 can be configured for engaging the insert 174 in a manner that securely positions the insert in a location such that at least a portion of the insert 174 is separated from the barrel portion 18 by a desired or predetermined amount. The insert 174 is a tubular body that can have a consistent inner and outer diameter or can be formed with some amount of taper or curvature along its length such that the insert is cylindrical or substantially cylindrical. The insert can be formed of one or more of the materials used to form the barrel portion 18, as described above. The insert includes a proximal end region 172 and a distal end region. Over at least a portion of the length of the insert 174, the insert 174 is preferably visibly spaced apart from the inner surface 32 of the barrel portion 18. The separation of the insert 174 and the barrel portion 18 is preferably sized to be within the range of 0.005 to 0.125 in (when measured radially from the longitudinal axis 14 to the outer surface 34 of the barrel portion 18). In another example embodiment, the separation of the insert 174 and the barrel portion 18 can be just sufficient enough to allow for independent movement of the insert 174 relative to the barrel portion 18 upon impact with a ball. Independent movement between the insert 174 and the barrel portion 18 may exist even if the separation is not visible to the naked eye.

In one particularly example embodiment, at least one of the ribs 66 and the tubular wall 62 can longitudinally extend from the barrel engaging portion 52 to form the insert engaging portion 170. In the embodiment of FIGS. 12 through 14, all eight of the ribs 66 are shown extending from the barrel engaging portion 52 of the element 20. In alternative example embodiments, other numbers of ribs can also be used. In one particularly example embodiment, at least three radially spaced apart ribs extend from the barrel engaging portion 52 to provide at least three lines or points of contact for supporting the tubular insert 174.

Each rib 66 may include a shoulder 180 for engaging the proximal end 172 of the insert 174. The shoulder 180 enables the rib 66 to provide a stop that limits the longitudinal movement of the insert 174 in a proximal direction, and an insert bearing surface 182 for supporting a portion of the inner surface of the proximal end region 172 of the insert 174. The insert engaging portion 170 provides a secure support for the proximal end region 172 of the insert 174. The insert engaging portion 170 is another important feature or function that can be incorporated into and supplied by the element 20. The insert engaging portion 170 further increases the versatility and customization possibilities available to the bat designer or user. The element 20 entirely isolates and separates the insert 174 and the barrel portion 18 from contact with the handle portion 16 thereby further enhancing reduction of undesirable vibrational and/or shock energy extending along the bat from the barrel portion to the handle portion in response to impact with a ball. The handle portion 16 is free of contact with the barrel portion 18 and free of contact with the insert 174.

In another alternative example embodiment, the insert engaging portion 300 can be incorporated into the barrel engaging portion of the element. In yet another alternative example embodiment, the insert engaging portion may include a ring, a band or other tubular form of bearing support for supporting the inner surface of the insert. The tubular bearing support can have a uniform diameter along its length or include a taper or frustoconical shape. In another alternative example embodiment, the tubular bearing support can include a continuous shoulder and a continuous insert bearing surface (similar to the shoulder 180 and bearing surface 182, but continuous and not spaced apart as shown in FIGS. 12 through 14).

Figure 15:
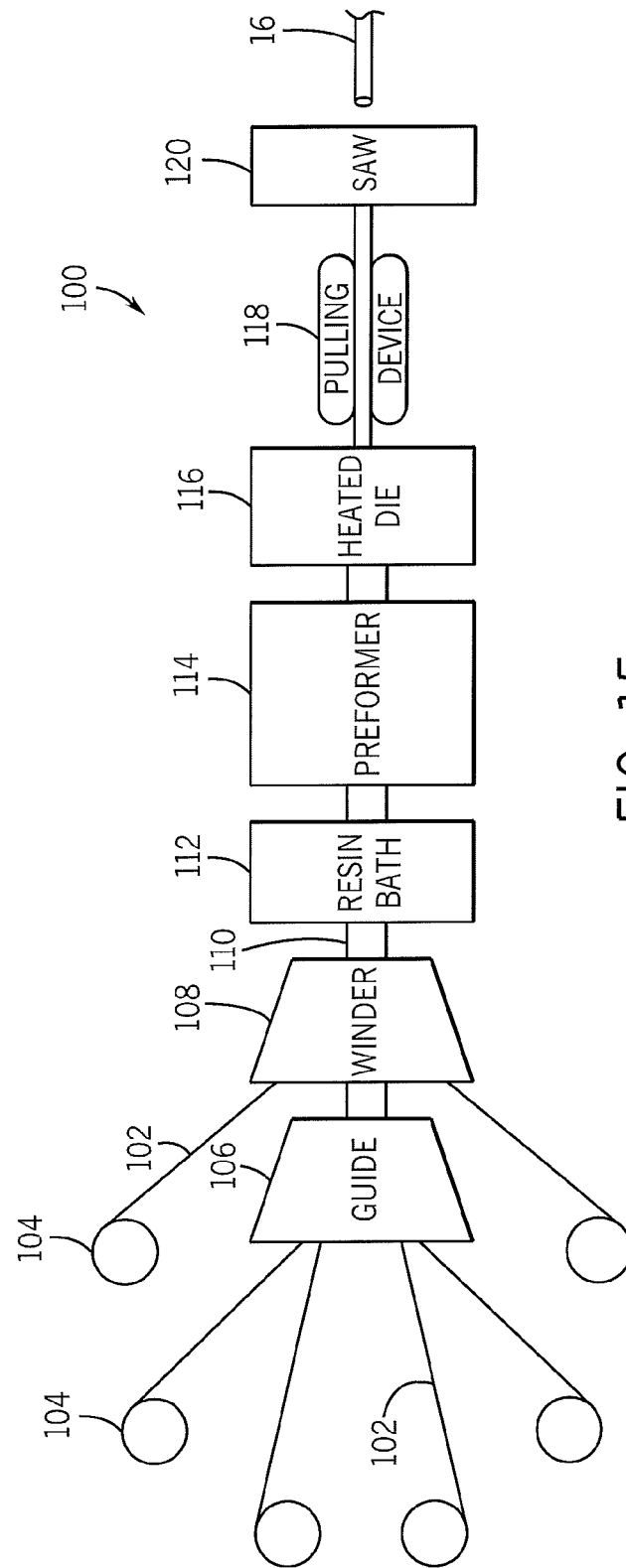
FIG. 15 illustrates a pultrusion method of forming a plurality of handle portions of a ball bat in accordance with an alternative example embodiment of the present invention.

Referring to FIG. 15, in one example embodiment, the handle portion 16 can be formed from a pultrusion process. FIG. 15 illustrates one pultrusion process arrangement. One of skill in the art would understand that other arrangements of pultrusion process components can be used to produce pultruded components, such as handle portions, barrel portions or inserts of ball bats. The present invention contemplates the use of all existing arrangements of pultrusion processes for producing fiber reinforced thermoplastic or fiber composite ball bat components.

Pultrusion is one of the most cost effective methods of producing high quality fiber reinforced thermoplastic materials or fiber composite materials. Pultrusion is similar to extrusion but differs in that extrusion relies on a press to push unreinforced thermoplastic materials through a short die. Pultrusion involves pulling a variety of reinforced fibers, wetted by one or more thermosetting or thermoplastic resins through a heated die to produce a continuous article, such as a cylindrical handle portion. Polymerization of the resin occurs as the wetted fibers pass through the heated die to cure the resin and form a continuous rigid structure. Pultrusion is ideal for producing fiber reinforced thermoplastic or fiber composite materials. It is a continuous process that produces very little waste. The fibers can extend along the longitudinal axis of the cylindrical article or be applied, or pulled from an angle with respect to the longitudinal axis and wound around to produce a number of different angled fiber configurations. The fibers can also be pulled through the pultrusion process as part of a woven fabric (a braided fabric or a tubular sock like fabric) thereby enabling the pultruded component to have some fibers that extend at a 90 degree angle with respect to the longitudinal axis 14. The pultrusion process can result in a continuous cylindrical body extending that then can be cut into desired lengths. Numerous process variables such as pull speed, die temperature, quality of fiber/resin wet-out, and fiber volume can affect the quality of pultruded composites.

A pultruded composite material can consist of reinforcing materials, such as unidirectional fibers (or rovings), continuous fiberglass mat and a thermoset resin that binds the composite together. A polyester surfacing veil to improve the external appearance of the composite, and chemical resistance or weather-ability may also be added. A variety of ancillary materials may be added to the resin formulation, such as pigment for color, accelerators to speed the curing of the thermoset resin, internal release agents, and several various types of inert fillers, each having its own functionality. A pultruded profile can be uniquely designed to meet a custom application. An in-line winder can be combined with the pultrusion process to add filament winding capability which allows for increase bi-axial strength.

One example embodiment of a pultrusion process for making a handle portion 16 is illustrated as item 100 in FIG. 15. A plurality of fibers 102 are fed from one or more creels 104 into a guide 106. One or more of the fibers 102 may be wound around one or more of the other fibers 102 using an inline winder 108. The inline winder 108 provides for fibers extending through the pultruded product (the handle portion 16) in a non-zero fiber position. The angle of the fibers applied from the inline winder 108 can vary from 1 degree to 89 degrees. More preferably, the angle of the fibers applied from the inline winder can vary from 5 degrees to 45 degrees. The winder increases the biaxial strength of the pultruded component. The assembly of fibers 110 is then fed through a resin bath 112. The resin bath 112 impregnates (or coats and surrounds) the assembly of fibers 110 with a thermosetting or thermoplastic resin. The resin bath 112 can be an open bath system or an injected die system. Upon exiting the resin bath 112, the wetted fiber assembly 110 can be formed in one or more performers 114. The performer 114 is configured to facilitate the orientation of the fibers 110 prior to entry into a heated die 116. The heated die shapes the wetted fibers into the desired configuration and controls the curing of the shaped assembly of wetted fibers. A pulling device 118 pulls the assembly of fibers 110 through the process. The pulling device 118 can consist of a pair of reciprocating clamp pullers, or continuous pullers, such as a pair of continuous belts containing pads for engaging the wetted fiber assembly. The pullers can be synchronized for a continuous pull at the desired speed typically ranging from 6 inches per minute to 14 feet per minute. In other embodiments, the pulling device 118 can be configured to provide an intermittent pull. The pultruded product is then typically cut at a predetermined desired length by a cut-off saw 120. The pultrusion process 100 can be used to produce high quality fiber composite handle portions 16 with the desired characteristics such as resistance to longitudinal bending, weight, strength, etc. The pultrusion process 100 can also be used to produce barrel portions or barrel inserts that have substantially uniform diameters over their length.

Figure 16:
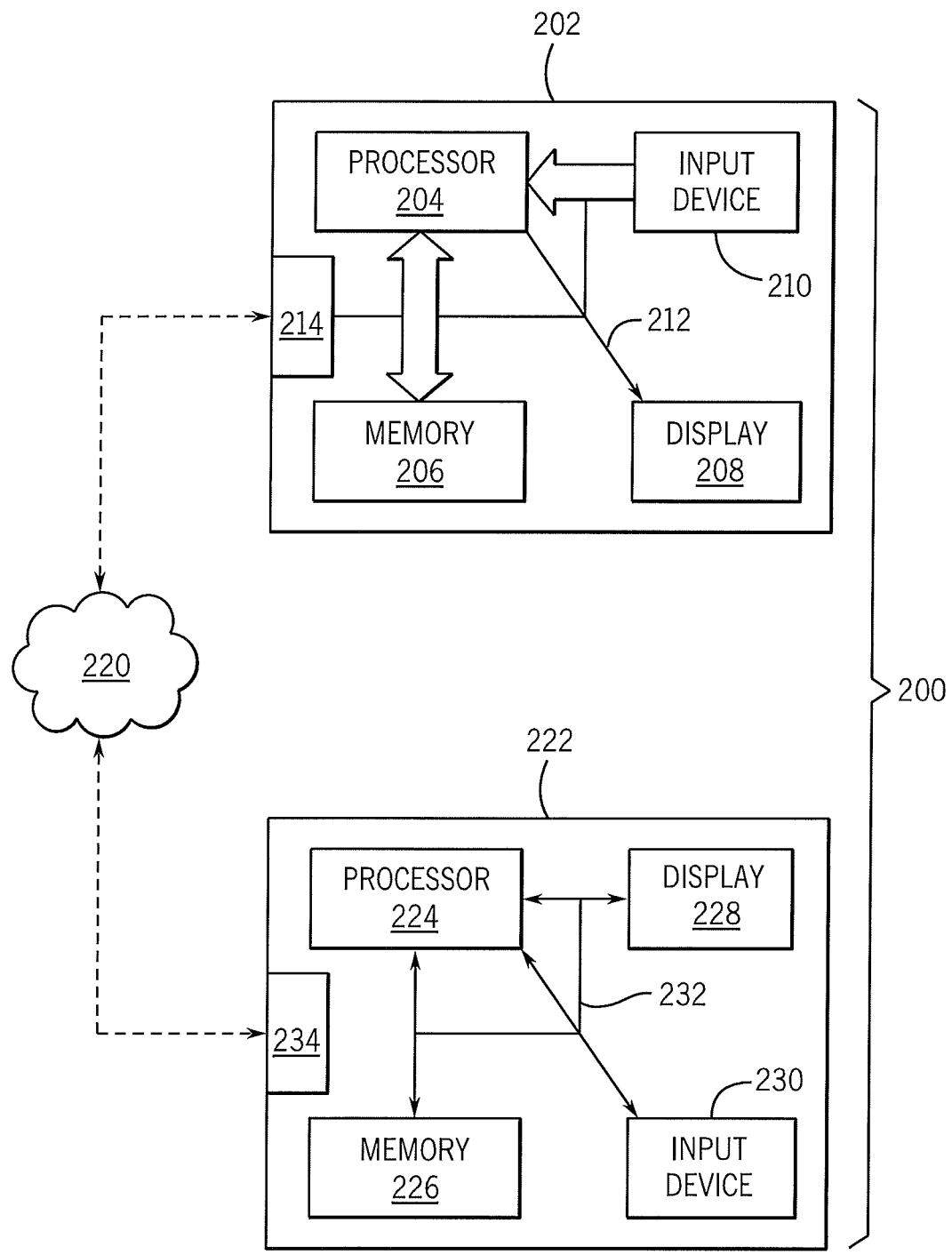
FIG. 16 schematically illustrates a system for customizing and ordering a ball bat in accordance with an alternative example embodiment of the present invention.

Referring to FIGS. 16 through 25, a system and method of customizing a ball bat for a particular player, team, application, or league are illustrated. Various aspects of the present invention may be implemented using a programmable computing device or a computer executing software instructions. FIG. 16 shows an example of a system 200 for customizing a ball bat. The system 200 is intended to be a representative example. One of skill in the art would understand that other arrangements of electronic components and communication links can be employed for implementing the system 200. An electronic device 202, such as a computer, smart phone, tablet, a personal data assistant, a digital music player (IPOD etc) or a tablet, includes a processor 204, a system memory 206, a display 208, input device 210, a system bus 212 coupling the components together, and an device interface 214. In one example embodiment, the display 208 can be a touch screen and also serve as the input device 210.

The processor 204 comprises one or more processing units configured to carry out instructions contained in one or more instruction modules of the memory 206. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, the memory 206 may be embodied as part of one or more application-specific integrated circuits (ASICs). Unless otherwise specifically noted, the controller is not limited to any specific combination of hardware circuitry and software, or to any particular source for the instructions executed by the processing unit.

The memory 206 comprises a persistent storage device or non-transient computer-readable medium storing data and code. The system memory 206 may include ROM and RAM, a mass storage device, and/or some other persistent storage. The input devices 210 employed by the computer 202 may be a keyboard, a joystick, a mouse, a keypad, a touch screen, a voice activated input and other related input devices.

The device interface 214 may be any type of interface used to obtain and/or send data from and/or to another device. For example, the device interface 214 may be a conventional connector/port type interface, such as universal serial bus (USB) interface, a Firewire/IEEE 1394 interface, a PS/2 interface, a PC/AT interface, an RS-232 interface, a serial port interface, or an Ethernet port or other telephone-type interface. Still further, the device interface 214 may include a wireless transceiver for wireless communication with another device. For example, the device interface 214 may be implemented with a radio frequency transceiver, such as a WiFi or Bluetooth wireless transceiver. The device interface 214 may alternately be implemented with an infrared frequency transceiver, a light frequency transceiver, or an ultrasonic frequency transceiver. The device interface 214 may be an internal interface, or it may alternately be an external network interface as is well known in the art. Of course, it will be appreciated that other means of establishing a communications link with other computers may be used. Also, with various examples of the invention, the computer 202 may have a plurality of device interfaces 214.

Typically, the computer 202 will be configured to access one more other computing devices. The computer 202 will normally be capable of operating in a networked environment using logical connections to one or more remote devices, such as other computers 222. The computer 202 may be connectable to one or more remote devices through a local area network (LAN) or a wide area network (WAN), such as the Internet 220. The remote computer 222 may include similar components as the computer 202 including a processor 224, a memory 226, a display 228, an input device 230, a bus 232 and a device interface 234. When used in a networking environment, the computer system 202 may be connected to the network through the device interface 214.

Referring to FIGS. 17 through 25, the computer 202 will execute software instructions to implement various embodiments of the invention. Based upon these instructions, the computer 202 will display a series of a graphical user interfaces to a user. The user will then manipulate one or more input devices 210 to input data to the computer 202 through the user interface (display) 208. For example, with various implementations of the invention, a user will manipulate an input device 210, such as a pointing device like a mouse, roller ball, joystick or touchpad, to change the appearance of a selection indicator imbedded in the graphical user interface. The user input 210 is used to select a characteristic, feature, option or selection presented to the user on a particular graphical user interface.

FIGS. 16 through 25 illustrate an example of the bat customization tool or system 200 for carrying out a method for configuring, designing, specifying, selecting or ordering a customized ball bat. The display 208 displays a series of customized user interfaces, UIs, (FIGS. 16 through 24), including a visual display of various options available for selection and/or customization by the user. By using the input device 210, such as a mouse, touchpad or keyboard, a user can input information for customization of the ball bat into the computer 202. A user can make an input selection by selecting one or more features, characteristics or options of the customized ball bat. The UIs can include other information such as the name of the manufacturer, characteristics of various bat models or bat components, other marketing materials, helpful hints, design tips, selections of designs, fonts, graphics and styles for review by the user.

In response, the computer 202 receives the selection information and can process, organize and/or relay the input information to the display 208, store it in the memory 206 and/or transmit the information to location apart from the computer 202, such as via the internet 220 to one or more other electronic devices 222. The device interface 214 can transfer the selection information or process selection information to a retailer, manufacturer or supplier of the customized bat for processing.

If the information is being provided to a retailer, for example the retailer can review its stock and select the bat components having the feature characteristics specified by the user. If the information is being provided to a manufacturer or supplier, the manufacturer or supplier may employ the selection information to manufacture a new ball bat or ball bat component that has the feature characteristics specified by the user. With some examples of the invention, the user's input selection data may be continuously provided a retailer, supplier or manufacturer. Alternately, the user's input selection data may be provided to a retailer, supplier or manufacturer after the user has indicated that the input selection data represents a final set of ordering information. For example, system 200 may postpone providing the user's selection information to a retailer or manufacturer until after the user also has provided purchasing information, such as a credit card account information or electronic payment service account information.

Figure 17:
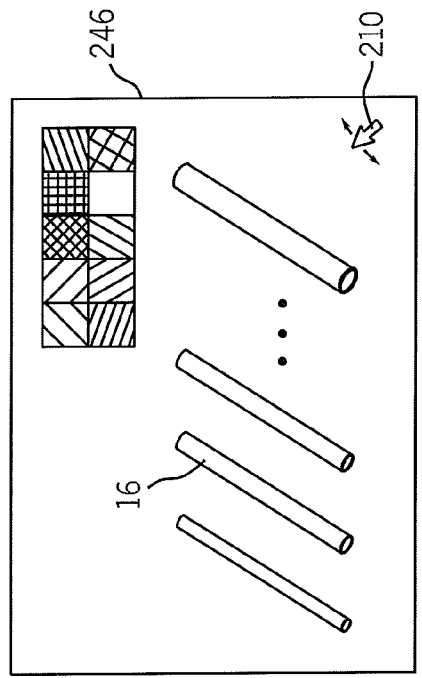
FIGS. 17 through 25 illustrate examples of user interfaces for customizing a ball bat and components thereof in accordance with the system of FIG. 16.

Referring to FIG. 17, a user interface UI 240 is illustrated. UI 240 provides a plurality of windows configured to obtain information about the intended user of the customized bat or the application for the customized bat. The UI 240 can provide prompts, windows or selection options 242 for determining the user's age, height, weight, and/or sex, the league or organization the bat will be used in, the user's skill level, any applicable player goal, the user's budget, and combinations thereof. The UI 240 can also include one or more data fields 244 for allowing a user to enter alphanumeric data (e.g., the user's nickname) onto particular locations of the customized bat. UI 240 is one representation of how this type of information can be inputted into the bat customization system. Other configurations of UI 240 can also be used.

Figure 18:
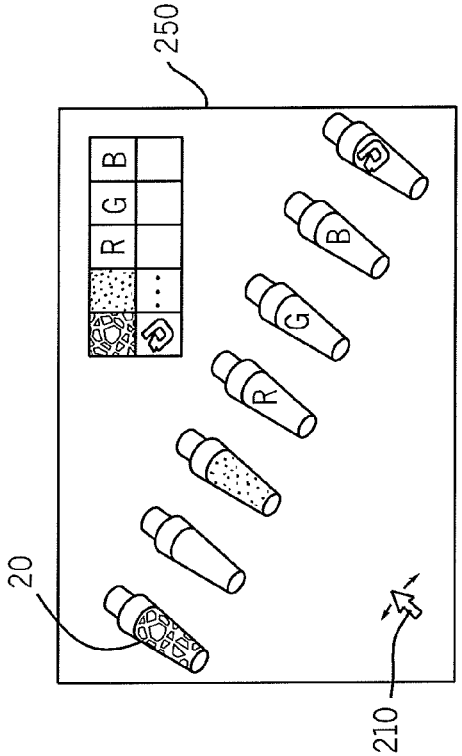

Referring to FIG. 18, a user interface UI 246 is illustrated. A plurality of handle portions 16 is illustrated. The UI 246 may also include one or more windows providing variations of a characteristic of the handle portions 16. The characteristic can be length, outer diameter, weight, color, resistance to bending, material, and combinations thereof. The input device 210 can be used to make a selection or otherwise navigate through the UI 246. GUI 246 is one representation of a UI for allowing a user to select a handle portion that is best for his or her needs, skill level, league, size, age, strength, etc. Other representations of the UI 246 can also be used.

Figure 19:
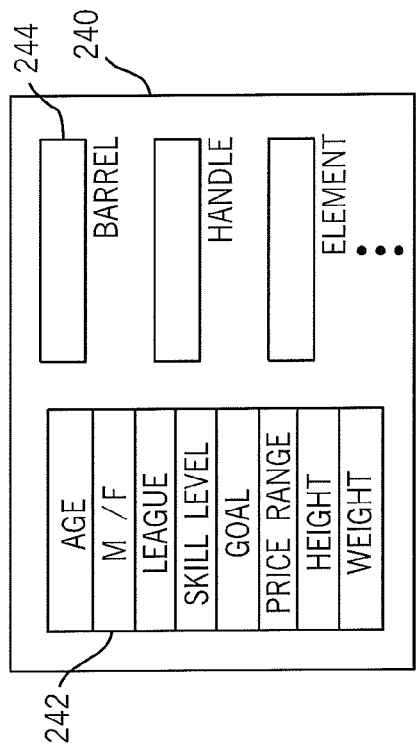

Referring to FIG. 19, a user interface UI 248 is illustrated. A plurality of barrel portions 18 is illustrated. The UI 248 may also include one or more windows providing variations of a characteristic of the barrel portions 18. The characteristic can be length, outer diameter, weight, weight distribution, outer diameter, model name, color, stiffness, material, and combinations thereof. The input device 210 can be used to make a selection or otherwise navigate through the UI 248. UI 248 is one representation of a UI for allowing a user to select a barrel portion that is best for his or her needs, skill level, league, size, age, strength, etc. Other representations of the UI 248 can also be used.

Figure 20:
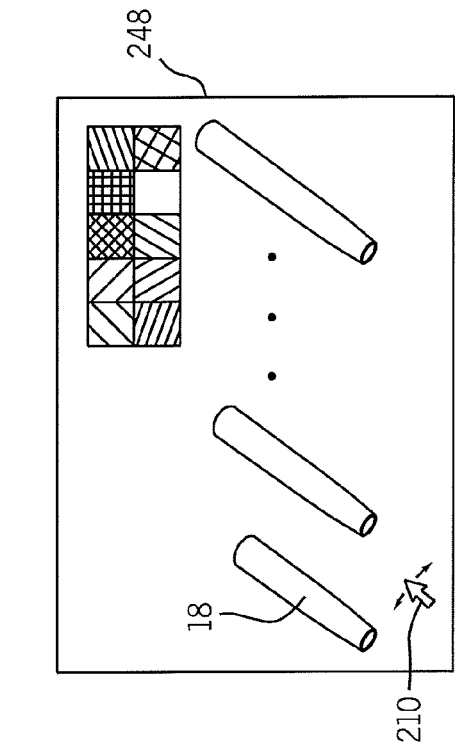

Referring to FIG. 20, a user interface UI 250 illustrating a plurality of intermediate tapered elements 20 are provided. The UI 250 may also include one or more windows providing variations of a characteristic of the elements 20. The characteristic can be length, weight, model name, color, shape, texture, pattern, material, and combinations thereof. The input device 210 can be used to make a selection or otherwise navigate through the UI 250. UI 250 is one representation of a UI for allowing a user to select an element that is best for his or her needs, skill level, league, size, age, strength, etc. Other representations of the UI 250 can also be used.

Figure 21:
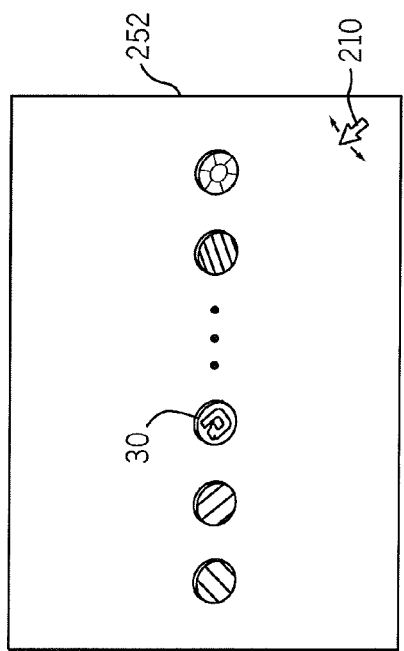
Figure 22:
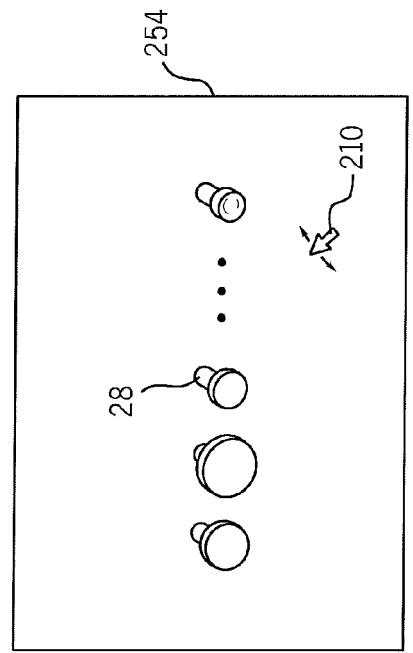

Referring to FIGS. 21 and 22, user interfaces UIs 252 and 254 illustrating a plurality of end caps 30 and knobs 28 are provided. The UIs 252 and 252 may also include one or more windows providing variations of a characteristic of the end caps 30 and the knobs 28, respectively. The characteristic can be weight, model name, color, shape, texture, pattern, design, material, and combinations thereof. The input device 210 can be used to make a selection or otherwise navigate through the UI 252 or the UI 254. UIs 252 and 254 are one set of representations of a UI for allowing a user to select an end cap 30 or a knob 28 that is best for his or her needs, skill level, league, size, age, strength, etc. Other representations of the UI 252 or the UI 254 can also be used.

Figure 23:
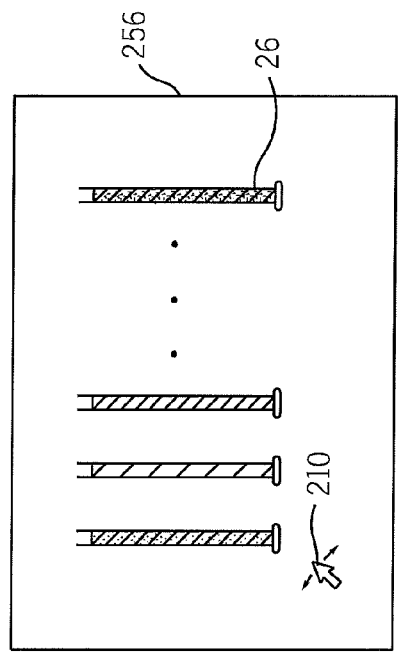

Referring to FIG. 23, a user interface UI 256 illustrating a plurality of grips 26 are provided. The UI 256 may also include one or more windows providing variations of a characteristic of the grips 26. The characteristic can be length, color, thickness, texture, pattern, material, and combinations thereof. The input device 210 can be used to make a selection or otherwise navigate through the UI 256. UI 256 is one representation of a UI for allowing a user to select an element that is best for his or her needs, skill level, league, size, age, strength, etc. Other representations of the UI 256 can also be used.

Figure 24:
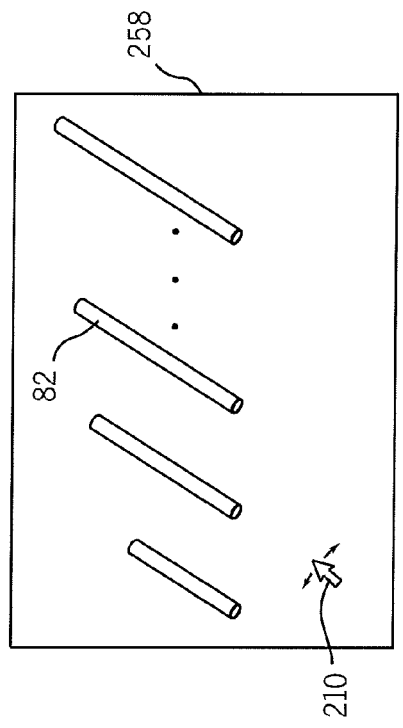

Referring to FIG. 24, a user interface UI 258 is illustrated. A plurality of tubular inserts 82 is illustrated. The UI 258 may also include one or more windows providing variations of a characteristic of the tubular insert 82. The characteristic can be length, outer diameter, weight, weight distribution, outer diameter, model name, stiffness, material, and combinations thereof. The input device 210 can be used to make a selection or otherwise navigate through the UI 258. UI 258 is one representation of a UI for allowing a user to select a tubular insert that is best for his or her needs, skill level, league, size, age, strength, etc. Other representations of the UI 258 can also be used.

Figure 25:
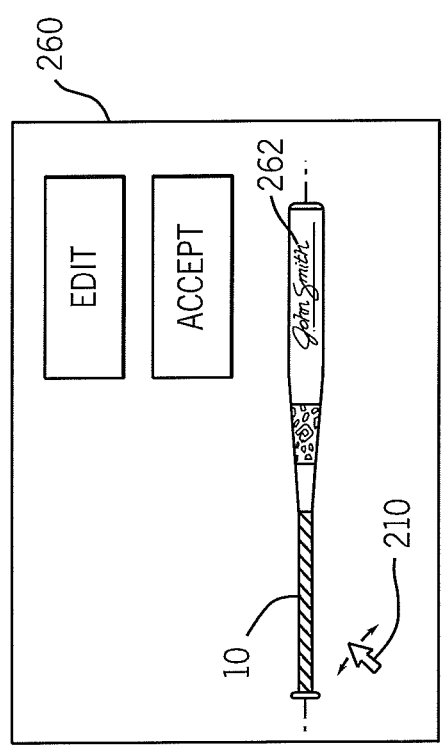

Referring to FIG. 25, a UI 260 can be configured to illustrate the assembled bat 10 in accordance with the user's inputted selections. The UI 260 can also provide the user with the ability to edit, accept or cancel the selection. For example, different colors, color combinations, graphics, styles, model names, etc. can be used, adjusted or edited by the user. Exploded views, zoom features or other component views may be available in the UI 260 to facilitate visualization of the selected customized ball bat.

The bat 10 of the present invention provides numerous advantages over existing ball bats. One such advantage is that the bat 10 of the present invention is configured for competitive, organized baseball or softball. For example, embodiments of ball bats built in accordance with the present invention can fully meet the bat standards and/or requirements of one or more of the following baseball and softball organizations: Amateur Softball Association of America ("ASA") Bat Testing and Certification Program Requirements (including the current ASA 2004 Bat Standard and the ASA 2000 Bat Standard); United States Specialty Sports Association ("USSSA") Bat Performance Standards for baseball and softball; International Softball Federation ("ISF") Bat Certification Standards; National Softball Association ("NSA") Bat Standards; Independent Softball Association ("ISA") Bat Requirements; Ball Exit Speed Ratio ("BESR") Certification Requirements and other requirements of the National Federation of State High School Associations ("NFHS"); Little League Baseball Bat Equipment Evaluation Requirements; PONY Baseball/Softball Bat Requirements; Babe Ruth League Baseball Bat Requirements; American Amateur Baseball Congress ("AABC") Baseball Bat Requirements; and, especially, the NCAA BBCOR Standard or Protocol. Accordingly, the term "bat configured for organized, competitive play" refers to a bat that fully meets the ball bat standards and/or requirements of, and is fully functional for play in, one or more of the above listed organizations.

Further, bats produced in accordance with the present invention can be configured and customized to fully satisfy the particular needs of a particular user, while providing players with a bat that is reliable, playable, produces exceptional feel and optimizes performance along the barrel portion or hitting portion of the bat. Bats built in accordance with the present invention provide the player with exceptional feel and performance because the element isolates the barrel portion (and if applicable, the insert) from the handle portion of the bat thereby significantly reducing (or reducing as desired by the player or bat designer) the amount of vibrational and/or shock energy reaching the player through the handle portion upon impact with a ball. Bats configured in accordance with the present invention are cost effective, can be produced quicker with shorter lead times, less waste, and using fewer man-hours. The present invention significantly improves the flexibility of the bat design further increasing the ability of the bat to be specifically tailored, tuned and designed for a particular player, a particular team, and/or a particular application. The present invention can be used by retailers of all types, including on-line retailers, to provide custom, made-to-order ball bats in an efficient and cost-effective manner. The present invention will enable many suppliers to store or acquire bat components and not completed bats, thereby making ball bat stocking more efficient, resulting in fewer unused or close-out bat models.

In one implementation, bat customization system 200 is additionally programmed or configured to assist a person in identifying what combination of bat components may be best suited or most appropriate for the person or circumstance. In one implementation, memory 206 of bat customization system 200 comprises software, code or program logic which cause processor 204 to operate in one of several user selectable bat component selection advisor modes. In a first component selection advisor mode, instructions in memory 206 cause processor 204 to prompt a person, via display 208, to input his or her physical characteristics using input device 210, which may comprise a keyboard, touchscreen as part of display 208, touchpad, microphone with associate speech recognition software and the like. Based upon such input physical characteristics of the person, such as his or her height, weight, age, arm length, strength, speed and/or vision, instructions in memory 206 cause of processor 204 to analyze such input physical characteristics and output, via display 208, a combination of components based upon the input physical characteristics. For example, in one implementation, instructions in memory 206 cause processor 204 to consult a digital lookup table contained in memory 206 or contained at a remote data storage site and accessed through network 220, wherein the digital lookup table identifies sets or combinations of components (end cap 30, knob 28, grip 26, insert 82, taper element 20, barrel 18, handle 16, for example) recommended for the person. In another implementation, such component combinations are determined based upon one or more empirically created formulas or algorithms using such input physical characteristics as inputs to such formulas.

In another user selectable advisor mode, instructions in memory 206 cause processor 204 to prompt a user a person to upload a photo of himself or herself. In such an implementation, instructions in memory 206 digitally analyze the upload a photo of the person to identify physical characteristics of the person such as his or her height, hand size, arm length, forearm length, upper arm length, torso length, lower leg length, upper leg length and the like. Based on such determined physical characteristics, instructions in memory 206 cause processor 204 to analyze such input physical characteristics and output, via display 208, a combination of components based upon the determined physical characteristics. For example, in one implementation, instructions in memory 206 cause processor 204 to consult a digital lookup table contained in memory 206 or contained at a remote data storage site and accessed through network 220, wherein the digital lookup table identifies sets or combinations of components based upon the photo determined physical characteristics of the person. In another implementation, such component combinations are determined based upon one or more empirically created formulas using such input physical characteristics as inputs to such formulas.

In another user selectable bat component selection advisor mode, instructions in memory 206 prompt a person to upload to memory 206 and processor 204 a captured video of one or more swings of a bat by the person. In such an implementation, instructions in memory 206 cause processor 204 to digitally analyze the uploaded video of the person to identify physical characteristics of the person such as his or her height, hand size, arm length, forearm length, upper arm length, torso length, lower leg length, upper leg length and the like. In such an implementation, instructions in memory 206 further cause processor 204 to digitally analyze the video to determine such characteristics as bat impact speed, hand speed, impact angles, swing plane, reaction time (the elapsed time from start of the swing to impact) and the like. Based on such determined physical characteristics and swing characteristics, instructions in memory 206 cause processor 204 to analyze such physical characteristics and swing characteristics so as to output, via display 208, a combination of components based upon the determined physical characteristics and swing characteristics. For example, in one implementation, instructions in memory 206 cause processor 204 to consult a digital lookup table contained in memory 206 or contained at a remote data storage site and accessed through network 220, wherein the digital lookup table identifies sets or combinations of components based upon the video determined physical characteristics and swing characteristics of the person. In another implementation, such component combinations are determined based upon one or more empirically created formulas using such determined physical characteristics and swing characteristics as inputs to such formulas.

In yet another user selectable bat component selection advisor mode, instructions in memory 206 cause processor 204 to prompt, via display 208, a person to input his or her batting statistics, statistics regarding an upcoming opposing pitcher or expected opposing team defensive schemes or shifts. For example, a person's batting statistics to be input to system 200 the input device 210 may comprise percentages for groundouts, fly outs, singles, doubles, triples, homeruns, left-field hits, right-field hits, centerfield hits, strikes and the like. Examples of opposing pitcher statistics comprise percentages regarding different frequencies of different pitch types thrown by the pitcher, different velocities of different pitch types thrown by the picture, a number of balls, a number of strikes thrown, and frequency regarding different regions of the plate crossed by a pitch. Examples of opposing team defensive shifts include the percentage of time that the opposing fielders shift to the left or to the right or towards the infield or outward away from the infield from neutral fielding locations in response to the person batting. Based upon such input statistics, instructions in memory 206 cause processor 204 to analyze such one or more of such various statistical values and output, via display 208, a combination of components based upon the input physical characteristics. For example, in one implementation, instructions in memory 206 cause processor 204 to consult a digital lookup table contained in memory 206 or contained at a remote data storage site and accessed through network 220, wherein the digital lookup table identifies sets or combinations of components (end cap 30, knob 28, grip 26, insert 82, taper element 20, barrel 18, handle 16) recommended for the person. In another implementation, such component combinations are determined based upon one or more empirically created formulas using such statistics as inputs to such formulas.

In yet another user selectable bat component selection advisor mode, instructions in memory 206 cause processor 204 to dynamically present and adapt recommended bat component options as the user or person inputs component selections. In response to a person selecting a first bat component, instructions in memory 206 causes processor 204 to apply a digital filter to the available other types of bat components that remain to be selected for the bat based upon the selected first bat component. For example, in response to a person selecting a particular barrel 18 having particular characteristics, instructions in memory 206 cause processor 204 to automatically filter out, and not subsequently present as an option, at least some of the previously available options for other components such as handle 16, taper element 20, knob 28 or end cap 30 based upon the selected particular barrel 18 or its specific characteristics. In one implementation, such component options are removed or filtered out due to incompatibility with the one or more already selected bat components. In one implementation, such component options that are removed remain compatible with the already selected bat component or components, but are still removed based upon historical performance data or predicted performance for combinations of the already selected bat components and the removed component options. In one implementation, such component options that are removed remain compatible with the already selected bat component or components, but are still removed based upon historical performance data or predicted performance for the combinations of the already selected bat components and the removed component options by a person having the user's physical characteristics, swing characteristics, batting statistics and/or opponent characteristics (pitcher, defensive shifts).

In yet another user selectable bat customization advisor mode, instructions in memory 206 cause processor 204 to prompt a person to input a desired batting result using the recommended bat. For example, instructions in memory 206 may prompt a person to input whether he or she wishes to hit to left field, hit to right field or hit up the middle, whether he or she wishes to hit a bunt, a fly ball, a ground ball or a line drive, whether he or she wishes to hit for power or control and the like. Based upon such input, instructions in memory 206 cause processor 204 to determine (by consulting a historically created lookup table or using an empirically created algorithm or formula) a combination of bat components that are most likely to provide the person with the desired batting result. In one implementation, the determination is additionally based upon the user's physical characteristics, swing characteristics, batting statistics and/or opponent characteristics (pitcher, outfielder defensive shifts).

In one implementation, the person may have a set of multiple different preassembled bats having different combinations of bat components. In such an implementation, memory 206 stores the various assembled bats available to the person and outputs a recommended one of the available preassembled bats to achieve a desired batting result in a particular circumstance. For example, a person about to bat, such as in the on deck circle, may input his or her desired batting result or a desired subset of possible batting results (i.e. a ground ball to right field or a fly ball to right field, but not a ground ball or fly ball to left field) to his or her portable electronic device 202. Based on the desired upcoming batting result and other possible factors such as the user's physical characteristics, swing type, experience and opponent characteristics (pitcher characteristics or expected opposing defense shifts), portable electronic device 202 outputs on display 208 which of the bats available to the person should be used to increase the probability or likelihood that the desired batting result is achieved.

FIG. 26 schematically illustrates an example bat customization system 300. Bat customization system 300 comprises bat sensing system 302 and bat recommendation system 304. Bat sensing system 302 senses data regarding a bat during a swing of a bat. Bat sensing system 302 comprises battery 309, sensing bat 308, sensors 310 and communication interface 312.

Sensing bat 308 comprises a bat configured to be swung during one or more test swings during which data regarding the one or more test swings is gathered by sensors 310. In one implementation, sensing bat 308 may comprise an adjustable bat having adjustable characteristics. In one implementation, sensing bat 308 may be similar to bat 10 described above, wherein sensing bat 308 is composed of multiple interchangeable components, allowing sensing bat 308 to have adjustable characteristics. In another implementation, sensing bat 308 may have movable weights or movable, that can be permanent, removable or temporary, components to adjust characteristics of sensing bat 308.

Battery 309 is carried by sensing bat 308. Battery 309 provides power for sensor 310 and interface 312. In one implementation, battery 309 comprises a rechargeable battery, rechargeable through interface 312 or through another port. In another implementation, battery 309 stores energy generated by one or more solar power generating panels or components carried by bat 308. In yet another implementation, battery 309 stores energy generated by the motion of the swing of sensing bat 308. For example, during the swing of bat 308, the ferromagnetic member may be moved relative to a winding and the like to generate electrical power which is stored within battery 309. In yet other implementations, battery 309 may comprise a disposable battery. In another implementation, the sensors 310 can receive power from a wired or wireless power source.

Sensors 310 comprise one or more sensors adapted to be carried by bat 308. In one implementation, sensors 310 are removably inserted into an interior or exterior compartment of bat 308. In another implementation, sensors 310 are built into or incorporated as part of bat 308. In yet other implementations, sensors 310 are permanently or removably attached to exterior surfaces of sensing bat 308. Sensors 310 can detect one or more of the velocity, acceleration and path of travel of sensing bat 308 during a test swings. In one implementation, sensors 310 comprise accelerometers. In another implementation, sensors 310 can detect other information, such as, for example, bat position, player position, handle flex, handle stiffness or the resistance to bending of the handle portion of the bat, vibration following impact with a ball, ball speed, barrel deflection upon impact, barrel flex, coefficient of restitution, batter's grip location, and batter's grip strength and location of impact. In some implementations, one or more powdered sprays or substances, impact tape, and/or pressure sensitive tape can be used to determine the location of impact with a ball. In other implementations, sensor 310 may comprise other types of sensing devices.

The sensors 310 can include one or more motion sensors to detect motion of the ball bat and/or the player. In one implementation, sensor 310 comprises at least one accelerometer. In one implementation, sensor 310 comprises a combination of accelerometers and gyroscopes to detect or sense 6 degrees of freedom or motion. In one implementation, the 6 degrees of freedom of motion comprises translation and rotation of the bat. In one implementation, motion sensor 310 may comprise one or more gyroscopes or magnetometers for sensing or detecting movement and/or direction of the bat with respect to the polar axes (north and south poles). The motion sensor can be configured to monitor 3, 6 or 9 degrees of freedom of movement. The motion sensor can include one or more accelerometers, magnetometers, and/or gyroscopes. In other implementations, the sensors 310 can include pressure sensors, light sensors, air pressure sensors, vibration sensors, load cells, and temperature sensors. Location sensors can comprise one or more sensors to detect a location of the bat and/or player. In one implementation, location sensor may additionally or alternatively comprise a magnetometer which senses magnetic fields or polar magnetic fields to determine a location or position of bat. In one implementation, the motion sensor can utilize a ferromagnetic reference structure. In one implementation, location sensor can comprise a global positioning system (GPS) sensor/receiver. Light sensors can comprise one or more light sensors that detect ambient lighting with respect to bat, the player, and/or a ball impacted by the bat. The sensors 310 be mounted to the bat, external or remote to the bat, such as a light sensor, light gates, one or more video cameras, cameras, radar gun, motion sensor, and/or a combination of mounted and remote sensors.

Communication interface 312 comprises an interface by which signals or data from sensors 310 are transmitted to bat recommendation system 304. In one implementation, communication interface 312 comprises a plug-in or port by which a wired connection may be made to sensors 310 and/or processors associated with sensors 310. In one implementation, interface 312 comprises a universal serial bus (USB) type port. In yet another implementation, interface 312 may comprise other forms of communication ports by which data may be transmitted. In one implementation, power may be further provided through interface 312 to recharge the internal battery 309. In yet another implementation, communication interface 312 may comprise a wireless communication device. In one implementation, interface 312 comprises a Bluetooth device. In another implementation, interface 312 comprises a Wi-Fi or other radiofrequency transmitter. In another implementation, interface 312 comprises an active read/write RFID tag which is written upon with data sensed by sensor 310, wherein interface 312 actively transmits signals from the tag.

In another implementation, interface 312 comprises an infrared or other optical communication device. In yet other implementations, interface 312 may comprise other devices that communicate in a wireless fashion. In one implementation, battery 309, sensors 310 indication interface 312 and a comprise a sensing system distinct from sensing bat 308, wherein battery 309, sensors 310 and interface 312 are mountable to an existing bat not specifically designated or manufactured as a sensing bat.

Bat recommendation system 304 comprises a system configured to output one or more recommended bats, or bat components, based upon characteristics of one or more test swings detected by sensors 310. The bat recommendation system 304 can output data such as one or more recommended bats or bat component. The data can also include information related to a swing or swings of the sensing bat, inputted data, or data that is manipulated by the system from swings, inputted data and processed by the processing unit. In one implementation, the bat recommendation system 304 can also incorporate information provided by the user or user representative regarding the user and his or her skill level, needs, bat application, and desires, such as through the UI 240. Bat recommendation system 304 comprises communication interface 320, processor 322, display 324, interface 326 and memory 328. Communication interface 320 receives data signals from interface 312 of bat sensing system 302. In one implementation, communication interface 320 comprises a plug-in or port by which a wired connection may be made to interface 312. In one implementation, interface 320 comprises a universal serial bus (USB) type port. In yet another implementation, interface 320 may comprise other forms of communication ports by which data may be received. In yet another implementation, communication interface 320 may comprise a wireless communication device. In one implementation, interface 320 comprises a Bluetooth device. In another implementation, interface 320 comprises a Wi-Fi or other radiofrequency transmitter. In another implementation, interface 320 comprises RFID reading device. In another implementation, interface 320 comprises an infrared or other optical communication device. In yet other implementations, interface 320 may comprise other devices that communicate in a wireless fashion.

Processor 322 comprises one or more processing units configured to carry out instructions contained in memory 328. Following such instructions, processor 322 identifies and outputs a recommended bat based at least upon swing characteristics as sensed or detected by sensors 310. In one implementation, the processor 322 can be substantially the same as the processor 224.

Display 324 comprises one or more display devices by which one or more recommended bats, or listings of recommended bat components, may be visibly presented to a batter, manager, coach or other person. In one implementation, display 324 further serves as an input device, wherein display 324 allows input of selections. The input can be provided via touchscreen technology or via graphical user interfaces and associated display pointing devices (mouse, touchpad, stylus and the like) by which graphic user interfaces may be selected, such as, for example, the UI 240. Display 324 may comprise the display of a laptop, smart phone, personal data assistant, desktop computer, notebook computer or any other device having a display screen. Display 324 may be presented by a server on an Internet website. Display 324 may be provided as part of a kiosk at a retail sporting equipment store, at a batting cage practice facility or another locations where a person may be selecting and possibly purchasing bats. In one implementation, the bat recommendation system 304 can provide an exact bat specification to a remote source, such as a factory, a bat manufacturer, an authorized retailer, or a qualified assembly partner where the specific bat can be assembled and customized and then shipped to the retail store or directly to the customer. In some implementations, display 324 may be omitted. In one implementation, the display 324 can be substantially the same as the display 228.

Interface 326 comprises a communication interface by which the one or more recommended bats, or bat components, may be outputted to an external or remote entity such as bat supplier 330. Bat supplier 330 comprises an entity configured to supply the recommended bat. In one implementation, bat supplier 330 comprises a bat manufacturer. In yet another implementation, bat supplier 330 comprises a bat wholesaler or bat retailer. In yet other implementations, bat supplier 330 comprises a manager or other person associated with the team and charged with supplying or recommending bats to players of the team. As with interface 320, interface 326 may comprise a wired or wireless communication interface. In one implementation, communication interface 326 communicates with bat supplier 330 via a local area network or a wide area network such as the Internet. In one implementation, communication interface 326 may transmit the recommended bat or bats to a website, wherein the website outputs are displays the recommended bat or bats and allows a person to choose from the recommended bats and potentially order or purchase one or more of the recommended bats.

Memory 328 comprises a non-transient or non-transitory computer-readable medium containing computer-readable programming, instructions or code for directing processor 322 to obtain swing characteristics from sensors 310 and to identify a recommended bat or a plurality of recommended bat options based upon the characteristics. In one implementation, memory 328 is configured to direct processor 322 to implement and carry out the method 150 of FIG. 27. In one implementation, memory 328 can be substantially the same as the memory 206.

FIG. 27 is a flow diagram illustrating one example method 150 that may be carried out by bat recommendation system 300. As indicated by step 152, a batter is instructed to take a first bat swing of the sensing bat 308. Such instructions may be provided by a swing prompt presented on display 324. During such swinging, sensors 310 detect characteristics of the swing and transmit such characteristics to bat recommendation system 304. In one implementation, the first bat swing of the sensing bat 308 can be a first sample or set of one or more swings of the sensing bat 308.

As indicated by step 154, instructions contained in memory 328 direct the processor 322 to analyze the swing characteristics. Such analysis may involve consultation of one or more lookup tables or data tables contained in memory 328. Such analysis may further involve consultation of one or more remote databases using interface 326. For example, processor 322 may consult one or more remote databases by accessing one or more database servers through a local area network or a wide area network such as the Internet. Based upon such analysis, processor 322 identifies and outputs a recommended bat.

The recommended bat identified by customization system 300 is configured to meet applicable regulations or standards regarding characteristics of bats. For example, embodiments of ball bats identified by system 300 fully meet the bat standards and/or requirements of one or more of the following baseball and softball organizations as listed above. In one implementation, the recommended bat is presented on display 324.

As indicated by step 156, the person or batter is prompted to take a second sensing swing or swings of the sensing bat 308. The second sensing swing can be a second sample or set of one or more swings of the sensing bat 308. In one implementation, the batter is prompted to take a second sensing swing with the same sensing bat 308 that was used to take the first sensing swing. In one implementation, multiple swings with the same sensing bat 308 may be taken, wherein characteristics of the multiple swings may be averaged or otherwise statistically manipulated to identify the recommended bat. In one implementation, the data obtained from the swinging of the sensing bat 308 can be used to analyze the consistency of the user's swing and to pick an average or representative swing. In yet another implementation, the batter is prompted to take the second swing with a different sensing bat 308 having different sensing bat characteristics such as a different center of mass, a different length, a different weight, a different weight distribution, a different grip size, a different composition, a different handle flex, or the like. In one implementation, recommendation system 304 identifies the different sensing bat 308 or indicates what characteristics the different sensing bat should have for the second sensing swing. In one implementation, the different sensing bat 308 indicated by recommendation system 304 is based upon the characteristics of the first sensing swing. In one implementation, recommendation system 304 may prompt the batter to take the second sensing swing with a different sensing bat 308 matching or closely approximating the recommended bat identified in step 154. In one implementation, recommendation system 304 may prompt a batter to take multiple first sensed swings with a first sensing bat 308 and multiple second sensed swings with the different sensing bat 308. In another implementation, recommendation system 304 may prompt a batter to take one or more sensed swings with three or more different sensing bats 308. Signals from the second sensing swing are transmitted from sensor 310 to recommendation system 304.

In one implementation, the bat 308 can be used with a ball, such as a baseball, a softball, a practice ball, and/or a whiffle ball, to monitor the location of impact, the energy transfer, follow-through, swing efficiency, and other parameters. In other implementations, the bat sensing system 302 and the bat recommendation system 304 can include different operating modes, such as: a normal swing mode without the use of a ball; a tee mode, in which sensing bat 308 impacts a ball mounted on a tee; a soft-toss mode, in which the sensing bat 308 is used to hit a lightly tossed ball; and a live pitch mode, in which that sensing bat 308 to impact a pitched baseball, softball or other practice ball.

As indicated by step 158, instructions contained in memory 328 can be used to direct processor 322 to analyze the second swing characteristics. Such analysis may involve consultation of one or more lookup tables or data tables contained in memory 328. Such analysis may further involve consultation of one or more remote databases using interface 326. For example, processor 322 may consult one or more remote databases by accessing one or more database servers through a local area network or a wide area network such as the Internet. Based upon such analysis, processor 322 identifies and outputs at least one final recommended bat. In one implementation, the recommended bat is presented on display 324. The recommended bat comprises at least one of a particular bat model, a bat size/length combination, bat construction characteristics comprising length, weight, handle flex, barrel flex, bat frame flex, weight distribution, moment of inertia, balance point, end loading or end weighting, knob weighting, handle/grip diameter, one-piece frame, two-piece frame (barrel and handle), three-piece frame (barrel, handle an intermediate member) and dampening characteristics. In some implementations, steps 156 and 158 may be omitted.

In one implementation, the example method of FIG. 27 can include user input 160. The bat customization and recommendation system 304 can include an algorithm requesting information from a user or a user representative about the user to be used in making the bat recommendation. The information can include one or more player characteristics, such as, for example, the user's age, weight, height, gender, arm length, hand size, grip size, finger length, baseball/softball skill level, current level of organized play (e.g., Little League, high school, pony league, etc.). The information can also include one or more of the player's desires, needs, goals, etc. For example, the user may have a desired level of feedback or feel of the bat (e.g., highly dampened), handle flex, weight distribution. The information can also include the user's preferences for the appearance of the bat, such as, for example, the color(s), team name, player name, team name, other team names, other trademarks, graphical and/or alphanumeric indicia. Knobs 28, end caps 30 and other bat components can be selected based upon their ornamental or aesthetic appearance.

FIG. 28 illustrates an example test swing of a sensing bat 308 by a batter 400. As schematically shown by FIG. 28, in some implementations, bat recommendation system 304 (shown FIG. 26) may identify on output a recommended bat based upon additional characteristics or signals other than those received from sensors 310 carried by sensing bat 308. For example, in one implementation, sensors may be mounted or otherwise secured to the batter taking the test swing. An example illustrated, sensor 402 is secured proximate to the knees of batter 400 while sensor 404 is secured proximate to the waist of the batter 400, wherein sensors 402 and 404 indicate the strike zone for batter 400. Sensors 402 and 404 further indicate motion of the player's or batter's waist and knees during the swing. In the example illustrated, sensor 406 is secured proximate to the players arm, such as the player's forearm, wrist or elbow. In yet other implementations, additional or alternative sensors may be secured to the batter 400 at different locations on the batter when taking the one or more test swings. Such sensors may indicate the relative height, positioning, velocity, acceleration and path of travel of such portions of the physical anatomy of batter 400 during a test swing. In some implementations, remote sensors, such as a video camera, may capture images of the test swing, wherein such captured images are analyzed and utilized by recommendation system 304, along with the swing characteristics detected from sensors 310, to identify a recommended bat. In one implementation, the player may impact a ball (a baseball, softball, practice ball, a limited flight ball or whiffle ball) during one or more test swings of the sensing bat to provide additional data, such as for example, impact location, vibration, shock, barrel deflection, feel, and related information.

FIG. 29 illustrates one example output 500 that may be presented on display 324 indicating recommended bats based upon the characteristics of the one or more test swings detected by sensors 310. In the example illustrated, output 500 comprises a graphic or visible presentation of three distinct recommended bats 540A, 540B and 540C (collectively referred to as bats 540). Alongside, or in any location in relation to the output 500, each of bats 540 is a data region 502 that can include specific identification of the bat and a listing of one or more characteristics of the recommended bat 540. In one implementation, characteristics of an ideal bat are visibly indicated by output 500, wherein each data region 502 indicates a score or other indication of how closely the particular existing available bat configuration matches the ideal characteristics of the recommended bat.

The three bats 540A, B & C also illustrate three different bat configurations. The bat 540A has a one piece frame 12 in which the handle portion, the barrel portion and the intermediate tapered portion are all integrally formed together. The bat 540B is a two piece bat in which the frame 12 of the bat is formed by separate handle and barrel portions 16 and 18 that are connected together. The handle and barrel portions 16 and 18 of the bat 540B are formed separately that are connected to form the bat frame 12. The frame 12 of the bat 540B is not formed of one integral piece, but rather two pieces (the separate handle and barrel portions 16 and 18). The bat 540C is similar to the bat 540B in that the frame 12 is formed of two primary components, the handle and barrel portions 16 and 18. The bat 540C differs from the bat 540B in that the handle and barrel portions 16 and 18 of the bat 540C are coupled together by a coupling member 21. The coupling member 21 preferably separates the handle portion 16 from the barrel portion 18 and couples the handle and barrel portions 16 and 18 together. The present invention contemplates the use of all such bat configurations.

In the example illustrated, display 500 further comprises one or more graphic user interfaces 504 for each of the recommended bats 540 by which a bat selection may be made. In response receiving the bat selection, bat recommendation system 304 may automatically transmit the selection to bat supplier 330. In one implementation, output 500 may automatically switch screens to website providing cost information in the option for the batter to purchase the chosen bat.

In other implementations, the output 500 and/or the data region 502 can provide other forms of information to a user or viewer. The other forms of information can include marketing information or relevant facts about a particular bat model. For example, the output 500 and/or data region 502 can include language such as "our most popular bat", "the bat most preferred by serious high school players", or the particular bat model is used by a particular team, player or league. The data region 502 can also provide additional technical information about the benefits and features of the recommended bat model. In other implementations, the display 500 can display one or more recommended bats in other manner, such as fully assembled, exploded in separate components. In other implementations, the data regions 502 and GUIs 504 can take other shapes, forms, styles or patterns.

FIG. 30 illustrate output 600, another example of output of a recommended bat characteristics detected by sensors 310 during one or more test swings. Output 600 is similar to output 500 except that output 600 visibly presents recommended bats 640A, 640B and 640C (collectively referred to as recommended bat 640). Recommended bats 640 comprise different combinations of components available for a customize bat assembly or recommended bat. For example, recommended bats 640 may comprise different combinations of components such as bat frame 12, handle portion 16, barrel portion 18, intermediate tapered element 20, knob 28, end cap 30, insert 82, 174. Such components may differ in structural shape or configuration, dimensions, weight, flexibility/rigidity, thickness, color, material composition and/or price. In one implementation, corresponding components in each combination that are the same are visibly identical to one another, and corresponding components in combinations that are different from one another are visibly different. For example, longer intermediate tapered elements 20 will visibly appear as longer on output 600. Differences in material composition of different components may be represented by different colors, different symbols of the like, wherein appropriate key is provided as part of output 600. As with output 500, output 600 comprises data regions 502 and graphically user interfaces 504. In one implementation, the output 500, 600 and/or the data regions 502 can also be configured to provide the user with the ability to select his or her own customized color or color combination, to include personalized information such as the player's name, team name, nickname, initials, logos, trademarks, designs, or other graphical and/or alphanumeric indicia.

In one implementation, the processing unit 322 is directed to display an outlined bat. The selected or recommended bat components are displayed as being positioned within the outlined bat being displayed. In one implementation, processing unit 322 displays an indication of how close the outlined bat being displayed and presently filled with the user selected bat components approximates the recommended bat.

Figure 31:
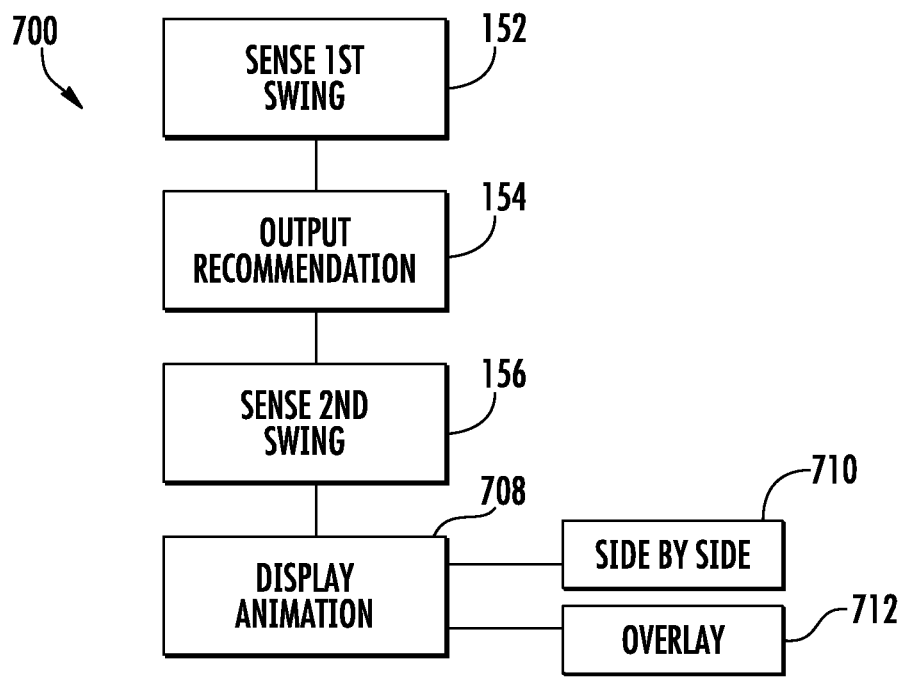
FIG. 31 is a flow diagram of an example method that may be carried out by the customization system of FIG. 26.

FIG. 31 is a flow diagram illustrating an example method 700 that can be carried out by bat customization system 300. Method 700 is similar to method 150 except the method 700 outputs a recommendation (similar step 158) by additionally displaying an animation based on the one or more test swings. Those remaining steps of method 700 which correspond to steps of method 150 are numbered similarly.

Figure 32:
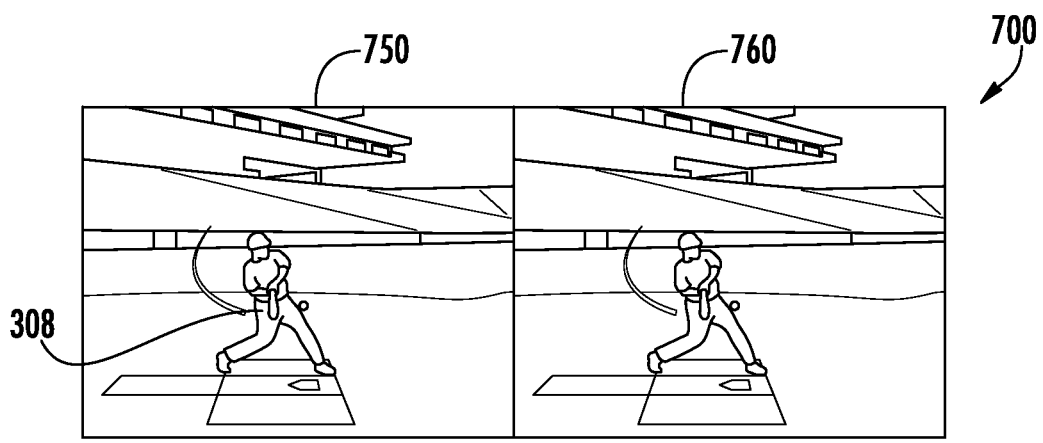
FIG. 32 is a diagram of an example output comparing swings.

As indicated by step 708, memory 328 directs processor 322 to generate an animation 750 (shown in FIG. 32) of a swing. In one implementation, animation 750 comprises an animation of first test swing or based upon a statistical analysis of multiple first test swings. In one implementation, the animation further illustrates impact with a displayed baseball or softball. In one implementation, animation 750 visibly displays the particular sensing bat 308 being swung. In another implementation, animation 750 comprises the swing for which the recommended bat is optimized.

As indicated by steps 710 and 712, instructions and memory 328 may further direct processor 322 to present a second animation 760 providing a comparison of different swings. In one implementation, a person is allowed to select from multiple animated comparison modes. As indicated by step 710 and shown FIG. 39, such comparison may be made in a first selected mode by simultaneously or concurrently presenting animations 750 and 760 (or even additional animations) in a side-by-side fashion, wherein the swings are synchronized with one another or wherein one swing is delayed with respect to the other in a predetermined fashion. As indicated by step 712, in another selected comparison mode, two or more swings in an overlapping or overlaid fashion, wherein the animation substantially aligned with one another such that the differences between the two swings are evident during the animation.

In one implementation, the two swings that are compared comprise different test swings. In one implementation, the different test swings comprise different test swings using different sensing bats 308. In another implementation, the different test swings comprise different test swings with the same sensing bat 308. In yet other implementations, one of the compared swings may comprise a test swing the sensing bat 308 while the other of the compared swings comprises a simulation of a test swing using the recommended bat. In one implementation, the simulation of the test swing using the recommended bat utilizes characteristics of the test swing with the sensing bat and adjusts such characteristics based upon characteristics of the recommended bat. In yet another implementation, the compared swings may comprise simulations of different swings using the different characteristics of different recommended bats and the sensed characteristics of the one or more test swings. For example, a first simulated swing may be generated based upon the characteristics of the one or more test swings and the differences between sensing bat 308 and a first recommended bat (such as bat 640A shown in FIG. 30). A second simulated swing, being compared to the first simulated swing, may be generated based upon the characteristics of the one or more test swings and the differences between sensing bat 308 and a second recommended bat (such as bat 640B or 540A described above). In such an implementation, bat recommendation system 304 provides a person with a graphical or visible presentation of the swing differences resulting from selection of different recommended bats. For example, a player swinging a lighter bat, may have a faster swing speed compared to a swing with a heavier bat. Such information may assist the battery in selecting the most appropriate recommended bat. Although animations 750 and 760 are illustrated as depicting not only the bat, but the ball and the batter, in other implementations, animation 750, 760 may alternatively omit one or both of the ball and the batter swinging the bat.

FIG. 33 schematically illustrates bat customization system 800, another implementation of bat customization system 300. Bat customization system 800 similar to bat customization system 300 except that bat customization system 800 comprises sensing bat 808 in lieu of sensing bat 308 and further comprises input 838. Those remaining components of bat customization system 800 which correspond to components of bat customization system 300 are numbered similarly.

Sensing bat 808 is similar to sensing bat 308 in that sensing bat 808 carries sensors 310 and communication interface 312. Sensing bat 808 is different from bat 308 in that sensing bat 808 is specifically illustrated as having adjustable characteristics. Such adjustable characteristics include one or more of a bat size/length combination, bat construction characteristics comprising length, weight, handle flex, weight distribution, moment of inertia, end loading, end weighting, knob weighting, handle/grip diameter, one-piece frame, two-piece frame (barrel and handle), three-piece frame (barrel, handle an intermediate member), two-piece barrel, one or more barrel inserts, and dampening characteristics. In the example illustrated, sensing bat 808 is composed of multiple interchangeable components, allowing sensing bat 808 to have adjustable characteristics. For example, sensing bat 808 may comprise different combinations of components such as bat frame 12, handle portion 16, barrel portion 18, intermediate tapered element 20, knob 28, end cap 30, and/or insert 82, 174 as described above. At least one of such interchangeable components carries one or more sensors 310 that communicate swing information or data via communication interface 312 also carried by the one or more components. Such components may differ in structural shape or configuration, dimensions and/or material composition. In another implementation, sensing bat 808 may have movable weights or movable, but permanent, components to adjust characteristics of sensing bat 808. Sensing bat 808 enables a person to reconfigure or build one or more customized sensing bats for generating test swings to be used in identifying one or more recommended bats, such as bats 640 shown in FIG. 30. In one implementation, the sensing bat 308 is configured such that the components can be readily assembled and disassembled to facilitate the adjustment or reconfiguration of the sensing bat 308. For example, the connection of the intermediate tapered element 20 to the barrel portion 18 or the intermediate tapered element 20 to the handle portion 16 can be performed with a connection that allows easy disassembly and reattachment. In the implementation, the sensing bat 308 can be readily disassembled and reassembled with one or more different bat components and give to the user to try with the new configuration. This process can be repeated with one or more sensing bats 308 until the user has used sufficient bat combinations in order to make a proper assessment or analysis for determining the one or more recommended bats.

Input 838 comprises one or more devices by which a person may enter selections and/or data which are used by recommendation system 804 in combination with data from bat sensing system 802 to identify one or more recommended bats or recommended bat configurations/assemblies. In one implementation, the bat customization system 800 is configured to provide the recommended bat or bats, such as bats 540A, 540B, 540C, 640A, 640B and/or 640C, based solely upon the input 838, and not based upon also data obtained from the sensing bat. As referenced above, the bat customization system can include a detailed algorithm that queries the user or user representative about relevant factors that can be used to determine and select the bat or bats that are best suited for the user based upon the entered input 838. In one implementation, input 838 comprises a keyboard. In another implementation, input 838 additionally or alternatively comprises a touch screen provided on display 324, such as, for example the UI 240. In yet other implementations, input 838 comprises a touchpad, a keypad, a microphone with speech recognition, a stylus and the like.

In the example illustrated, memory 328 additionally comprises instructions that direct processor 322 to prompt a person to enter one or more selections or data for use in identifying one or more recommended bats. In one implementation, bat recommendation system 804 may prompt the user to enter information or to select from various displayed choices comprising a preferred swing type, a preferred pitch type, a preferred pitch speed, a skill level and/or batter information for which the recommended bat is to be optimized.

In one implementation, memory 328 further directs processor 322 to prompt a person to enter the applicable bat construction regulating body or bat standards. Customization system 804 utilizes such standards in further identifying characteristics of the recommended bat or recommended bats. For example, embodiments of ball bats identified by system 800 can fully meet the bat standards and/or requirements input by the batter and can be configured for organized, competitive play.

A swing type may comprise the type of swing or swing objective or batting situation that a batter prefers for the particular bat being identified by recommendation system 804. Examples include, but are not limited to, a bunt, a line drive or a lift (fly ball). Examples of swing types based upon swing objectives include, but are not limited to, swinging to make contact with the ball, and easy swing (not too heavy), a swing designed avoid being stung, a swing to hit for power and a swing to hit for batting average. Using such inputted swing types, bat customization system 800 may identify one or more recommended bats for each individual swing type or batting situation. Bat customization system 800 may identify a first recommended bat for use in bunting and a second different recommended bat for use in attempting to hit a line drive or to hit for power.

Information regarding pitch type refers to the type of pitch for which the recommended bat is best suited. For example, a batter may utilize customization system 800 to identify different recommended bats for different types of pitches. When a batter faces a particular pitcher known to have a particular pitching type strength or known to predominantly use one type of pitch over another, the batter may utilize a particular recommended bat having particular characteristics that best suit such a pitching type. For example, a batter may choose a first recommended bat when facing a pitcher known to have a strong fastball and may choose a second different recommended bat when facing a pitcher known to have a strong curveball.

Information regarding pitch speed refers to the expected speed or range of speeds for which customization system 800 is to identify characteristics for the recommended bat. For example, a bat optimized for facing pitches at a first range of speeds may not necessarily be optimized for facing pitches at a second different range of speeds. Bat customization system 800 enables characteristics of the bat to be optimized for the particular range of pitch speeds that are expected. For example, the recommended bat identified by customization system 800 may have different bat characteristics depending upon whether fastballs are expected to be between 60 and 70 mph or between 80 and 90 mph.

Information pertaining to skill level refers to the skill level of the pitchers being faced and/or the skill low of the batter utilizing the recommended bat. Examples of different skill levels include, but are not limited to, Little League, minor-league, major league, All-Star, beginner, intermediate, advanced, ranges of years of experience, age ranges and the like. With such information, bat customization system 800 can best identify a recommended bat that is most appropriate to the player skill level or the skill level of the pitchers being encountered by the batter.

Batter information refers to characteristics of the batter. Such characteristics may include the batter's height, the batter's arm length, the batter's hand size, the batter's grip strength, the batter's grip size, the batter's arm strength, the batter's flexibility, the batter's age and the like. Batter information may also refer to the characteristics of the bat presently are currently being used by the batter during play. Batter information may additionally or alternatively refer to current batting performance or batting statistics for the batter such as hitting percentage, slugging percentage, on-base percentage, the number or percentage of doubles, the number or percentage of singles, the number of triples, percentage of hits to left field, percentage of hits to right field, percentage of hits to center field, the number or percentage of home runs, the number or percentage of infield singles, the number or percentage of groundouts and the like. Utilizing such information, bat customization system 800 may identify recommended bat that improves upon a batter strengths or that shores up weaknesses of the batter. Utilizing batter information in combination with swing type objectives, customization system 800 may assist the batter in attaining his or her particular batting objectives (such as better batting percentage, greater power, greater number of home runs etc.) given the existing batting performance and physical traits of the batter.

FIG. 34 illustrates an example output 900 and may be presented by bat recommendation system 804 on display 324. In the example illustrated, output 900 lists various batter made selections 902. For "swing type", output 900 may identify the particular type a swing or batting situation objective chosen by the batter. For "pitch type" output 900 may identify the particular type of pitch for which a bat is desired. For "pitch speed", output 900 and identify the particular range of speeds chosen by the batter for which a bat is to be identified. For "skill level", output 900 may identify the skill level selected by the batter, wherein the skill level may be the skill level of the batter or maybe the skill level of the pitcher to be faced. For batter information, output 900 may list those characteristics of the batter that have been entered by the batter (or another person).

As further shown by FIG. 34, output 900 identifies a plurality of different recommended bats for each piece of input information. For example, for the selected "swing type" (such as bunt), output 900 identifies three different recommended bats, recommendation 1 (R1), recommendation 2 (R2) and recommendation 3 (R3). Each bat recommendation comprises a combination of available bat components (described above) which are assembled together. In the example illustrated, a same individual recommended bat may be recommended by customization system 800 for multiple information categories. For example, bat R2 is recommended by system 800 for both the selected swing type and the selected pitch type. With output 900, a person may select the particular recommended bat that best satisfies the largest number of the user preferences 902. In other implementations or examples, other combinations of user preferences 902, features, variables and/or factors can be used by the system 800 to select the optimum bat for the selected preferences, features, variables and/or factors.

FIG. 35 illustrates output 1000, an example of output that may presented by customization system 800. Output 1000 is similar to output 600 except that output 1000 additionally comprises a score or other indication 1002 indicating how each of the recommended bat 40 address or satisfy the particular batters preferences such as a particular batters preferences regarding swing type (ST), pitch type (PT), pitch speed (PS), skill level (SL) and batter information (BI). Output 1000 further provides a total score 1004 for each recommended bat 640. As a result, output 1008 of the batter to identify which of the recommended bats best suits the most important or highest priority objectives of the batter, whether it be swing type, pitch type, swing speed, skill level or batter info. Output 1000 also facilitates a selection by the batter of a recommended bat 640 that best addresses or best satisfies a subset of the batter preferences or that best addresses or satisfies on average all of the batter preferences as indicated by total or cumulative score 1004. In other implementations, other manners of communicating one or more recommended bats other than a score can be used, such as, for example, a color coding, a popularity rating, expert rating, or other standard.

In some implementations, in lieu of recommending an entire combination of bat components, customization system 800 may alternatively recommend a change of individual bat components to improve performance or to better meet the batter's preferences. For example, a batter may enter, through input 838, the current characteristics of the current bat being used by the batter. The current characteristics may comprise actual attributes of the current bat or may comprise the current combination of bat components being utilized by the batter. Using such input and test swing information, customization system 800 may recommend the exchange a replacement of particular components on the current bat being utilized by the batter. For example, in lieu of listing multiple recommended bats for each batter preference 902, output 900 may alternatively list individual bat component replacements that adjust the characteristics of the batter's current bat to improve the associated particular batter preference 902. In such an example, the player's bat may be returned to a manufacturer (or other authorized entity) for reassembly with a different component of the bat. In one implementation, the updated, or upgraded bat is fully qualified to satisfy the applicable bat construction regulating body or bat standards.

Although bat customization system 800 is described as utilizing inputted batter preferences or batter information in combination with the detected characteristics of one or more test swings with one or more different sensing bat 808, in other implementations, bat sensing system 802 and interface 320 may be omitted. In such an alternative implementation, bat customization system 800 identifies one or more recommended bats for each batter preference 902 (as seen in FIG. 34), provides an indication of score of how each of a plurality of different recommended bats satisfy either preferences 902 (as seen in FIG. 35) or indicates recommended bat component replacements for each batter preference 902 based upon such batter preferences 902 alone. For example, based upon the batter's current batting performance, the skill level of the batter, and the swing type or objective for the particular bat being recommended, customization system 800 may identify a first recommended bat or a group of bats from which the batter may select. Later on, as the batting performance of the batter changes, the skill level of the batter changes or the swing type or objective for the particular batter changes, customization system 800 may identify a second different recommended bat or group of bats from which the batter may select. Customization system 800 allows the bats being used by a batter to be customized and reconfigured as the batters skill level, preferences and competition changes over time.

Figure 36:
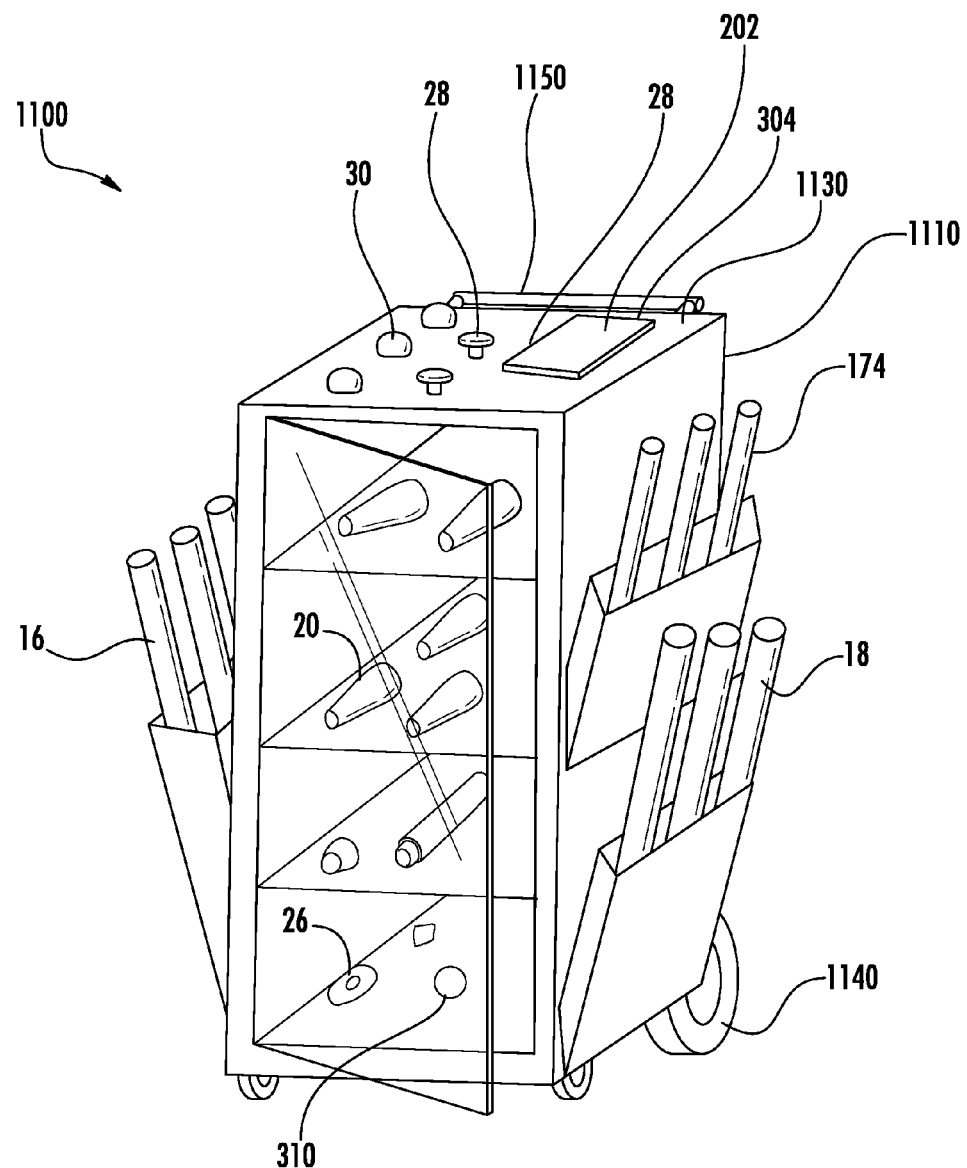
FIG. 36 is a perspective view of a ball bat fitting cart in accordance with an example implementation of the present invention.

Referring to FIG. 36, in one implementation, the bat customization system 1100 may include a bat fitting cart 1110. The bat fitting cart 1110 is a portable structure configured to hold a variety of ball bat components, sensors 310 and tools for facilitating the assembly of the bat components. The fitting cart 1110 can include a number of component bins 1120 for storing particular bat components such as barrel portions 18, handle portions 16, end caps 30, knobs 28 intermediate tapered elements 20, inserts 174, grips 26 and other components. The fitting cart 1110 provides working surfaces 1130 for bat customization experts to use the bat customization system 304 and assemble one or more of the recommended bats, and for supporting an electronic device 202, such as a tablet. The fitting cart 1110 is configured to be portable with wheels 1140 and at least one handle 1150 that enables the fitting cart 1110 transported to games, tournaments, shows, retail stores, and any other location where a ball bat fitting cart would be beneficial. The fitting cart 1110 is configured to retain and make readily accessible the components necessary for implementing the bat customization system 300, 800 and assembling one or more recommended bats, such as 640A. Further customization with user specific graphical and/or alphanumeric indicia or other features, may be performed either at the cart, a retail center, or other offsite location. In other implementations, the fitting cart 1110 can be incorporated into a vehicle or configured as part of an in-store or in shop fitting area. In another implementation, the fitting cart 1110 can be incorporated into a carrier, such as, a back pack, duffel bag, carrying case, sports equipment bag or similar bag.

Figure 37:
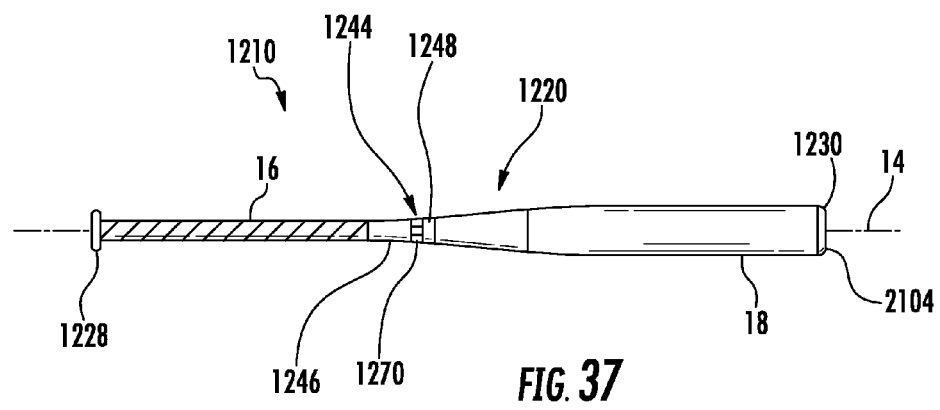
FIG. 37 is a side view of an example bat.

FIG. 37 illustrates bat 1210, an example implementation of bat 10. Bat 1210 is formed from multiple components connected or coupled to one another to facilitate the creation of customized bats from different interchangeable components having different characteristics. Those components of bat 1210 which correspond to bat 10 are numbered similarly. Bat 1210 comprises handle 16, barrel 18, barrel-to-handle connection system 1220, replaceable knob system 1228 and replaceable end cap system 1230. Handle 16 and barrel 18 are described above with respect to bat 10.

Figure 38:
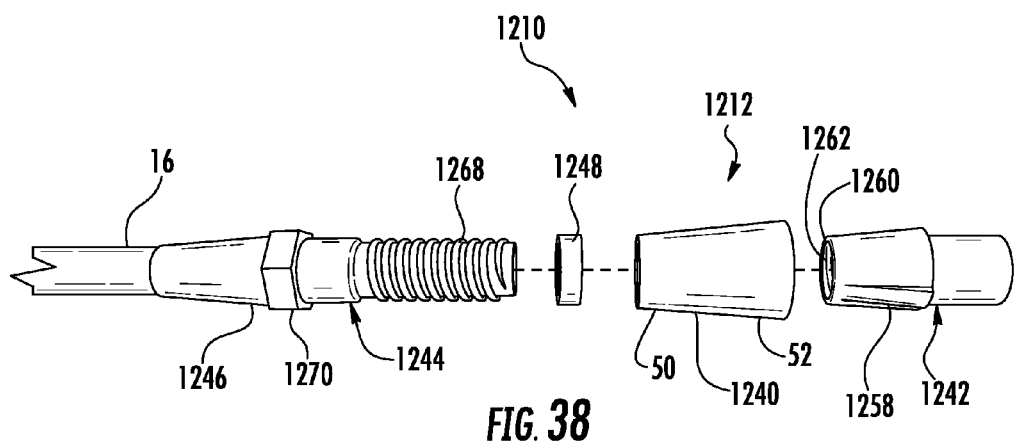
FIG. 38 is an exploded fragmentary view of a portion of the bat of FIG. 37.
Figure 39:
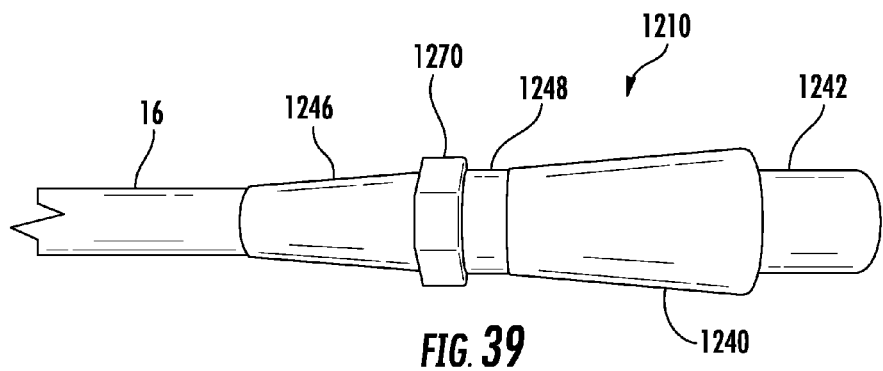
FIG. 39 is a side view of the assembled portion of FIG. 38.

FIGS. 37-39 illustrate connection system 1220. FIG. 37 is an exploded or disassembled view of connection system 1220. FIG. 38 is an assembled view of connection system 1220, omitting barrel 18. FIG. 39 is a sectional view of bat 1210 illustrating connection system 1220. As shown by FIG. 37, connection system 1220 comprises barrel taper 1240, taper connector 1242, handle connector 1244, handle taper 1246 and spacer ring 1248. Barrel taper 1240 is similar to tapered element 20 described above except that barrel taper 1240 is specifically illustrated as including a cavity 1254 for receiving taper connector 1242. Those remaining aspects of barrel taper 1240 can be the same as those of tapered element 20 described above. As with tapered element 20, barrel taper 1240 comprises a tapered proximal region 50 and a barrel engaging region 52. In the example illustrated, barrel engaging region 52 is tapered similar to proximal region 50 such that barrel taper 1240 has a frustoconical shape.

In the example illustrated, inner surfaces of cavity 1254 and outer surfaces of taper connector 1242 are non-symmetric with respect to the centerline 14 of bat 1210 such that taper connector 1242 is keyed within inner cavity 1254 of barrel taper 1242 inhibit relative rotation of taper connector 1242 and barrel taper 1240 about centerline 14. As shown by FIG. 40, barrel taper 1240 comprises an elongate axial channel 1256 that slidably receives a corresponding projection or rib 1258 (shown in FIG. 38) on the exterior surface of taper connector 1242. In other implementations, other keying arrangement can be employed or this keyed relationship between barrel taper 1240 and taper connector 1242 may be omitted.

Taper connector 1242 comprises a structure or member coupled to barrel taper 1240 and configured to cooperate with handle connector 1244 so as to axially draw barrel taper 1240 against the internal bore or interior of barrel 18 to connect barrel 18 to handle 16. In the example illustrated, taper connector 1242 comprises an internal bore 1260 including a connector portion 1262 in the form of internal threads for engaging a corresponding connector portion of panel connector 1244. In the example illustrated, taper connector 1242 is removably received within cavity 1254 of barrel taper 1240 through mouth 1258 at one end but is not passable through the other end of barrel taper 1240. In other implementations, taper connector 1242 is glued, bonded, welded, fastened or otherwise joined to barrel taper 1240. Although taper connector 1242 is illustrated as being frustoconical in shape, in other implementations, taper connector 1242 may have other shapes and configurations, such as being cylindrical.

Handle connector 1244 comprises a structure or member formed as part of or secured to handle 16 and extending from handle 16 through barrel taper 1240 and into connection with taper connector 1242. In the example illustrated, handle connector 1244 comprises handle mounting portion 1266 (shown in FIG. 40), connector portion 1268, and torque receiver 1270. Handle mounting portion 1266 comprises the portion of panel connector 1244 configured to be mounted to handle 16. In the example illustrated, handle mounting portion 1266 comprise a rod or shaft received within the interior of handle 16. In one implementation, handle mounting portion 1266 may be additionally glued, fastened, bonded are welded to handle 16 such that handle 16 and handle mounting portion 1266 rotate together in unison. In another implementation, the handle mounting portion 1266 may extend over and mount to the outer surface of the handle. In another implementation, the handle mounting portion can be coupled to the inner and outer surfaces of the handle.

Connector portion 1268 comprise a structure to connect to connector portion 1262 of taper connector 1242 and to cooperate with connector portion 1262 to axially draw barrel taper 1240 against the interior or internal bore of barrel 18 towards handle 16. In the example illustrated, connector portion 1268 comprises external threads which engage the threads of connector portion 1262. In other implementations, connector portions 1262 and 1268 may have other configurations for connecting substructures and actually drawing barrel taper 1240 and handle 16 towards one another. For example, in one implementation the connector portion 1268 may have an internal bore with internal threads, and the connector portion 1262 may have external threads for engaging the internal threads of the connector portion 1268. In another implementation, connector portion 1262 and 1268 alternatively may comprise bayonet type threads.

Torque receiver 1270 comprises that portion of handle connector 1244 that is configured to receive externally applied torque to rotate handle 16 and panel connector 1244 about centerline 14 so as to draw barrel taper 1240 towards handle 16. In the example illustrated, torque receiver 1270 comprises a polygonal surface, such as the illustrated hexagonal surface, for being received by a wrench or other tool. In yet other implementations, torque receiver 1270 may have other configurations. For example, in another implementation, torque receiver 1270 may include a plurality of circumferentially spaced openings which are to receive pins of a torque applying tool.

Handle taper 1246 comprises a transitional member extending from the outer surface of handle 16 and widening towards barrel taper 1240. In one implementation, handle taper 1246 is glued, but welded, fastened otherwise secured to an external surface of handle 16. In another implementation, the handle taper can be attached to the handle connector. In some implementations, handle taper 1246 is omitted.

Spacer ring 1248 comprises a ring extending about handle connector 1244 and spacing torque connector 1270 from barrel taper 1240. In one implementation, spacer ring 1248 can be frusto-conical. In another implementation, spacer ring 1248 can be cylindrical. The spacer ring 1248 can be used to adjust the overall length of the bat 1210. The spacer ring 1248 can be formed of a predetermined length such as a length between 0.25 inches and 4.0 inches measured with respect to the longitudinal axis 14 of the bat 1210. The bat 1210 may come equipped with two or more spacer rings of varying lengths to provide for quick length adjustment of the bat 1210. In one implementation, two or more spacer rings can be used. In some implementations, spacer ring 1248 can be omitted.

To assemble bat 1210, an end cap system 1230 is actuated to remove an end cap of bat 1210, allowing barrel taper 1240, with the internally received taper connector 1242, to be inserted into barrel 18. Handle connector 1244, extending from handle 16 is inserted through spacer ring 1248 and through barrel taper 1240 until connector portions 1268 engages connector portion 1262. Torque applied to torque receiver 1270 or applied to handle 16 is used to rotate handle 16 and connector portion 1268 such that the threads of connector portion portions 1262 and 1268 axially draw taper connector 1242 towards handle 16. The drawing of taper connector 1242 towards handle 16 results in barrel taper 1240 also being axially drawn towards handle 16 such that barrel engaging portion 52 engages the exterior surface of barrel taper 1240 and is brought into conforming contact and locking engagement with the interior surfaces of barrel 18. In one implementation, the barrel taper 1240 can be configured to fixedly engage the barrel 18. In another implementation, the barrel taper 1240 can be configured to be releasably engaged to the barrel 18.

When a different combination for handle 16 and barrel 18 is desired, torque can be applied to torque receiver to 1270 to rotate connector portion 1268 of handle connector 1244 relative to connector portion 1262 of taper connector 1242 until connector portions 1268 and 1262 disengage from one another. Once handle connector 1244 is disconnected from taper connector 1242 and taper 1240 such that barrel 18 is disconnected from handle 16, a new differently configured handle 16 having its own associated handle connector 1244 may be once again inserted through barrel taper 1240 and into engagement with taper connector 1242. Alternatively, a different barrel having a different configuration (weight, length, construction) and carrying its own associated barrel taper 1240 and taper connector 1242 may be connected to connector portion 1268 of handle connector 1244.

Figure 42:
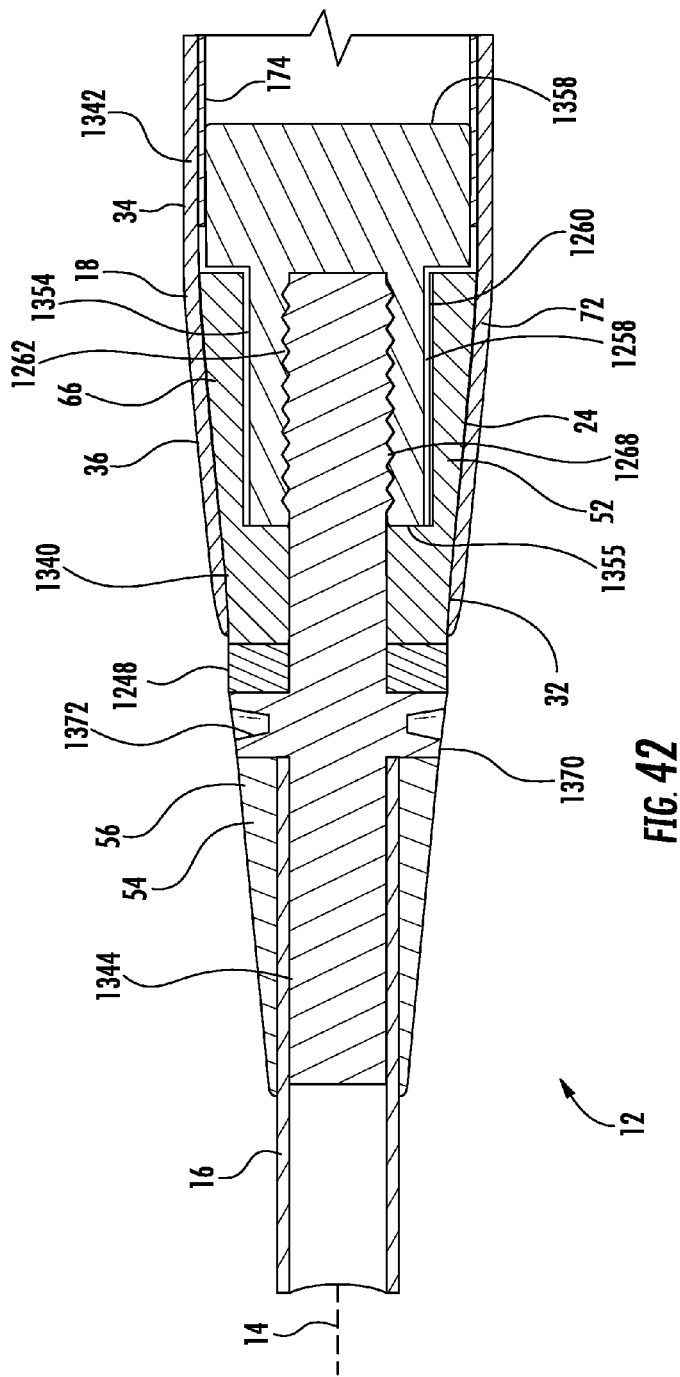
FIG. 42 is a sectional view of the portion of the bat of FIG. 41.

FIGS. 41 and 42 illustrate barrel-to-handle connection system 1320, another implementation of connection system 1220. Connection system 1320 is similar to connection system 1220 except that system 1320 comprises barrel taper 1340, taper connector 1342 and handle connector 1344. Those remaining components of connection system 1320 which correspond to components of connection system 1220 are numbered similarly or are described above with respect to connection system 1220.

Barrel taper 1340 is similar to barrel taper 1240 except that barrel taper 1340 comprises an inner cavity 1354 which is cylindrical, terminating at a shoulder 1355. Taper connector 1342 is similar to taper connector 1242 except that the portion of taper connector 1342 received within cavity 1354 is also cylindrical and except that taper connector 1342 additionally includes head 1358. Head 1358 widens outwardly from centerline 14 towards the internal or interior surfaces of barrel 18. As shown by FIG. 42, head 1358 is received within and supports insert 174 (described above). Head 1358 supports insert 174 in close proximity with the interior surface of barrel 18. In one implementation, head 1358 supports insert 174 such that the exterior surface of insert 174 is spaced from the interior surface of barrel 18 by less than or equal to 0.125 inches. In other implementations, head 1358 is omitted.

Handle connector 1344 is similar to handle connector 1244 except that handle connector 1344 comprises torque receiver 1370 in place of torque receiver 1270. Torque receiver 1370 is similar to torque receiver 1270 except that receiver 1370 has an outer surface that closely conforms to the outer surface of the proximate portions of barrel 18 and the proximate portions of handle taper 1246. Torque receiver 1370 comprises a plurality of detents or pinholes 1372 sized and located to receive corresponding pins of a torque applying tool.

Figure 43:
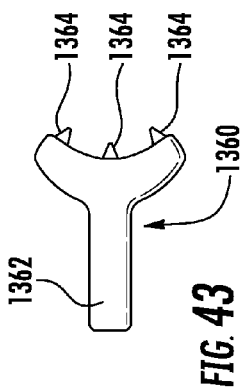
FIG. 43 is a top view of an example tool for use with the bat of FIG. 41.

FIG. 43 illustrates one example of a torque applying tool 1360 that may be used in conjunction with torque receiver 1370 to rotate handle 16 and panel connector 1344 relative to taper connector 1342 or alternatively to maintain handle 16 in place as barrel 18 and taper connector 1342 are rotated. As shown by FIG. 42, torque applying tool 1360 comprises handle 1362 and engagement pins 1364. Engagement pins 1364 are arranged in size so as to be received within pinholes 1372 to facilitate gripping of handle connector 1344 and handle 16 by tool 1360. In other implementations, tool 1360 may have other configurations to facilitate gripping of handle 16 or the application of torque to handle 16 to connect or disconnect handle 16 from barrel 18 by connecting or disconnecting connector portions 1262 and 1268.

Figure 44:
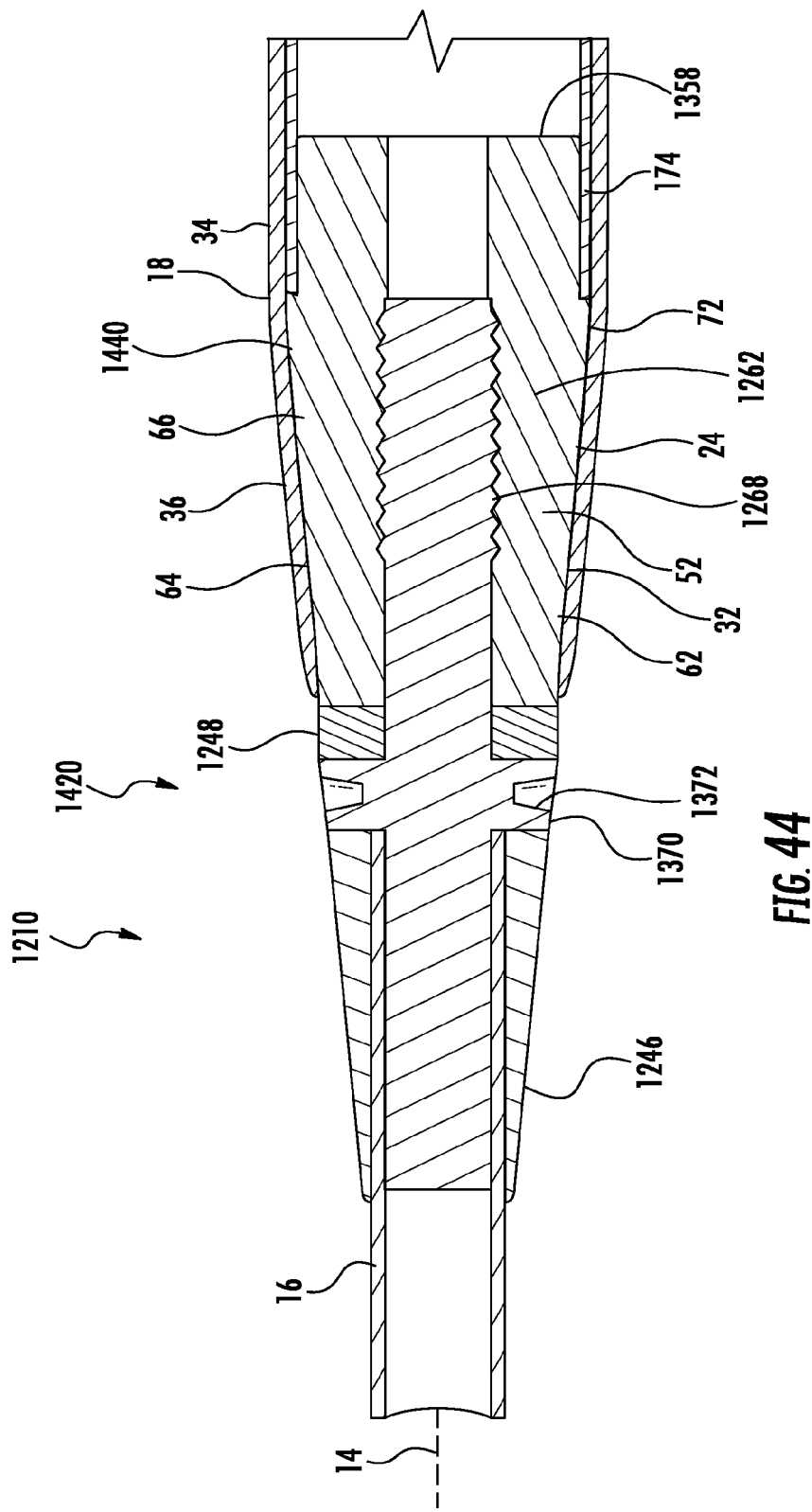
FIG. 44 is a sectional view of a portion of an alternative implementation of the bat of FIG. 37.

FIG. 44 is a sectional view illustrating barrel-to-handle connection system 1420, another implementation of connection system 1220. Connection system 1420 is similar to connection system 1220 except that system 1420 comprises barrel taper 1440 in place of both barrel taper 1340 and taper connector 1342. Those remaining components of connection system 1420 which correspond to components of connection system 1220 and 1320 are numbered similarly. As shown by FIG. 44, barrel taper 1440 is integrally formed as part of a single unitary body or single solid unit effectively combining the functions of barrel taper 1340 and taper connector 1342. The barrel taper cannot be separated from the taper connector. As with barrel taper 1340, barrel taper 1440 has a tapering outer surface or frustro-conical barrel engaging surface 52 which engages the interior surface 32 of barrel 18. Although illustrated as minimally projecting from barrel 18, in other implementations, barrel taper 1440 extends a greater distance from barrel 18 towards handle 16. As with taper connector 1342, barrel taper 1440 comprises connector portion 1262 which cooperates with connector portion 1268 to connect barrel taper 1440 to handle connector 1244 and handle 16 while facilitating the axial drawing of barrel taper 1440 towards handle 16. As with taper connector 1342, barrel taper 1440 comprises head 1358 which is received within and supports insert 174. In one implementation, the barrel taper 1440 can be configured to fixedly engage the barrel 18. In another implementation, the barrel taper 1440 can be configured to be releasably engaged to the barrel 18. In some implementations, head 1358 is omitted.

Figure 45:
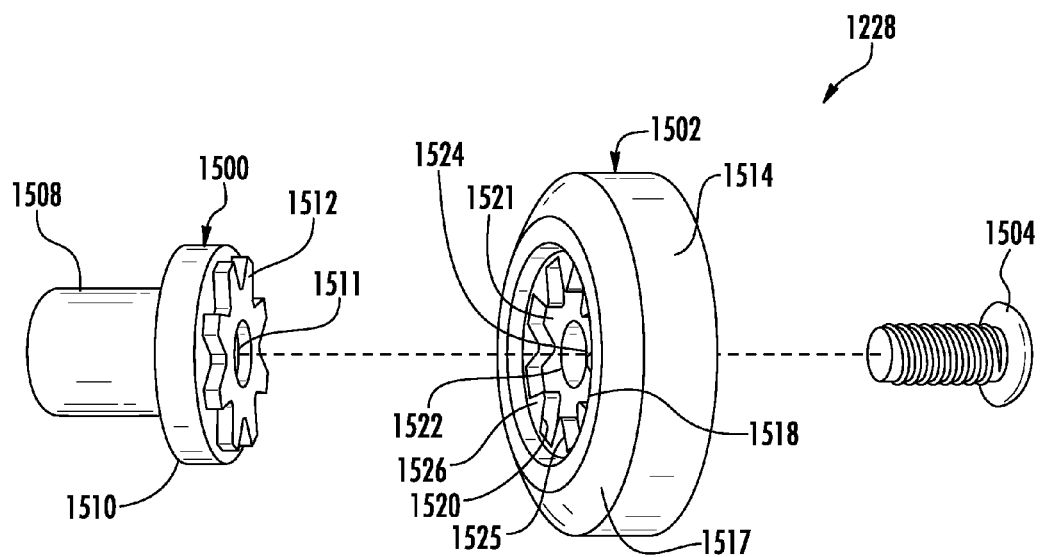
FIG. 45 is an exploded perspective view of an example removable knob system.
Figure 46:
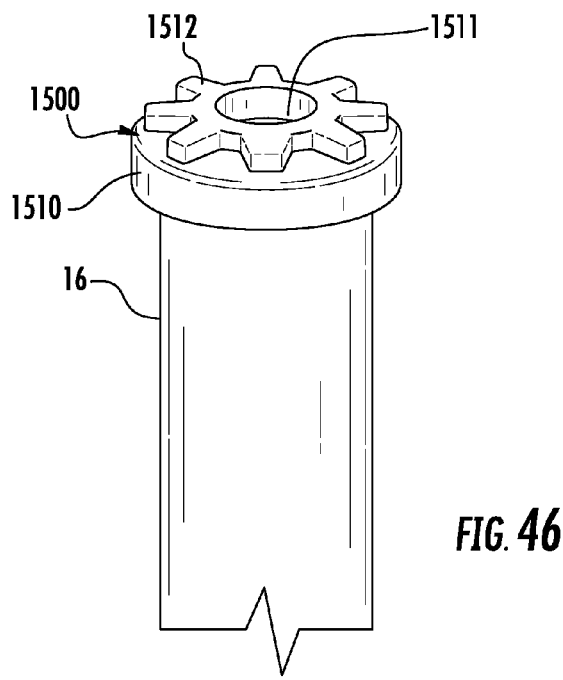
FIG. 46 is a side view of a handle of the bat of FIG. 37 supporting an example base of the removable knob system of FIG. 45.
Figure 47:
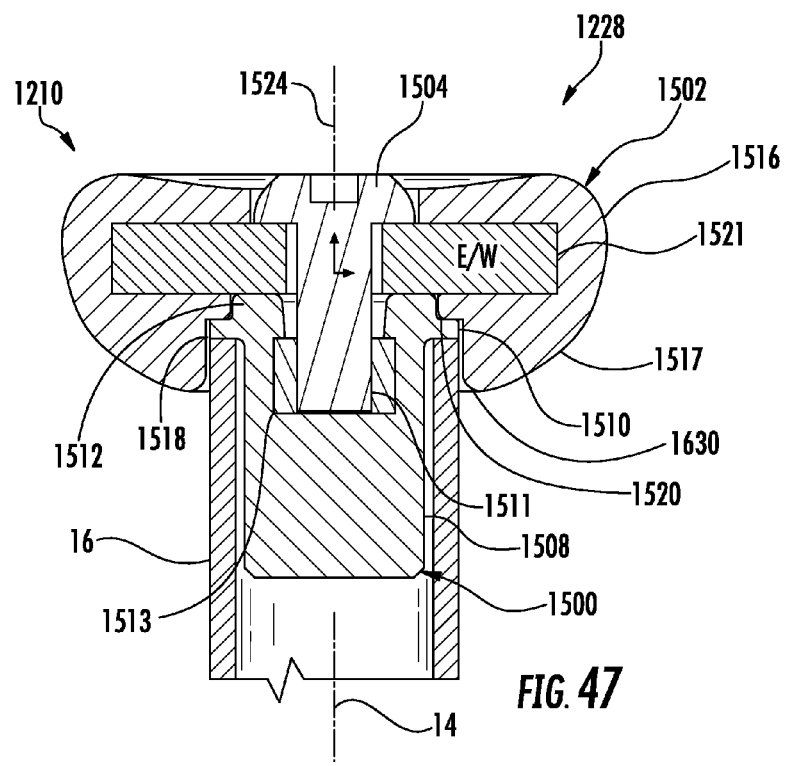
FIG. 47 is a sectional view of the removable knob system of FIG. 45 mounted to the handle of the bat of FIG. 37.

FIGS. 45-47 illustrate replaceable knob system 1228. FIG. 45 is an exploded perspective view of system 1228. FIG. 47 is a sectional view of system 1228 joined to handle 16. As shown by FIG. 45, replaceable knob system 1228 comprises base 1500, knob 1502 and fastener 1504. Base 1500 comprises a structure extending from a proximal end of handle 16 and facilitating removal or interchangeable mounting of different knobs, such as knob 1502, to the end of handle 16.

In the example illustrated, base 1500 comprises a body comprising plug 1508, head 1510, threaded bore 1511 and base key 1512. As shown by FIGS. 46 and 47, plug 1508 comprises that portion of base 1500 configured to be received within handle 16. In one implementation, plug 1508 is cylindrical and is sized to be press fit within handle 16. In one implementation, plug 1508 is additionally or alternatively bonded, fused or welded to handle 16. In yet another implementation, plug 1508 is snap fit within the interior of handle 16. For example, in one implementation, the interior of handle 16 may include one or more teeth angled away from the end of handle 16, whereas the exterior surface of plug 1508 also includes teeth angled in the same direction as the interior teeth of handle 16, wherein one or both of the teeth of handle 16 and plug 1508 resiliently flex during insertion of plug 1508 into handle 16, but flex to a much lesser extent or not all during an attempt to withdraw plug 1508 from handle 16, inhibiting or resisting withdrawal of plug 1508 from handle 16. In yet another implementation, plug 1508 is secured to handle 16 by one of more fasteners passing through the walls of handle 16 and into or through plug 1508.

Head 1510 comprises a structure extending from plug 1508 and supports base key 1512. Head 1510 can have a diameter wider than plug 1508. Head 1510 supports base key 1512. In the example illustrated, head 1510 is sized and shaped to be received within a corresponding cavity of knob 1502. As shown by FIG. 47, head 1510 is received within knob 1502 such that knob 1502 overlaps a junction of base 1500 and the proximal end of handle 16 to conceal base 1500 and reduce a number of exposed edges or seams.

Threaded bore 1511 comprises an internally threaded bore for cooperating with fastener 1504 to releasably secure knob 1502 to base 1500. As shown by FIG. 47, in the example illustrated, base 1500 comprises an internally threaded insert 1513, such as a nut, secured in place within plug 1508. In one implementation, insert 1513 comprises a metal nut about which plug 1508, comprising a polymer, is molded. In other implementations, internal threads of bore 1511 are formed within the material forming plug 1508. In other implementations, threaded bore 1511 may be omitted or places other mechanisms depending upon the configuration of fastener 1504 or other mounting mechanisms used to releasably secured knob 1502 to base 1500.

Base key 1512 comprises one or more keying surfaces which mate with corresponding keying surfaces of knob 1502 to resist rotational movement of knob 1502 relative to plug 1508 and handle 16 about centerline 14 of bat 1210. The base key 1512 is one example of knob engaging structure. The knob engaging structure inhibits rotation of the knob with respect to the base about the axis 14. In the example illustrated, base key 1512 comprises keying projections extending from head 1510 that are to be received within corresponding keying detents of the knob 1502. In another implementation, base key 1512 may alternatively comprise keying detents extending into head 1510 which are to receive corresponding keying projections extending from knob 1502. In the example illustrated, base key 1512 comprises a raised asterisk or star shaped structure centered about centerline 14 and having at least three equally spaced points. In the example illustrated, base key 1512 comprises a raised star shaped structure having eight equally spaced points. In other implementations, base key 1512 may have other non-circular shapes which when keyed to corresponding keying surface of knob 1502 resist rotation of knob 1502.

In the example illustrated, base 1500 is illustrated as a separate component which is glued, bond, welded, snapped or fastened to handle 16. In other implementations, base 1500 is integrally formed a single unitary body with handle 16. For example, in one implementation, base 1500 is molded as part of handle 16 at an end of handle 16. In another implementation, an end portion of handle 16 is solid, wherein base 1500 is carved or otherwise formed into the solid end portion of handle 16.

Knob 1502 comprises a member having an outer diameter greater than an outer diameter of handle 16, wherein knob 1502 is to be releasably secured to or mounted to base 1500 proximate to the end of handle 16. In the example illustrated, knob 1502 comprises head 1516, cavity 1518, knob key 1520, weight insert 1521 and aperture 1522. Head 1516 comprises a body in the shape of a circular disk having rounded perimeter edges 1517. Perimeter edges 1517 are rounded and are uniformly radially spaced from a central axis 1524 of knob 1502. Axis 1524 is located so as to coincide with the centerline 14 of bat 1210 when knob 1502 is secured to base 1500.

Cavity 1518 comprises a recess formed in a side of knob 1502 to face base 1500. As shown by FIG. 47, cavity 1518 receives head 1510 and end portions of handle 16 to conceal base 1500. In other implementations, cavity 1518 can be omitted.

Knob key 1520 comprises one or more keying surfaces which mate with base key 1512 to resist rotational movement of knob 1502 relative to plug 1508 and handle 16 about centerline 14 of bat 1210. In one implementation, such keying surfaces are in the form of facets 1525 about axis 1524. In the example illustrated, knob key 1520 comprises keying recesses extending into floor 1526 of cavity 1518 and forming sideways facing surfaces or facets 1525. The keying recesses of knob key 1520 are configured (sized and shaped) to receive the corresponding keying projections of base key 1512. In another implementation, knob key 1520 may alternatively comprise keying projections extending from floor 1526 which are to be received by corresponding keying detents or recesses extending into head 1510 of base 1500. In the example illustrated, knob key 1518 comprises as asterisk or star shaped recess centered about axis 1524 and having at least six equally spaced points and 12 equally spaced facets 1525 (six facets facing in a clockwise direction about axis 1524 and six facets facing in a counterclockwise direction about axis 1524). In the example illustrated, knob key 1520 comprises a star shaped recess having eight equally spaced points and 16 equally spaced facets 1525 (each of the eight points having a first facet facing in a clockwise direction about axis 1524 and a second facet facing in a counterclockwise direction about axis 1524). In other implementations, knob key 1520 may have other non-circular shapes which when keyed to corresponding keying surfaces of base 1500 resist rotation of knob 1502 about the centerline of bat 1210 when mounted to bat 1210. For example, the knob key can include a star shape with 3 or more facets. In another implementation, the knob key can have a polygonal shape such as triangular, square, pentagonal, hexagonal, etc.

Weight insert 1521 comprises a member at least partially embedded within, or contained within, head 1516. In one implementation, weight insert 1521 is formed from one or more materials such that weight insert 1521 as a density greater than the density of head 1516. In one implementation, weight insert 1521 is formed from one or more metals, such as aluminum or steel, whereas head 1516 is formed from one or more lower density polymers molded or formed about weight insert 1521. In yet another implementation, weight insert 1521 is inserted through a side opening into head 1516 and then secured in place. Weight insert 1521 facilitates different knobs 1502 having the same outer configuration to have different weights, facilitating customization of bat 1210. In other implementations, weight insert 1521 is omitted, wherein head 1516 is hollow in such locations or is solid or closed or open celled in such locations. In other implementations, weight insert can be two or more inserts included within the knob. In other implementations, weight insert is an additive added to the material used to form the knob providing the knob with extra weight. For example, metallic particles can be interspersed within a polymeric material used to form the knob to increase the weight of the knob.

In other implementations, the weight insert 1521 can be replaced with an electronics element. The electronics element 1521 can also have a weight or a varied weight such that the electronics element 1521 can serve a dual purpose of containing electronics and adding or varying the weight of the knob 1502. Electronics/weight 1521 can be positioned in the knob 1502 in the same manner as the weight insert 1521 described above. Accordingly, the weight insert 1521 and the electronics element 1521 can be one in the same. In one implementation, the electronics of the element 1521 can be captured or retained within an interior cavity of the knob 1502 by an adhesive, epoxy, potting or other material. In one implementation, electronics element 1521 comprises a block of electronics comprising a sensor, such as, one or more accelerometers, magnetometers, force or impact sensors, combinations thereof, and the like. In one implementation, electronics element 1521 additionally comprises a wireless transmitter, such as an antenna, and/or in a logical connection to a port by which wired connection or communication may be made with bat 1210. In yet another implementation, electronics element 1521 further comprises a processing unit and memory, wherein the processing unit receives signals from the one or more sensors and stores data based upon the signals in the memory for later retrieval via the wired or wireless connection. In yet another implementation, the processing unit communicates the signals or modifies the signals, such as by compression or filtering, prior to communicating the signals, in real-time, to an external recipient via the port or via the wireless transmitter.

Aperture 1522 extends through head 1516 and through weight insert 1521 along axis 1524. Aperture 1522 is sized and located to receive fastener 1504. Fastener 1504 comprises a bolt. As shown by FIG. 47, fastener 1504 is passed through aperture 1522 and into threaded engagement with threaded bore 1511 to releasably secure knob 1502 to base 1500. To exchange a current knob 1502 with an alternative knob 1502 having a different shape or weight, fastener 1504 is unscrewed from threaded bore 1511 to allow the current knob 1502 to be replaced. In other implementations, fastener can take other forms.

Figure 48:
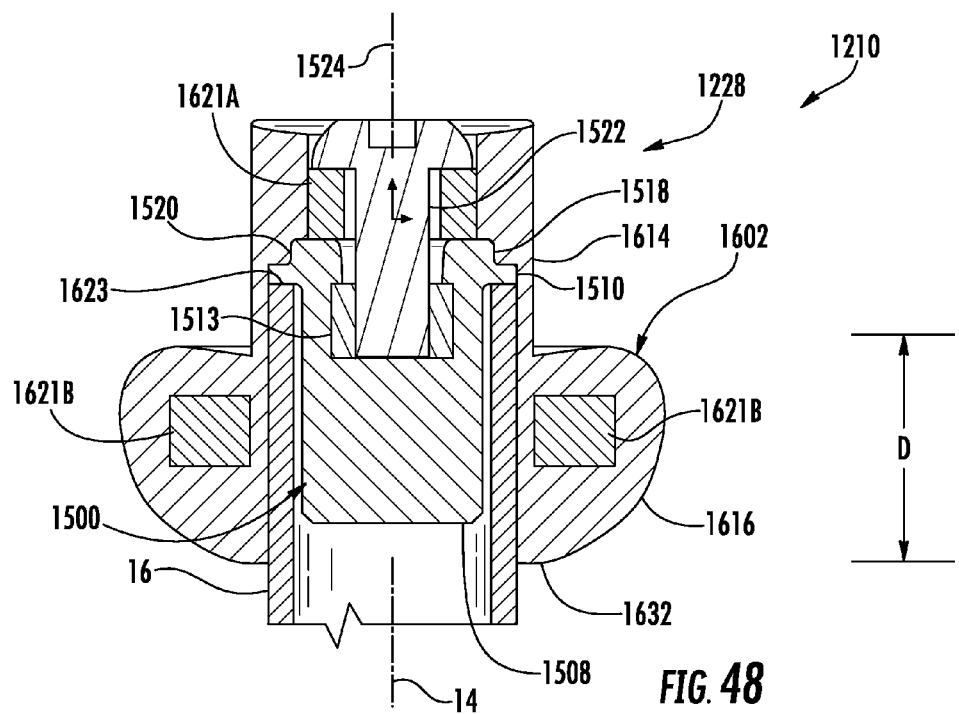
FIG. 48 is a sectional view of an alternative implementation of the removable knob system FIG. 45 mounted to the handle of the bat of FIG. 37.

FIG. 48 is a sectional view of replaceable knob system 1228 with knob 1502 replaced with knob 1602. Knob 1602 is similar to knob 1502 except that head 1516 is replaced with neck portion 1614 and head 1616 and that weight insert 1521 is replaced with weight inserts 1621A, 1621B. Neck portion 1614 comprises cavity 1518, knob key 1520 and aperture 1522 described above. Neck portion 1614 can contain weight insert 1621A which extends about aperture 1522. Neck portion 1614 forms a bore that receives and surrounds end portions of handle 16, allowing neck portion 1614 to extend along sides of handle 16 and supports head 1616 at a location spaced from the axial end of bat 1210, spaced from the head 1510 of base 1500 towards barrel 18.

Head 1616 is similar to head 1516 of knob 1502 except that had 1616 is closer to barrel 18. In the example illustrated, head 16 and 16 carries weight insert 1621B. In the example illustrated, weight insert 1621B is an annular ring about which the material forming head 1616 is molded. In other implementations, head 1616 may omit weight insert 1621B. In other implementations, head 1616 may have other shapes or sizes. In other implementations, the threaded bore 1511 and/or the threaded insert 1513 can be positioned further into the base 1510 such that the fastener 1504 extends through at least a majority of the axial length of the base 1510.

As shown by FIGS. 46 and 47, knob replacement system 1228 allows a person to replace knob 1502 with knob 1602. Such replacement results in bat 1210 having a knob 1602 with a head 1616 that is closer to barrel 18 with both the top and bottom of head portion 1616 spaced from a proximal end 1623 of the handle 16, and extending about handle 16. As a result, even though the actual length of bat 1210 with knob 1602 is the same as a length of bat 1210 with knob 1502, the effective length of bat 1210 with knob 1602 is reduced. Knob 1602 allows a person to "choke up" on the bat while offering the stability provided by knob 1602 at the "choked-up" gripping position. Although knob 1602 is illustrated as effectively shortening the length of bat 1210 by the distance D (the axial positioning of the top surface 1630 of knob 1502 shown in FIG. 47 as compared to the axial positioning of the top surface 1632 of knob 1602 shown in FIG. 48), in other implementations, neck portion 1614 may have other axial lengths to support head 1616 at other locations spaced from and positioned axially actually along centerline 14. In one implementation, the distance D is within the range of 0.1 to 3.0 inches. In one implementation, knob replacement system 1228 comprises knob 1502, knob 1602 and a plurality of other knobs similar to knob 1602 but supporting head 1616 at other positions axially along centerline 14. As a result, in such implementations, knob replacement system 1228 allows a person to adjust the axial location of head 1616 relative to handle 16 as the person grows older or improve his or her skills by simply replacing one knob for another knob. For example, a young person may utilize a knob which shortens the effective length of bat 1210 by a first distance, similar to choking up on the bat by a first distance. An older or larger person may utilize the same bat 1210, but with a different knob, such as a different knob which shortens the effective length of bat 1210 by a second distance less than the first distance or such as knob 1502 in which the effective length of the bat is not reduced.

Figure 49:
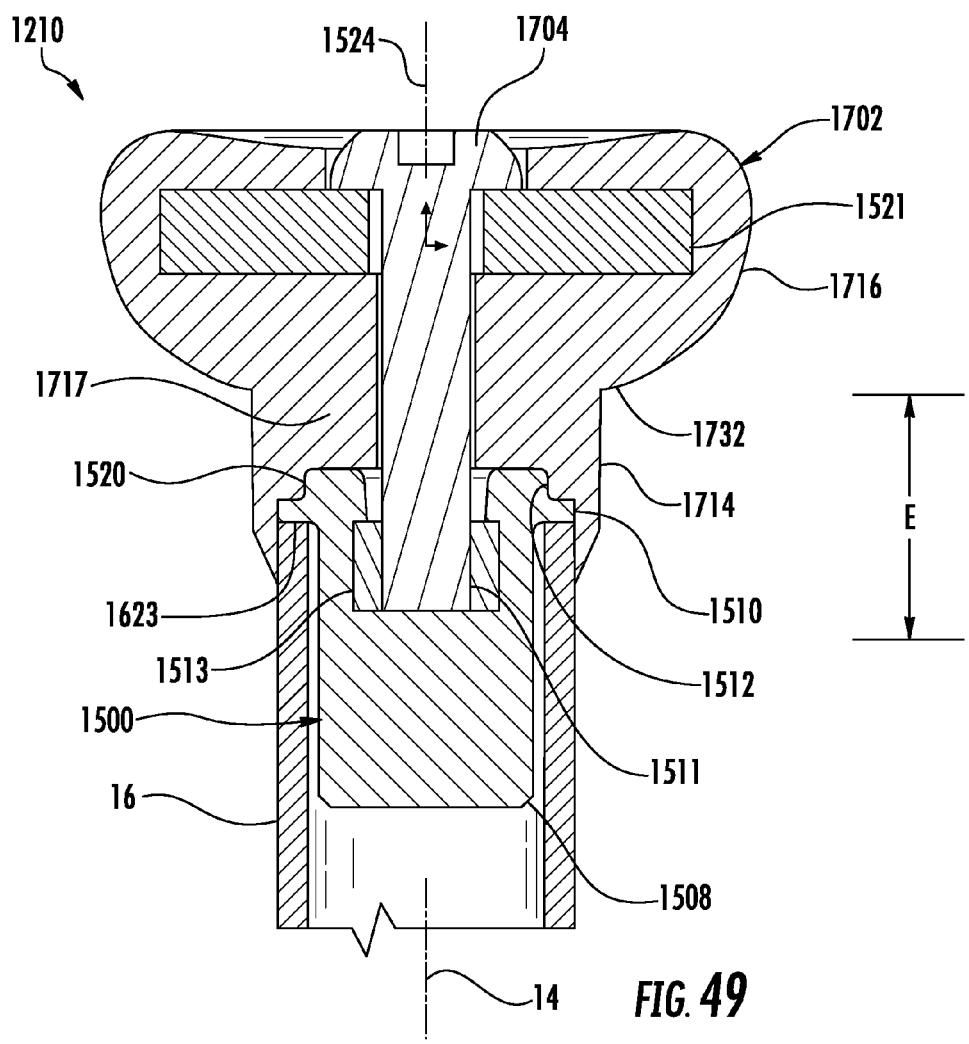
FIG. 49 is a sectional view of an alternative implementation of the removable knob system of FIG. 45 mounted to the handle of the bat of FIG. 37.

FIG. 49 illustrates knob replacement system 1228 with knob 1502 replaced with knob 1702. Knob 1702 is configured to be removably mounted or secured to base 1500 in place of knob 1502 or knob 1602. Knob 1702 is similar to knob 1502 except that knob 1702 comprises neck portion 1714 and had 1716. Those remaining components of knob 1702 which correspond to components of knobs 1502 or 1602 are numbered similarly.

Neck portion 1714 is similar to neck portion 1614 (shown in FIG. 48) except that neck portion 1714 extends away from head 1510 of base 1500 in a direction away from barrel 18 (shown in FIG. 1). Neck portion 1614 supports and spaces head 1716 away from and 1623 of handle 16 and at a spaced location from knob key 1520. Neck portion 1714 includes a central bore 1717 through which fastener 1704 extends into engagement with threaded bore 1511 of base 1500. Fastener 1704 similar fastener 1504 except the faster 1704 has a longer length to accommodate the length of neck portion 1714.

Head 1716 is similar to head 1516 except that head 1716 is supported by neck portion 1714 rather than resting directly upon head 1510 of base 1500. As shown by FIG. 49, knob replacement system 1228 allows a person to replace knob 1502 with knob 1702. Such replacement results in bat 1210 having a head 1716 that is farther from barrel 18 with both the top and bottom of head 1716 being axially spaced from end 1623. As a result, the length of bat 1210 with knob 1702 is increased. Knob 1702 allows a person to extend the length of the bat as the person grows or his or her skills and/or preferences change. Although knob 1702 is illustrated as lengthening bat 1210 by the distance E (the axial positioning of the top surface 1630 of knob 1502 shown in FIG. 47 as compared to the axial positioning of the top surface 1732 of knob 1702 shown in FIG. 49), in other implementations, neck portion 1614 may have other axial lengths to support head 1616 at other locations spaced from end 1623 axially along centerline 14 by other distances. In one implementation, the distance E can be within the range of 0.1 to 2.0 inches. In one implementation, knob replacement system 1228 comprises knob 1502, knob 1602, knob 1702 and a plurality of other knobs similar to knob 1702 but supporting head 1716 at other positions axially along centerline 14. As a result, in such implementations, knob replacement system 1228 allows a person to adjust the axial location of head 1616 relative to handle 16 as the person grows older or improves his or her skills by simply replacing one knob for another knob. For example, a young person may utilize a knob which extends the length of bat 1210 by a first distance. An older or larger person may utilize the same bat 1210, but with a different knob, such as a different knob which lengthens bat 1210 by a second greater distance.

Figure 50:
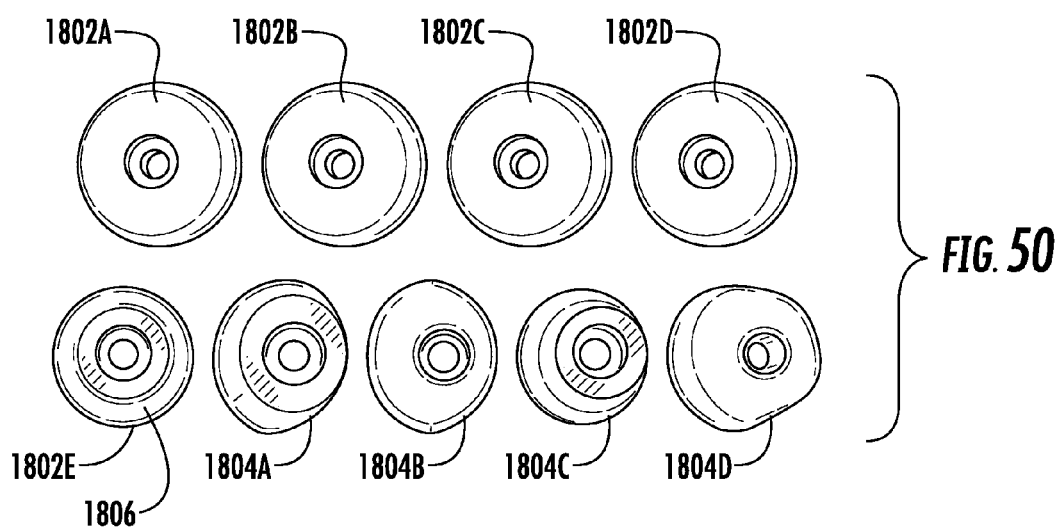
FIG. 50 is a top view of an example set of interchangeable knobs for the bat of FIG. 37.
Figure 51:
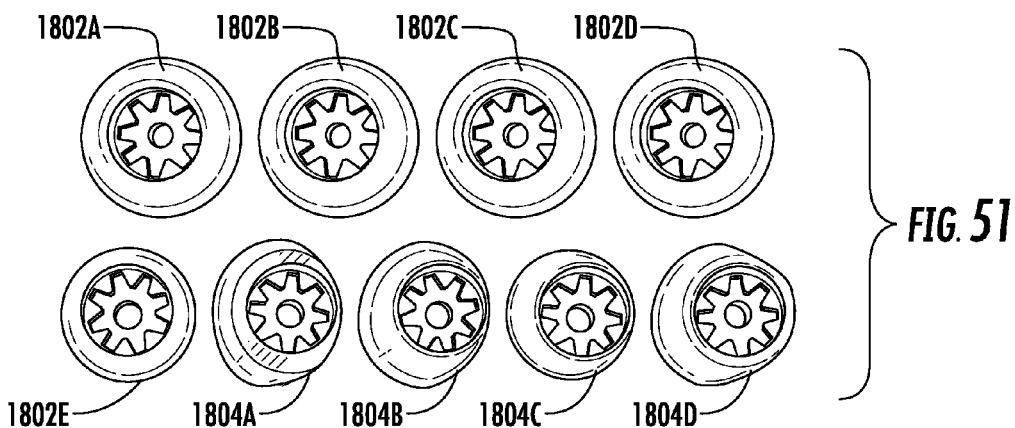
FIG. 51 is a bottom view of the example set of interchangeable knobs of FIG. 50.

FIGS. 50 and 51 illustrate a series of interchangeable knobs: symmetrical knobs 1802A, 1802B, 1802C, 1802D, 1802E (collectively referred to as knobs 1802); and asymmetrical knobs 1804A, 1804B, 1804C and 1804D (collectively referred to as knobs 1804). Knobs 1802, 1804 are each configured to be interchangeably mounted upon base 1500 described above. Knobs 1802 are similar to knob 1502 except that each of knobs 1802 has a differently sized head 1516, a different weight, and/or a differently sized or formed weight insert 1521. In the example illustrated, knob 1802A has a weight of 2.35 ounces, knob 1802B has a weight of 0.83 ounces, knob 1802C has a weight of 2.45 ounces and knob 1802D has a weight of 0.9 ounces. In other implementations, such knobs may have different individual weights. Knob 1802E is similar to knob 1802A but for its shape, wherein knob 1802D has a lower face (shown FIG. 47) which includes an annular groove 1806.

Knobs 1804 are similar to knob 1502 except that knobs 1804 have heads that asymmetrically extend about axis 1524. Each of knobs 1804 has a different asymmetric shape and/or has a different associated weight. As will be described hereafter with respect to FIGS. 52-66, the asymmetrical shape of knobs 1804 provides a player who prefers to grip the bat at the extreme (proximal) end of the handle 16 with an alternative shape for facilitating gripping and swinging of the bat. The asymmetrical shape of such knobs can reduce discomfort that otherwise occurs when gripping over and beyond symmetrical, circular knobs.

Figure 52:
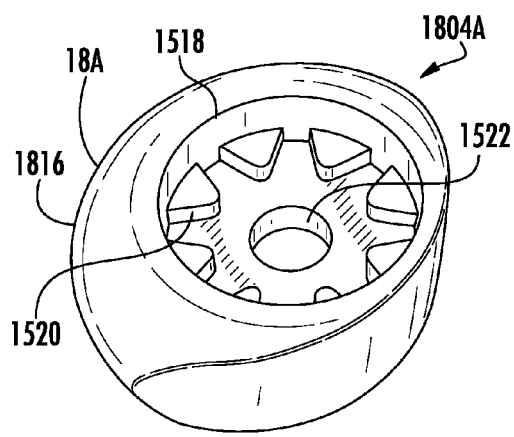
FIG. 52 is a bottom perspective view of an example knob for the bat of FIG. 37.
Figure 53:
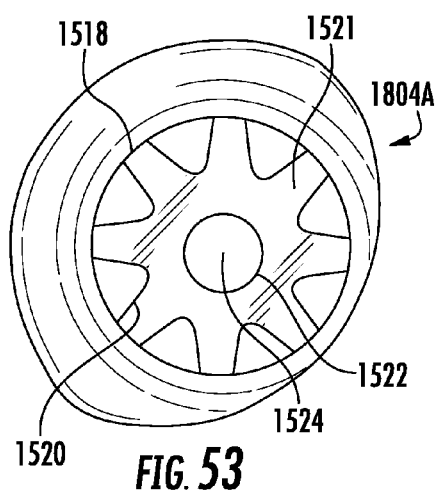
FIG. 53 is a bottom view of the knob of FIG. 52.
Figure 54:
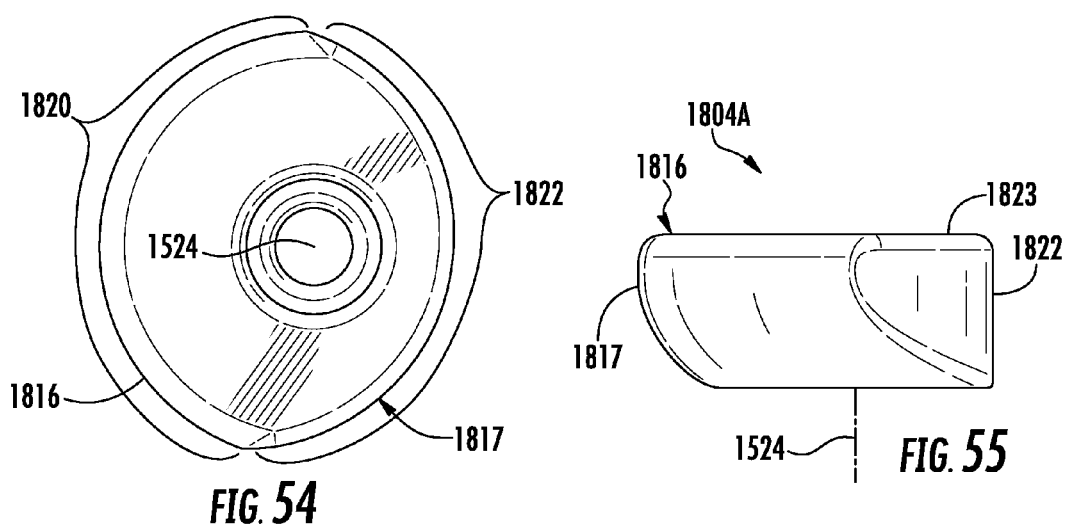
FIG. 54 is a top view of the knob of FIG. 52.

FIGS. 52-58 illustrate knob 1804A in more detail. As shown by FIGS. 52 and 53, similar to knob 1502, knob 1804A comprises head 1516, cavity 1518, knob key 1520, weight insert 1521 and aperture 1522, described above. However, unlike knob 1502, knob 1804A has a head 1816 with an outer edge or perimeter 1817 that asymmetrically extends about axis 1524. As shown by FIG. 54, in the example illustrated, perimeter 1817 comprises perimeter portions 1820 which are radially spaced from axis 1524 by one or more first radial distances and perimeter portions 1822 which are radially spaced from axis 1524 by one or more second radial distances, each of the second radial distances being less than each of the first radial distances that space perimeter portions 1820 from axis 1524. In the example illustrated, each of the perimeter portions 1820 is equally radially spaced from axis 1524 while perimeter portions 1822 have a continuously varying radial spacing from axis 1524. Because perimeter portions 1822 are radially spaced from axis 1524 by one or more distances less than the one or more radial distances separating axis 1524 and perimeter portions 1820, a person may more easily grip over and about knob 1804A, with portions of the person's hand extending beyond an end of knob 1804A. Because perimeter portions 1822 project a shorter radial distance from axis 1524 and the centerline 14 of the bat 1210, such perimeter portions 1822 are less likely to dig into the person's hand, allowing a person to achieve a closer conformal grip about both handle 16 and perimeter portions 1822 for a more secure and reliable grip. In other implementations, perimeter portions 1820 are radially spaced from axis 1524 by varying radial distances and/or permit of portions 1822 are radially spaced from axis 1524 by a single uniform radial distance.

Figure 55:
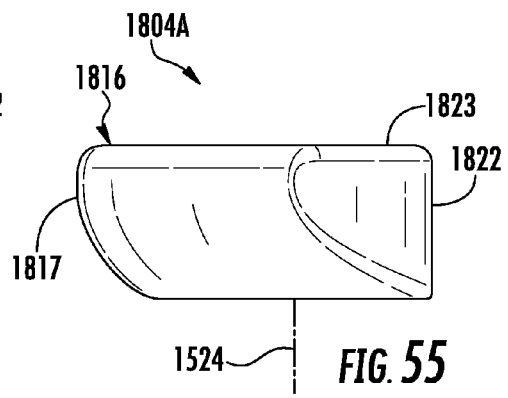
FIG. 55 is a side view of the knob of FIG. 52.

In the example illustrated, perimeter portions 1822 extend at least 100 degrees about axis 1524 and nominally at least 180 degrees about axis 1524. In the example illustrated portions 1822 extend at least 200 degrees about axis 1524. As shown by FIG. 55, head 1816 has a substantially flat bottom 1823. Perimeter portions 1820 are curved or rounded in a direction towards barrel 18 (the top of knob 1804A) from bottom 1823 while perimeter portions 1822 are linear or flat (such surfaces extending parallel to axis 1524). The flat profile of perimeter portions 1822 further enhances the ability of a person to grip about both handle 16 and perimeter portions 1822 of knob 1804A, allowing a person to grip about knob 1804A in closer proximity to the outer surface of handle 16. In other implementations, perimeter portions 1822 may alternatively have a slightly curved, rounded or conventionally curved shape.

Figure 56:
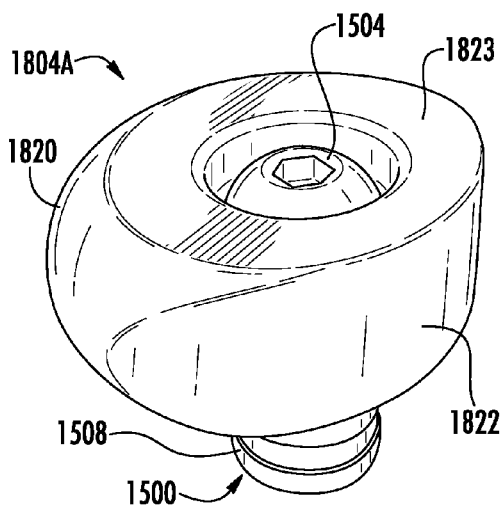
FIG. 56 is a perspective view of the knob of FIG. 52 mounted to an example base of the removable knob system of FIG. 45.
Figure 57:
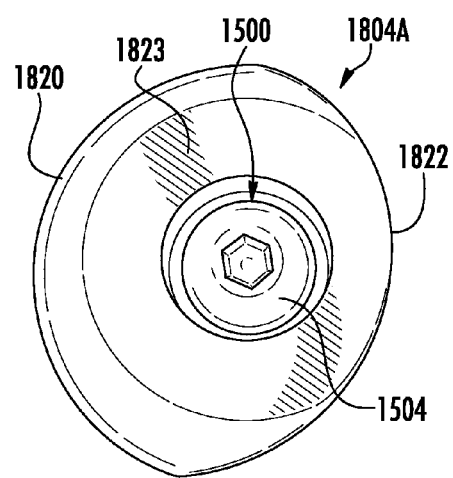
FIG. 57 is a top view of the knob and base of FIG. 56.
Figure 58:
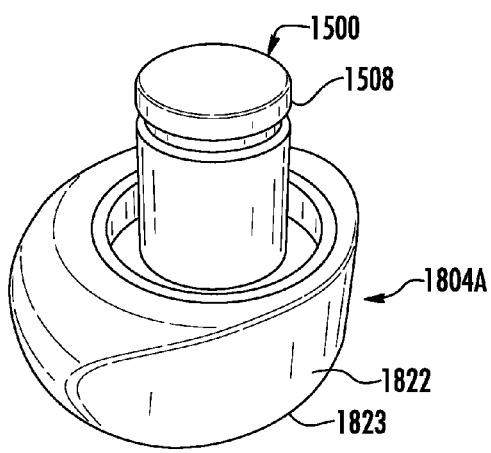
FIG. 58 is a bottom perspective view of the knob and base of FIG. 56.

FIGS. 56-58 illustrate knob 1804A removably fastened to base 1500. In such a state, knob 1804A and base 1500 are already connected for coupling to handle 16 with plug 1508 being inserted into the interior of handle 16. In another implementation, knob 1804A is permanently or fixedly secured to base 1500 or is integrally formed as part of a single unitary body with base 1500, wherein plug 1508 is configured to be removably mounted within handle 16 such as with interlocking teeth formed on the interior of handle 16 and on the exterior of plug 1508. In yet another implementation, plug 1508 is to be glued, bonded or welded within handle 16 while being integrally formed as part of or permanently fixed to knob 1804A. In such an implementation, 1210 is customizable at the state of manufacture by mounting a selected knob and base having a desired configuration to handle 16. In other implementations, the two or more of the knobs 1802 and/or 1804 can have respective bases 1500 attached to them. The attachment of the base 1500 to the knob can be removable or can be fixed. In one implementation, the base and the knob can be integrally formed as one-piece that is not configured to be separated. In such an implementation, each of the replaceable knobs includes its own base.

Figure 59:
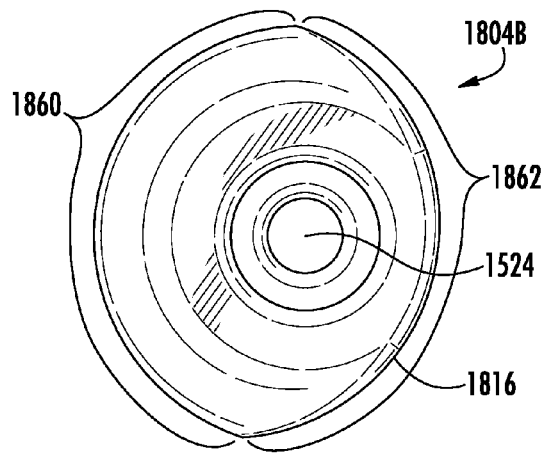
FIG. 59 is a bottom view of another example knob of the removable knob system of FIG. 45.
Figure 60:
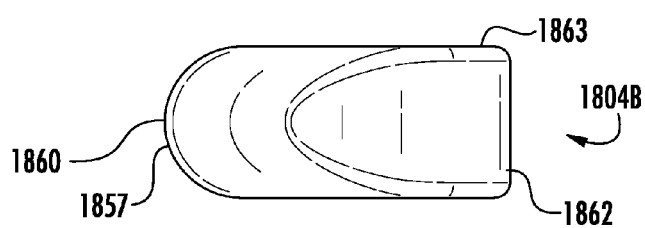
FIG. 60 is a side view of the knob of FIG. 59.

FIGS. 59 and 60 illustrate knob 1804B. Knob 1804B is similar to knob 1804A except that knob 1804B comprises perimeter 1857 in place of perimeter 1817. Similar to perimeter 1817 which comprises perimeter portions 1820 and 1822, perimeter 1857 comprises perimeter portions 1860 and 1862, respectively. Perimeter portions 1862 are similar to perimeter portions 1822. However, perimeter portions 1860 are different than perimeter portions 1820 in that perimeter portions 1820 are uniformly rounded or curved such that, in contrast to perimeter portions 1820 that have an outer diameter less than or equal to the outer diameter of bottom face 1823, perimeter portions 1860 bulge outwardly beyond the outer diameter of bottom face 1863.

Figure 61:
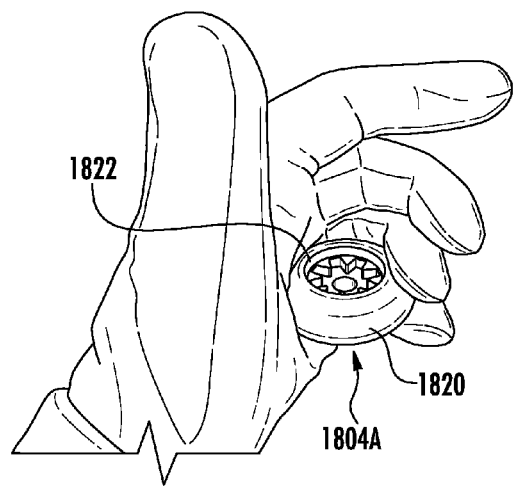
FIG. 61 is a perspective view illustrating manual gripping of the knob of FIG. 52.
Figure 62:
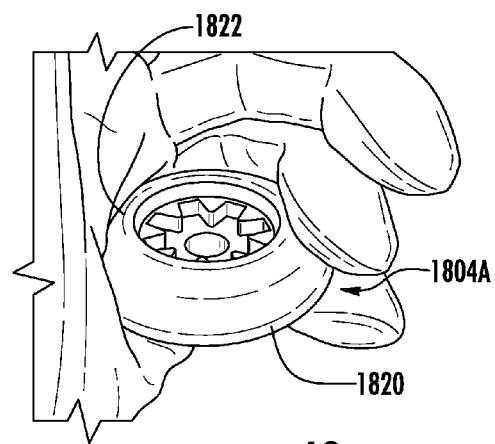
FIG. 62 is an enlarged perspective view illustrating manual gripping of the knob of FIG. 52.
Figure 63:
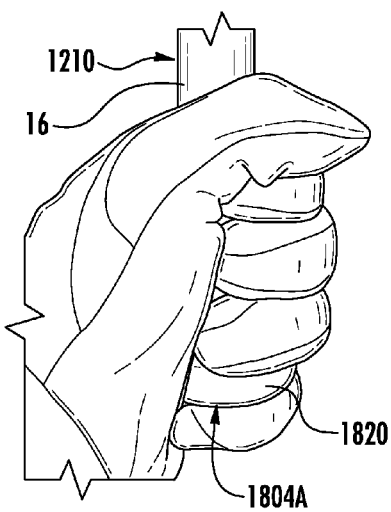
FIG. 63 is a perspective view illustrating one example of manual gripping of the handle of the bat of FIG. 37 about the knob of FIG. 52.
Figure 64:
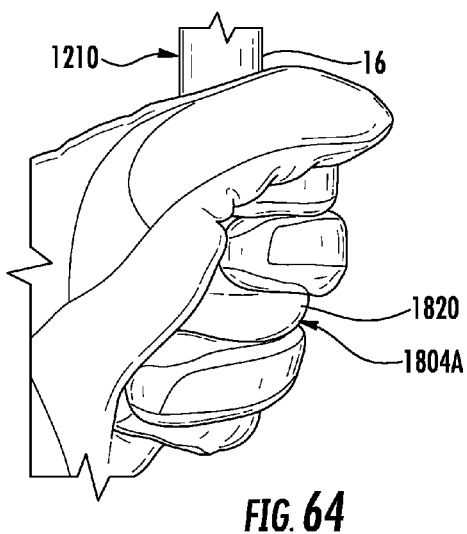
FIG. 64 is a perspective view illustrating another example of manual gripping of the handle of the bat of FIG. 37 about the knob of FIG. 52.

FIG. 61-64 illustrate an example of knob 1804A being gripped. FIGS. 61 and 62 illustrate knob 1804 being gripped independent of the remainder of the bat 1210. FIGS. 63 and 64 illustrate knob 1804A attached to the remainder of bat 1210 while being gripped. FIG. 63 illustrates a first example of the gripping of knob 1804A with perimeter portions 1820 extending between the person's pinky and ring finger while portions 1822 rest against the person's palm. FIG. 64 illustrates a second example of the grouping of knob 1804A with perimeter portions 1820 extending between person's ring finger and middle finger with portions 1822 resting against the person's palm.

The positioning of perimeter portions 1822 against a person's palm may result in bat 1210 being similarly gripped each time bat 1210 is used. In other words, the same outer circumferential portion or face of barrel 18 may always face towards the outfield or may serve as the hitting surface. Repeated impact of a ball with the same face of barrel 18 over time may lead to premature wear and damage to the barrel 18.

In the example illustrated, because base key 1512 and knob key 1520 comprise facets or keying surfaces that symmetrically extend about axis 1524, knobs 1804 may be keyed to base 1500 at any one of a variety of user selected angular positions such that the user may vary which circumferential portions or face of barrel 18 are angularly opposite to the narrower portions, perimeter portions 1822, 1862, of knobs 1804. As a result, the user may select which circumferential surface portions of barrel 18 will serve as the hitting surface for bat 1210. In other words, the angular positioning of portions 1822, 1862 of knobs 1804 may be "clocked" overtime, or as desired by the batter, with respect to base 1500 and with respect to the axis 1524. In the example illustrated in which base key 1512 and knob key 1520 each comprise an asterisk or star with eight points symmetrically extending about axis 1524, each of knobs 1804 is positionable at a user selected one of eight different angular positions with respect to the remainder of bat 1210. In other implementations, base key 1512 and knob key 1520 may have other configurations to provide a greater or fewer of such different angular positions for perimeter portions 1822, 1862 with respect to the remainder of bat 1210.

Figure 65:
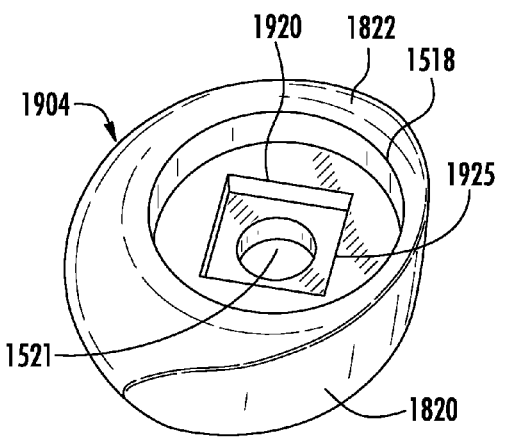
FIG. 65 is a bottom perspective view of another example knob as part of the removable knob system for the bat of FIG. 37.
Figure 66:
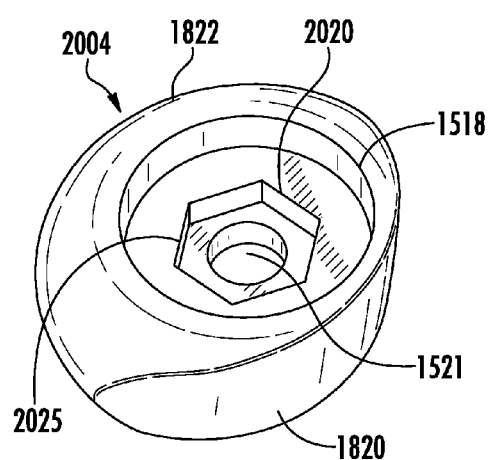
FIG. 66 is a bottom perspective view of yet another example knob as part of the removable knob system for the bat of FIG. 37.

FIGS. 65 and 66 illustrate alternative configurations for base key 1512 and knob key 1520. FIGS. 65 and 66 illustrate knobs 1904 and 2004 having knob keys 1920 and 2020 knob keys 1920, respectively. Knobs 1904 and 2004 are similar to knob 1804A in all other respects. As shown by FIG. 65, knob key 1920 is polygonal, having four sides, faces or facets 1925 symmetrically positioned about axis 1521. In the example illustrated, facets 1925 comprise side edges of a recess extending into the floor of cavity 1518, wherein base key 1512 has corresponding facets comprising side edges of a correspondingly shaped projection. In another implementation, facets 1925 comprise side edges of a projection extending above the floor of cavity 1518, wherein base key 1512 has corresponding facets comprising side edges of a correspondingly shaped recess. In the example illustrated in FIG. 65, knob key 1920 provides four user selectable clocking positions or angular positions for perimeter portion 1822 of knob 1904 relative to barrel 18 of bat 1210 (shown in FIG. 37).

As shown by FIG. 66, knob key 2020 is polygonal, having six sides, faces or facets 2025 symmetrically positioned about axis 1521. In the example illustrated, facets 2025 comprise side edges of a recess extending into the floor of cavity 1518, wherein base key 1512 has corresponding facets comprising side edges of a correspondingly shaped projection. In another implementation, facets 2025 comprise side edges of a projection extending above the floor of cavity 1518, wherein base key 1512 has corresponding facets comprising side edges of a correspondingly shaped recess. In the example illustrated in FIG. 66, knob key 2020 provides six user selectable clocking positions or angular positions for perimeter portion 1822 of knob 2004 relative to barrel 18 of bat 1210 (shown in FIG. 37). As indicated above, in other implementations, the knob key 2020 and base key 1512 can have any form of irregular shape that provides for a removable connection of the knob to the base and the "clocking" or repositioning of perimeter portions of the knob about the axis 1521 or 1524. For example, the keys can have a polygonal shape, a star shape with 3 or more projections, a plus shape, or other irregular shape. In another implementation, the knob can include a secondary locking mechanism, such as a captive fastener for providing a secondary locking mechanism of the knob to the base.

FIGS. 67-70 illustrate removable end cap system 1230. Removable end cap system 1230 covers an end of barrel 18 of bat 1210 (shown in FIG. 37). End cap system 1230 comprises cup 2100 and cover 2104 (shown in FIGS. 37 and 70). Cup 2100 mounts within an end of barrel 18 and facilitates removable connection of cover 2104 across the end of barrel 18. In one implementation, cup 2100 is fixedly secured within the end of barrel 18 by glue, epoxy, welding or other fastening mechanisms. The cup 2100 is configured to be fixedly secured to the distal end of the barrel 18 so as not to be removed for adjustment of the bat. The cup 2100 also serves to prevent debris or unauthorized access to the inner surfaces of the barrel (i.e., to inhibit bat doctoring).

Cup 2100 comprises sidewalls 2106 and floor 2108 which form a cavity 2110. Cup 2104 further comprises a connector portion 2114 within cavity 2110. Connector portion 2114 cooperates with a corresponding connector portion lid or cover 2104 to releasably secure cover 2104 to cup 2100 over cavity 2110. In one implementation, cavity 2110 receives electronics, such as a one or more sensors, a processing unit and/or wireless transmitter. In another implementation, cavity 2110 receives removable weights of different densities and/or sizes, allowing a person to customize the overall weight at the end of barrel 18 and at the end of bat 1210. In one implementation, such weights extend from and are carried by cover 2104.

In the example illustrated, at least portions of floor 2108 are formed so as to facilitate viewing of an internal bore within barrel 18 through floor 2108. In the example illustrated, floor 2108 is formed from one or more translucent or transparent materials. In yet another implementation, floor 2108 comprises one or more windows are openings to facilitate such viewing. Such viewing facilitates inspection of the interior barrel 18. In yet other implementations, floor 2108 is opaque. At least a portion of the floor 2108 can be transparent, translucent, semi-transparent or semi-translucent to allow for viewing through the floor to for example the internal surfaces of the barrel 18. In another implementation, the entire cup 2100 can be formed of one or more materials that are transparent, translucent, semi-transparent or semi-translucent.

In the example illustrated, connection portion 2114 comprises a bayonet-type connection portion having bayonet female slots 2116 within cavity 2110 along sidewalls 2106, wherein cover 2104 comprises corresponding male pins, tabs or other projections. In yet other implementations, connection portion 2114 comprises bayonet male pins, tabs or other projections while cover 2104 comprises female slots. In the example illustrated, connection portion 2114 comprises a pair of such female slots 2116 located on opposite sides of cavity 2110, 180 degrees apart from one another. In other implementations, connection portion 2114 comprises greater than two female slots 2116. For example, in one implementation, connection portion 2114 comprises three such slots 2116 spaced 120 degrees apart from one another about the cavity 2110. In one implementation, the bayonet-type connectors can be spaced apart by for example approximately 180 degrees, but formed for slightly different sizes such that the cover has only one orientation in which it can be properly engaged with the cup.

In the example illustrated, such slots 2116 are located proximate to floor 2108 such that cover 2104 is itself received within cavity 2110, wherein electronics and/or weights are carried within cover 2104 within cavity 2110. In yet other implementations, female slots 2116 can be alternatively located near mouth 2118 of cavity 2110. In still other implementations, connector portion 2114 may comprise other structures for releasably securing cover 2104 to and over cavity 2110. For example, connector portion 2114 can alternatively comprise threads, hooks, snaps, other forms of fasteners and the like.

Figure 67:
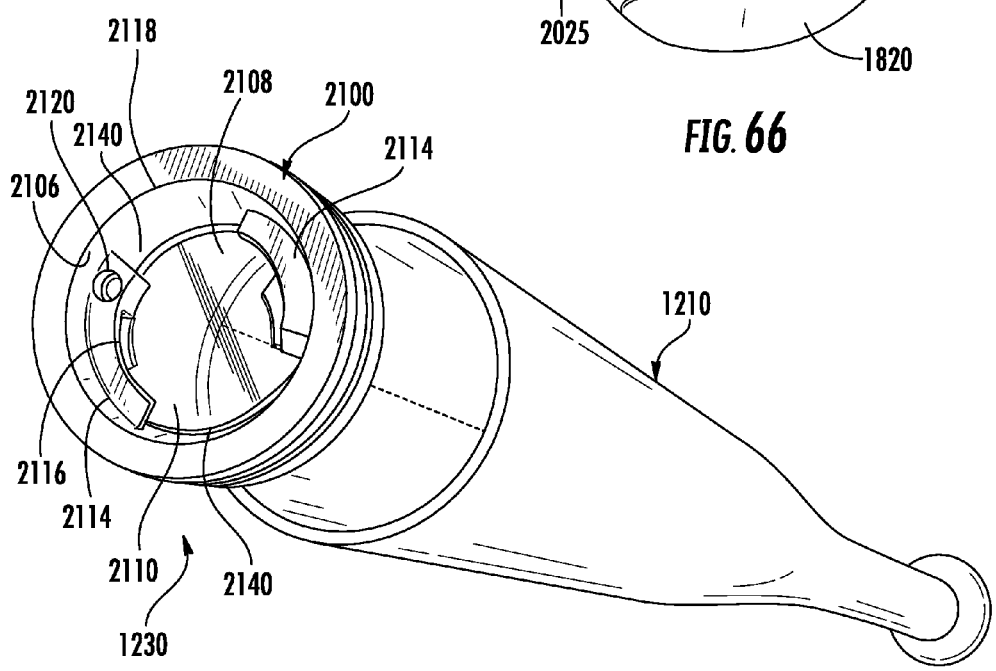
FIG. 67 is a perspective view of an example cup of an example removable end cap system removed from an example bat.
Figure 68:
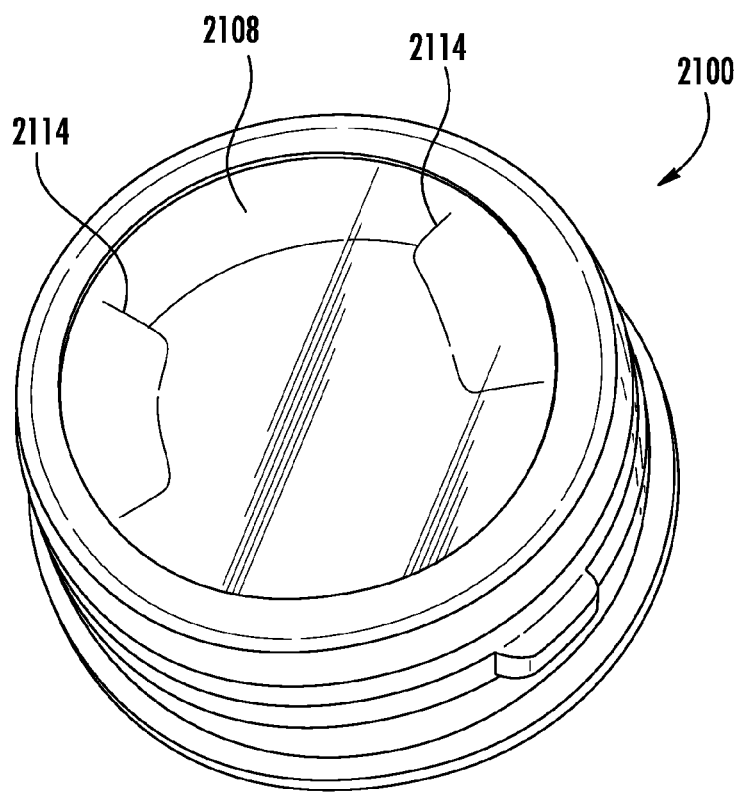
FIG. 68 is a bottom perspective view of the cup of FIG. 67.
Figure 69:
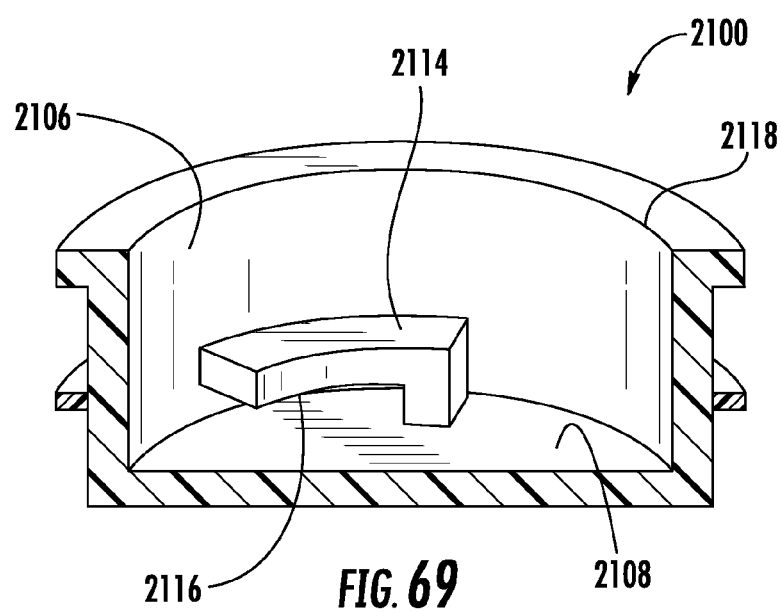
FIG. 69 is a sectional view of the cup of FIG. 67.

As shown by FIG. 67, in the example illustrated, cup 2100 can additionally comprises a threaded bore 2120 for receiving a threaded fastener extending from or extending through cover 2104. The threaded fastener and threaded bore 2120 serve as a secondary locking mechanism to maintain cover 2104 in place should the bayonet connection fail or become inadvertently disconnected. In other implementations, threaded bore 2120 is omitted. In such implementations, the system 1230 advantageously provides a primary locking mechanism (such as the bayonet style connectors or other form of fastener), and a secondary locking mechanism (such as the threaded bore and fastener). In other implementations, other forms or combinations of primary and secondary locking mechanisms can be used. The secondary locking mechanism provides another level of protection, durability and reliability by serving to prevent the separation of the cover from the cup during normal use.

Figure 70:
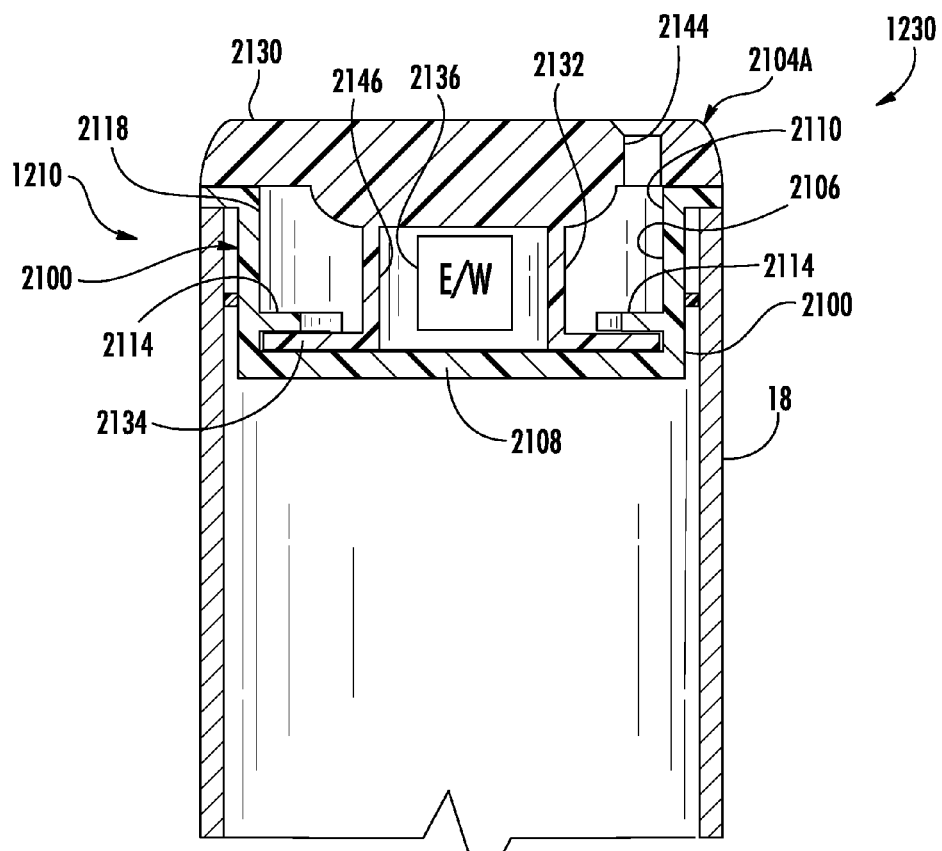
FIG. 70 is a sectional view of the cup of FIG. 67 mounted within an example bat and removably mounting an example end cap to the bat.

FIG. 70 illustrate cover 2104A secured within cup 2100 at the end of barrel 18 of bat 1210. As shown by FIG. 70, cover 2104A comprises lid portion 2130, post 2132, male bayonet tabs 2134 and electronics/weight 2136 (schematically shown). Lid portion 2130 spans across mouth 2118 of cup 2100. Post 2132 extends down from lid portion 2130 and supports male bayonet tabs 2134.

Bayonet tabs 2134 extend from post 2132 and are sized and configured so as to fit into gaps 2140 between connector portions 2114 (shown as bayonet hooks extending along sidewalls 2106 and forming female slots 2116). Bayonet tabs 2134 are configured such that when cover 2104A is fully inserted into cup 2100, as shown in FIG. 70, cover 2104 is rotatable so as to position tabs 2134 within slots 2116 to axially retain cover 2104 in place relative to cup 2100 and the end of bat 1210. In the example illustrated, when tabs 2134 are fully inserted into slots 2116, opening 2144 within lid portion 2130 is aligned with threaded bore 2120 (shown in FIG. 67) for reception of a fastener 2145 (shown in FIG. 71), such as a threaded bolt, through opening 2144 and into bore 2120, wherein the fastener 2145 serves as a secondary cover retention mechanism. In one implementation, the fastener 2145 is a captive fastener, such as a captive screw, such that if the fastener or screw was not properly secured it would be readily apparent to the user or other person, such as an umpire that the cover 2104 is not properly secured with the secondary locking mechanism. In other implementations, opening 2144 and bore 2120 are omitted or are replaced with other secondary retention mechanisms.

Electronics/weight 2136, schematically shown, is suspended or supported by cover 2104A. In one implementation, electronics/weight 2136 is captured are retained within an interior cavity 2146 of post 2132 by an adhesive, epoxy, potting or other material. In one implementation, electronics/weight 2136 comprises a block of electronics comprising one or more sensors, such as accelerometers, magnetometers, force or impact sensors, combinations thereof, and the like. In one implementation, electronics/weight 2136 additionally comprises a wireless transmitter, such as an antenna, and/or in a logical connection to a port by which wired connection or communication may be made with bat 1210. In yet another implementation, electronics/weight 2136 further comprises a processing unit and memory, wherein the processing unit receives signals from the one or more sensors and stores data based upon the signals in the memory for later retrieval via the wired or wireless connection. In yet another implementation, the processing unit communicates the signals or modifies the signals, such as by compression or filtering, prior to communicating the signals, in real-time, to an external recipient via the port or via the wireless transmitter.

In yet other implementations, electronics/weight 2136 comprises a mass of material adding a supplemental amount of weight to the end of bat 1210. The amount of weight is varied amongst different interchangeable covers 2130 by varying the volume of the weight supplementing material and/or by changing the weight supplementing material itself (changing being different materials having different densities, such as changing from lead to tungsten). In yet other implementations, electronics/weight 2136 is omitted.

Figure 71:
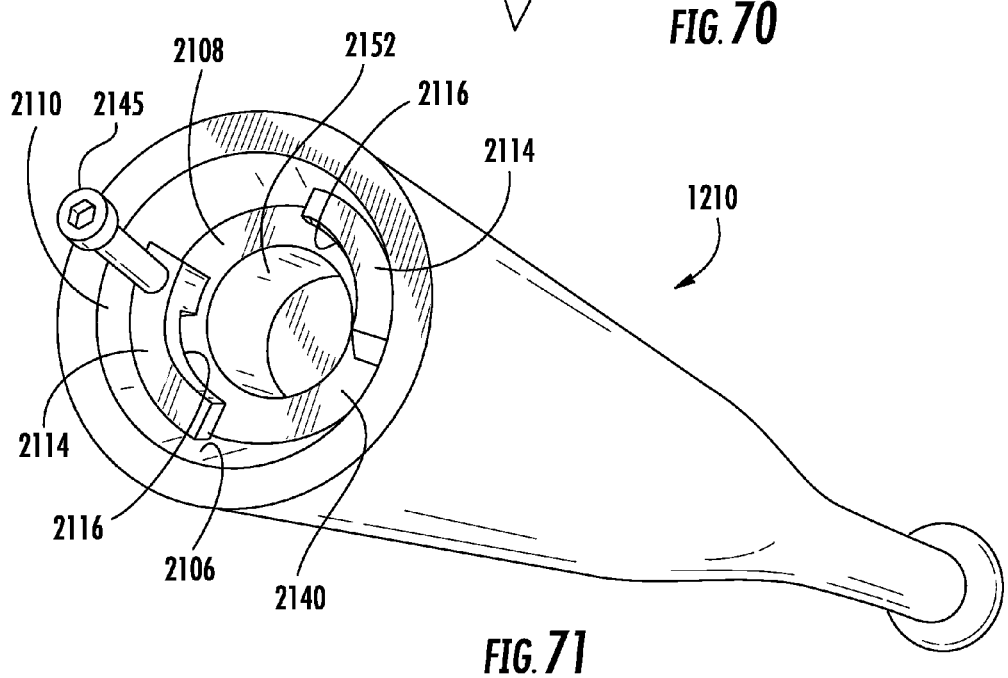
FIG. 71 is a perspective view of an alternative implementation of the cup of FIG. 67 mounted within an example bat.
Figure 72:
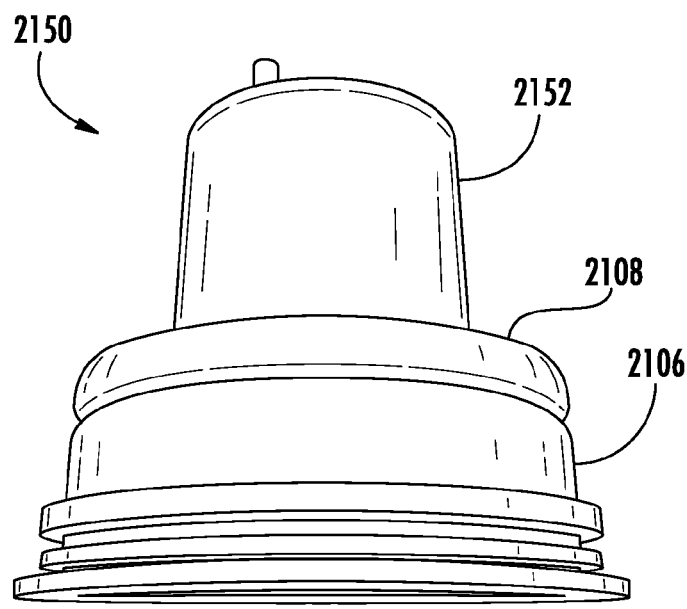
FIG. 72 is a side view of the cup of FIG. 71.
Figure 73:
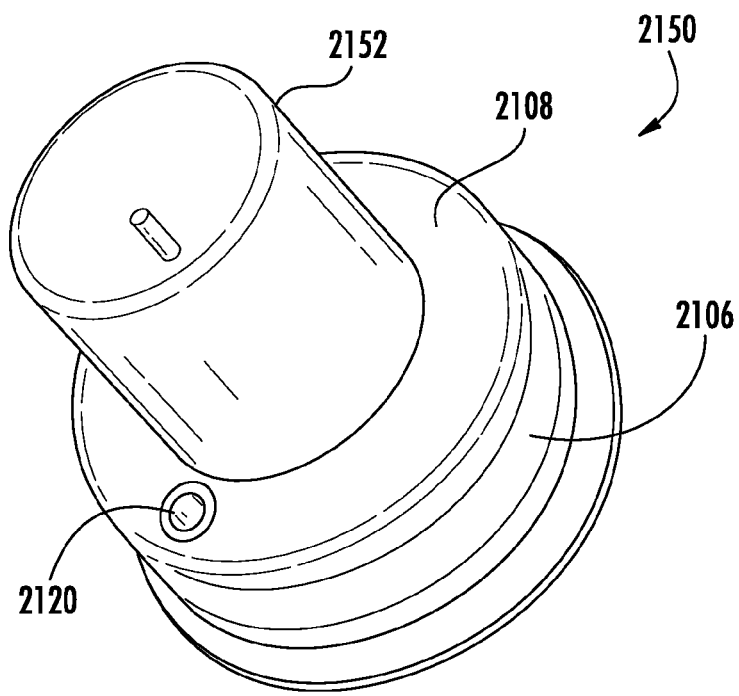
FIG. 73 is a bottom perspective view of the cup of FIG. 71.

FIGS. 71-73 illustrate cup 2150, an alternative implementation of cup 2100. Cup 2150 is similar to cup 2100 except that cup 2150 can be entirely transparent or translucent and/or can additionally comprise holding well 2152. Holding well 2152 extends from floor 2108 and provides an additional internal volume that is in communication with the interior of cavity 2110. Holding well 2152 provides additional volume for containing electronics or for containing weight, such as a supplemental weight extending from cover 2104. In other implementations, less than all portions of cup 2150 are transparent or translucent. For example, in one implementation, just the floor of well 2152 is transparent or translucent. In some implementations, the outer perimeter of holding well 2152 is additionally configured to be received within the barrel to support an insert, such as insert 174 to provide a double walled barrel configuration. As noted above, in one implementation, insert 174 can supported by holding well 2152 so as to be spaced or separated from the exterior surface of barrel 18 by a predetermined distance, such as for example, between 0.001 and 0.125 inches (when measured radially from the longitudinal centerline or longitudinal axis 14 and the outer surface of barrel 18).

Figure 74:
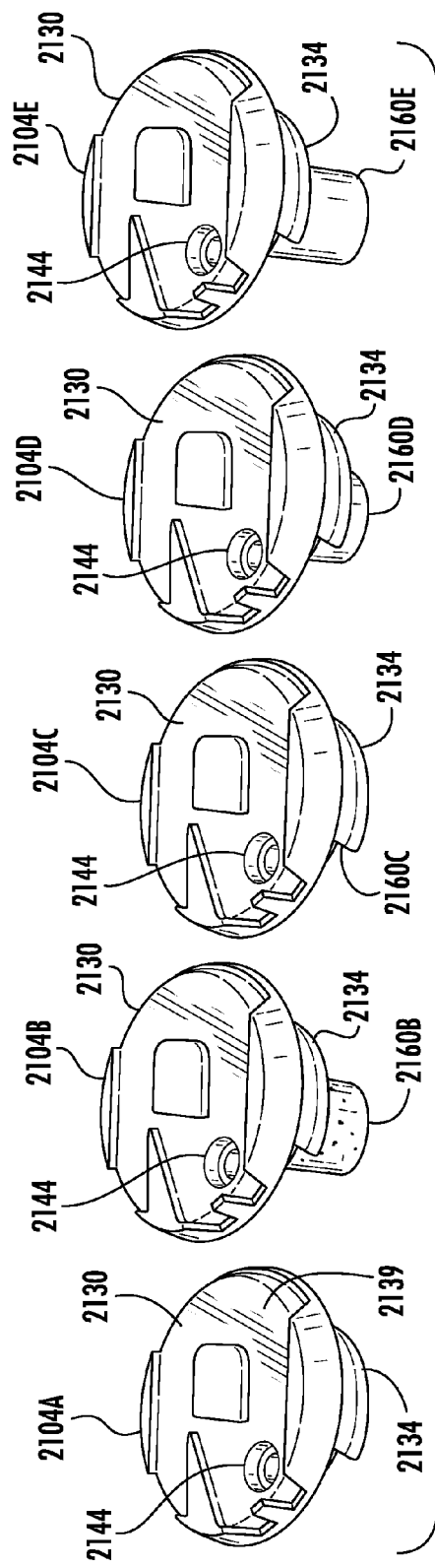
FIG. 74 is a top perspective view of a set of interchangeable end caps for use with the cup of FIG. 71.
Figure 75:
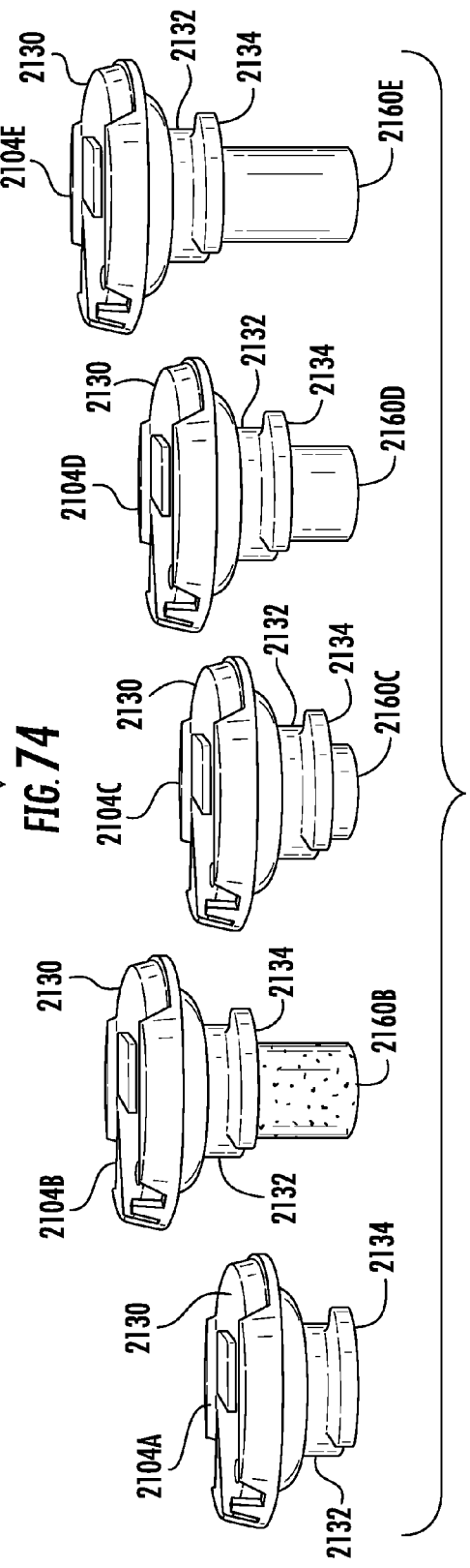
FIG. 75 is a side view of the set of interchangeable end caps of FIG. 74.
Figure 76:
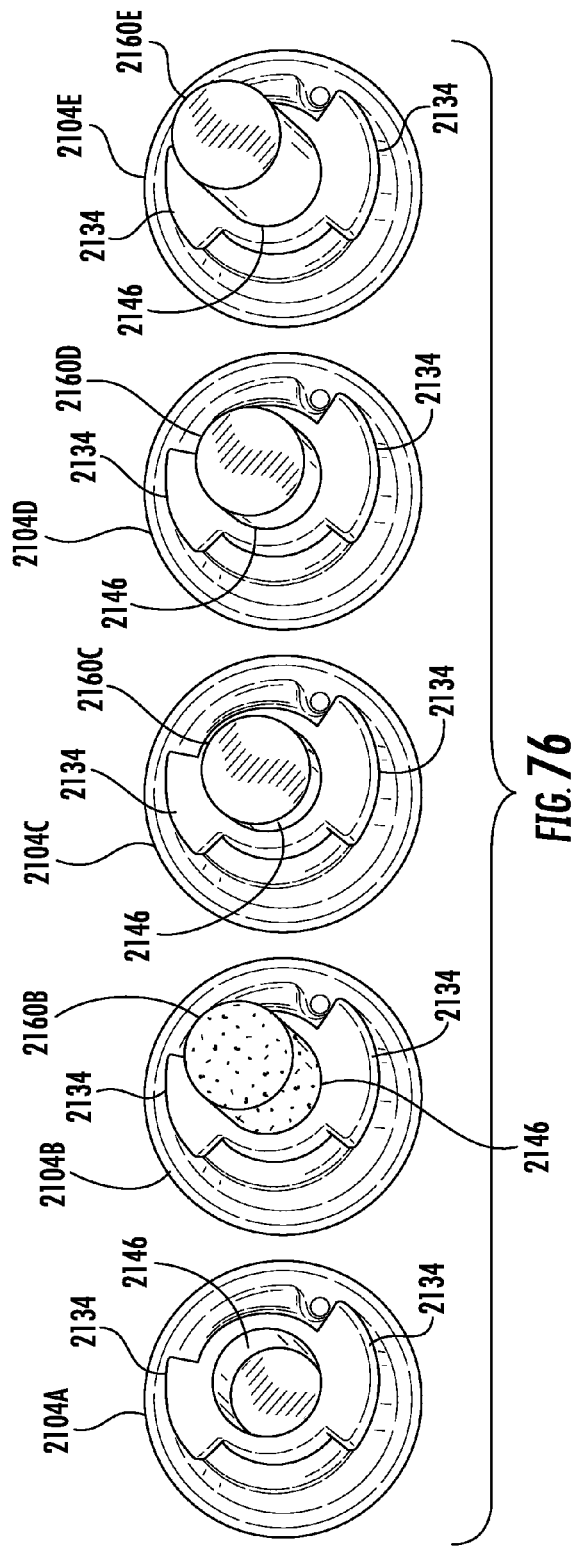
FIG. 76 is a bottom view of the second interchangeable in caps of FIG. 74.

FIGS. 74-76 illustrate an example set of different interchangeable covers 2104A, 2104B, 2104C, 2104D and 2104E (collectively referred to as covers 2104). Covers 2104 interchangeably and removably mounted to cup 2150. In the example illustrated, cover 2104A, described above, is also mountable to cup 2100 as shown in FIG. 70. FIG. 76 illustrates cover 2104A with electronics/weight 2136 removed. In other implementations, cover 2104A comprises electronics/weight 2136 and is mounted within cup 2150. Covers 2104B, 2104C, 2104D and 2104E are similar to cover 2104A described above except that covers 2104B, 2104C, 2104D and 2104E are specifically illustrated as comprising weight plugs 2160B, 2160C, 2160D and 2160E (collectively referred to as plugs 2160), respectively. In the example illustrated, plugs 2160 are each cylindrical in shape, having an outer profile or diameter closely matching the inner profile or diameter of cavity 2146 and well 2152. In the example illustrated, each of plugs 2160 provides a different user selectable weight for mounting to the end of bat 1210. In the example illustrated, plug 2160B is formed from a first material (as indicated by the stippling) having a first density while plugs 2160C, 2160D and 2160E are formed from a different material having a different density. In the example illustrated, each of plugs 2160C, 2160D and 2160E are formed from the same material having same density, but are each provided with a different axial length so as to have a different supplemental weight. Each of plugs 2160 has an axial length so as to fit within cup 2150 and well 2152.

Referring to FIG. 74, the covers 2104 can be shaped, formed and/or bear graphical and/or alphanumeric indicia 2139. In one implementation, the indicia 2139 can be in the form of a registered trademark mark, such as the DeMarini "D" design mark. In other implementations, the indicia can be a service mark, a design, a logo, a certification mark, a warning, an instruction, a team name, a player's name, other markings or combinations thereof. The cover can be shaped with three dimensional shapes to form a particular graphic, design or pattern. Additionally, the cover can be formed in one color or multiple colors, or textures, and different combinations of colors and/or textures.

Figure 77:
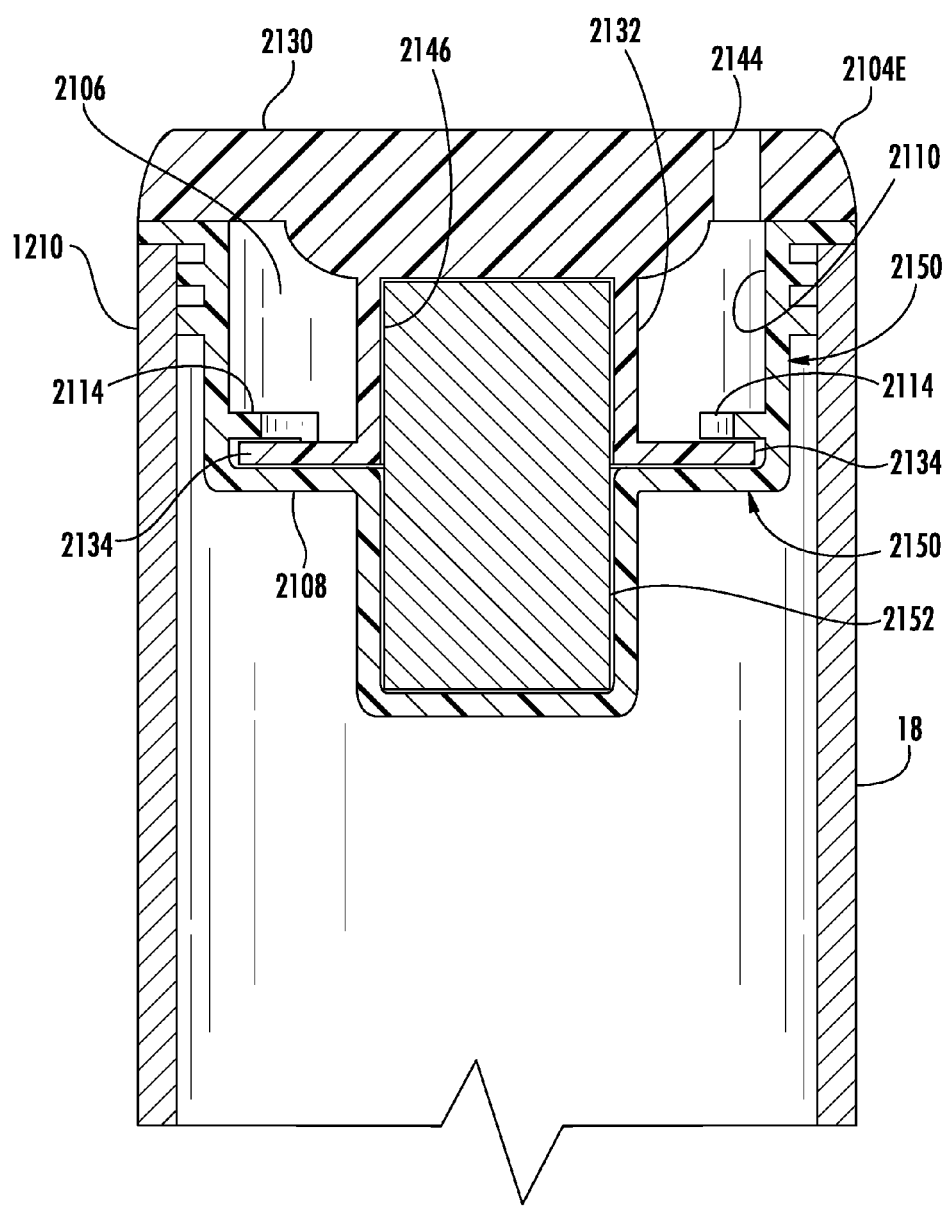
FIG. 77 is a sectional view of the cup of FIG. 71 mounted within a barrel of a bat and connecting an example end cap to the barrel of the bat.

FIG. 77 is a sectional view illustrating removable connection of cover 2104E to cup 2150 at the end of bat 1210. As shown by FIG. 77, the connection of cover 2104E to cup 2150 is the same as the connection of cover 2104A to cup 2100 except that plug 2160E projects into well 2152. In the example illustrated, plug 2160E completely fills well 2152. In circumstances where cover 2104E is interchanged with any of cups 2104A, 2104B, 2104C or 2104D, well 2152 maybe partially empty.

Figure 78:
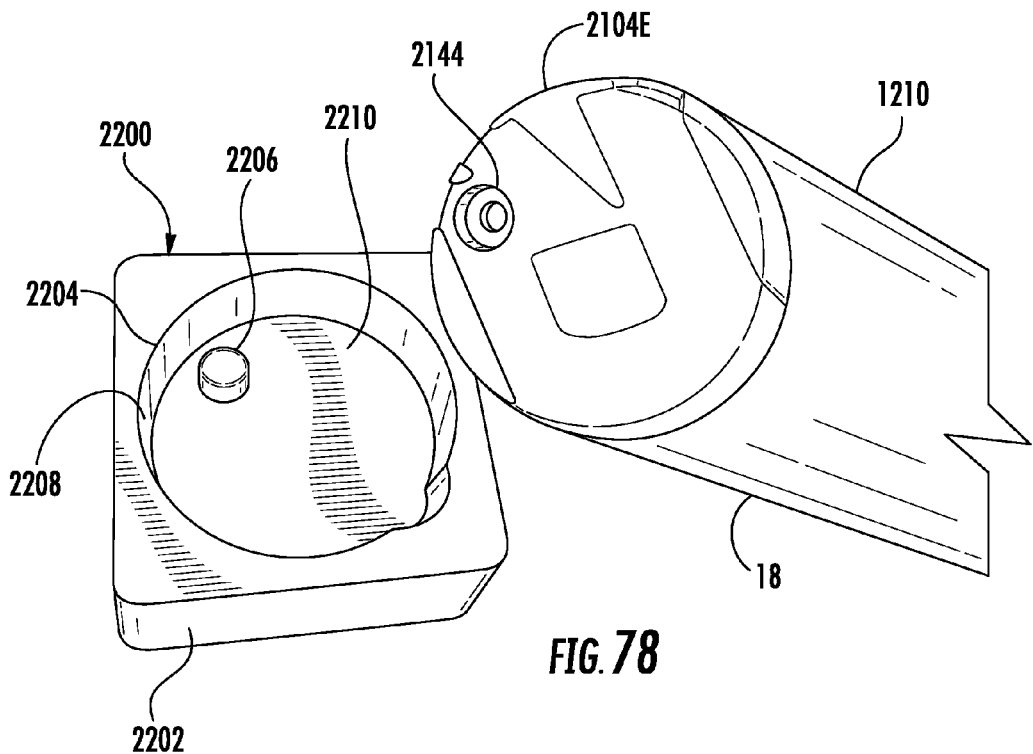
FIG. 78 is a perspective view of an example end cap assembly tool ready for use with the end cap of FIG. 77.
Figure 79:
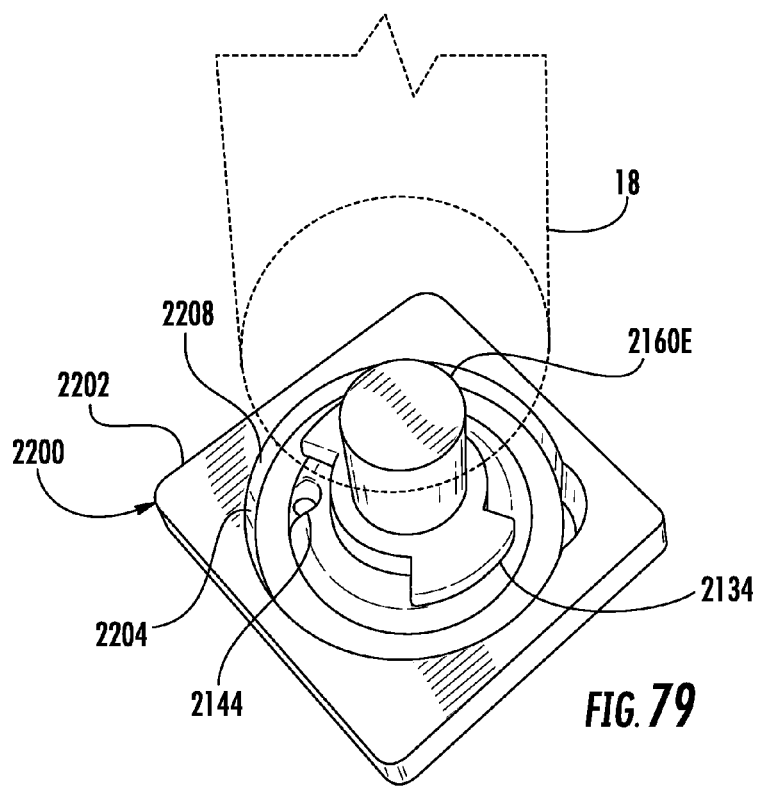
FIG. 79 is a top perspective view of the tool of FIG. 78 receiving the end cap of FIG. 78.
Figure 80:
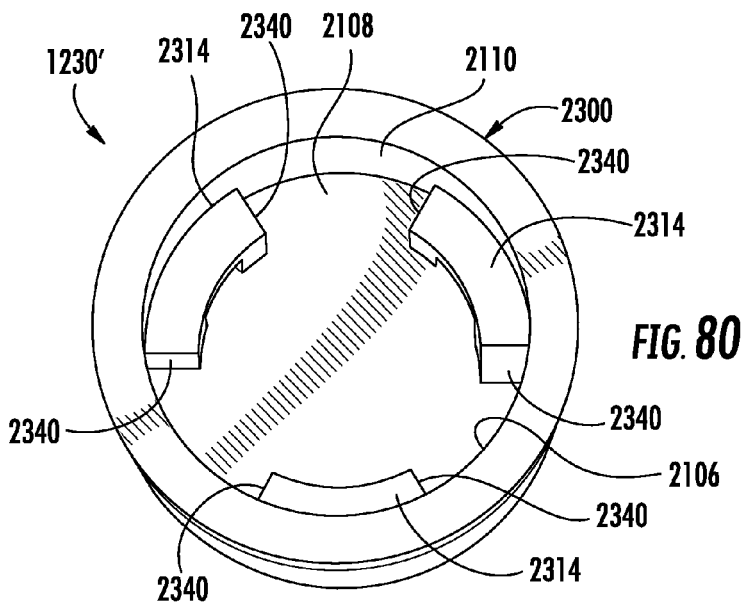
FIG. 80 is a top view of an example cup of another example of the removable end cap system of FIG. 67.

FIGS. 78 and 79 illustrate an end cap assembly tool 2200 which can be used to assist in the connection and removal of end cap 210E to and from the end of bat 1210. As shown by FIG. 78, tool 2200 comprises body 2202, cavity 2204 and pin 2206. Body 2202 comprises a structure in which cavity 2204 is formed. Cavity 2204 is sized and configured to receive any of covers 2104 of bat 1210. In the example illustrated, cavity 2204 is circular, wherein sidewalls 2208 form a circular opening above floor 2210, facilitating rotation of barrel 18 and/or body 2202 relative to one another.

Sidewalls 2208 are further configured to guide insertion of cover 2104E such that opening 2144 of each of covers 2104 is aligned with pin 2206.

Pin 2206 rises above floor 2210 so as to project into opening 2144 when a cover, such as cover 2104E, is inserted into cavity 2204 with opening 2144 over pin 2206 (after fastener 2145 has been removed). As shown by FIG. 79, 10 2206 assists in gripping cover 2104E as torque is applied to rotate cover 2104E so as to either rotate bayonets tabs 2134 out of slots 2116 during disconnection of cover 2104E from cup 2100, 2150 and barrel 18 or into slots 2116 (shown in FIGS. 67 and 71) during connection of cover 2104E to cup 2100, 2150 and barrel 18. Assembly tool 2200 facilitates use of a tighter fitting connection between the internal surface of slot 2116 and tabs 2134. In other implementations, the end cap assembly tool 2200 can take other forms. In one implementation, the tool 2200 can be shaped to resemble a wrench with at least one pin or other bearing structure for facilitating the removal and attachment of one of the covers to the cup 2100 and 2150. In another implementation, the tool 2200 can be configured as a torque wrench or with a torque limiting feature so that the tool cannot be used to over-tighten or damage the fastener.

Figure 81:
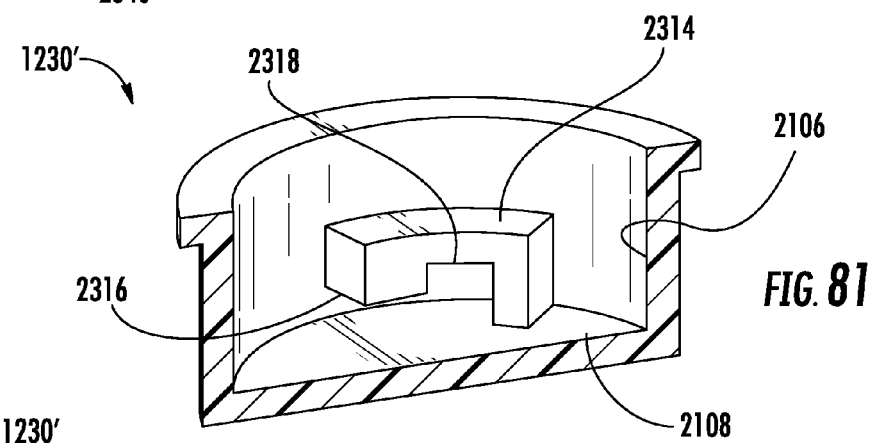
FIG. 81 is a sectional view of the cup of FIG. 80.

FIGS. 80-87B illustrate removable end cap system 1230', an alternative implementation of end cap system 1230. System 1230' comprises cup 2300 (shown in FIGS. 80-81) and cover 2304 (shown in FIGS. 82-85). Cup 2300 is similar to cup 2100 except that cup 2300 comprises three bayonet ribs or hooks 2314 equi-angularly spaced along sidewalls 2106 by gaps 2340. Those remaining elements or components of cup 2300 which correspond to components of cup 2100 are numbered similarly. As shown by FIG. 81, each hook 2314 comprises a slot 2316 and an underside notch 2318.

As shown by FIGS. 82-85, cover 2304 is an alternative implementation of cover 2104A. Cover 2304 comprises a two-piece cover comprising primary cover portion 2306 (shown in FIGS. 82 and 83) and secondary retention mechanism 2308 (shown in FIG. 84). Primary cover portion 2306 comprises lid portion 2330, post 2332 and male bayonet tabs 2334. Lid portion 2330 spans across mouth 2118 of cup 2100 when cover 2304 is connected to cup 2300. Lid portion 2330 comprises an opening 2338 through which a pushbutton portion of retention mechanism 2308 extends.

Post 2332 extends down from lid portion 2330 and supports male bayonet tabs 2334. Post 2332 extends from lid portion 2330 and supports male bayonet tabs 2334. Post 2332 further comprises an inner portion comprising three passages 2339 which facilitate movement of secondary retention mechanism 2308 between a locked position and an unlocked position as will be described hereafter. In the example illustrated, post 2332 has a hollow interior cavity 2346 receiving secondary retention mechanism 2308.

Bayonet tabs 2334 extend from post 2332 and are configured so as to fit into gaps 2340 between connector portions 2314 (shown as bayonet hooks extending along sidewalls 2106 and forming female slots 2316). Bayonets tabs 2334 are configured such that upon full insertion of cover 2304 into cup 2300 and upon depression or actuation of secondary retention mechanism 2308, cover 2304 is rotatable to slide tabs 2334 into slot 2316. Although cup 2300 is illustrated as comprising three bayonet hooks 2314 and cover 2304 is illustrated as comprising three corresponding tabs 2334, in other implementations, cup 2300 and cover 2304 comprise two hooks 2314 and tabs 2334 or greater than three hooks 2314 and tabs 2314.

Figure 84:
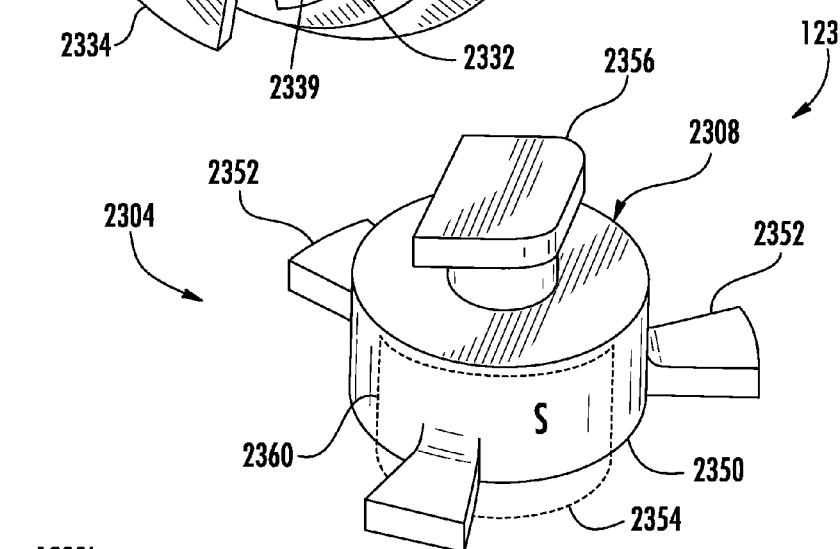
FIG. 84 is a top perspective view of an example secondary retention mechanism of the removable end cap system of FIG. 80.

As shown by FIG. 84, secondary retention mechanism 2308 comprises post 2350, tabs 2352, spring 2354 and pushbutton 2356. Post 2350 is configured to be received within cavity 2346 of primary cover portion 2306. Post 2350 supports hooks 2352 and pushbutton 2356 while carrying spring 2354. In the example illustrated, post 2350 is a lower internal cavity 2360 in which spring 2354 is mounted and carried. In some implementations, the internal cavity 2360 additionally receives electronics/weight 2136 described above.

Tabs 2352 extends radially outward from post 2350 at locations corresponding to channels 2339 of primary cover portion 2306. Tabs 2352 are configured to slide within passages 2339 (shown in FIG. 83) upon depressment of pushbutton 2356 or release of pushbutton 2356 under the force of spring 2354. Although secondary retention mechanism 2308 is illustrated as comprising three equally spaced tabs 2352 and although primary cover portion 2306 is illustrated as including three corresponding channels or passages 2339, in other implementations, primary cover portion 2306 and secondary retention mechanism 2308 alternatively comprise a greater or fewer of such passages 2339 and tabs 2352.

Figure 82:
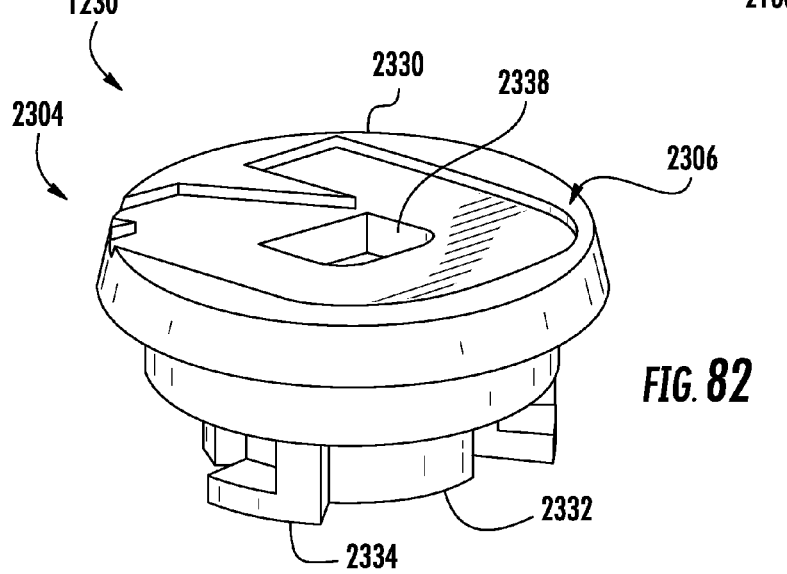
FIG. 82 is a top perspective view of a primary cover portion of the removable end cap system of FIG. 80.
Figure 83:
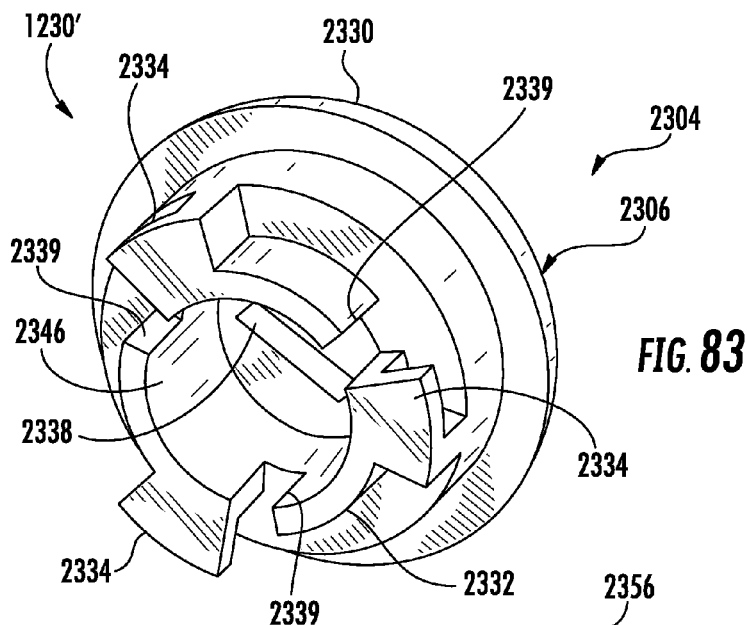
FIG. 83 is a bottom perspective view of the primary cover portion of FIG. 82.

Spring 2354 comprise a spring to resiliently bias secondary retention mechanism 2308 and pushbutton 2356 in a direction away from floor 2108 such that pushbutton 2356 projects through opening 2338 in primary cover portion 2306 (shown in FIG. 82). In the example illustrated, spring 2354 comprise a compression spring captured between post 2350 and floor 2108, wherein spring 2354 projects from cavity 2360 and beyond cavity 2360 prior to depressment of pushbutton 2356. In other implementations, spring 2354 is alternatively supported upon floor 2108. In yet other implementations, spring 2354 may comprise other types of springs mounted so as to resiliently bias pushbutton 2356 upwardly through opening 2338 of primary cover portion 2306.

Figure 85:
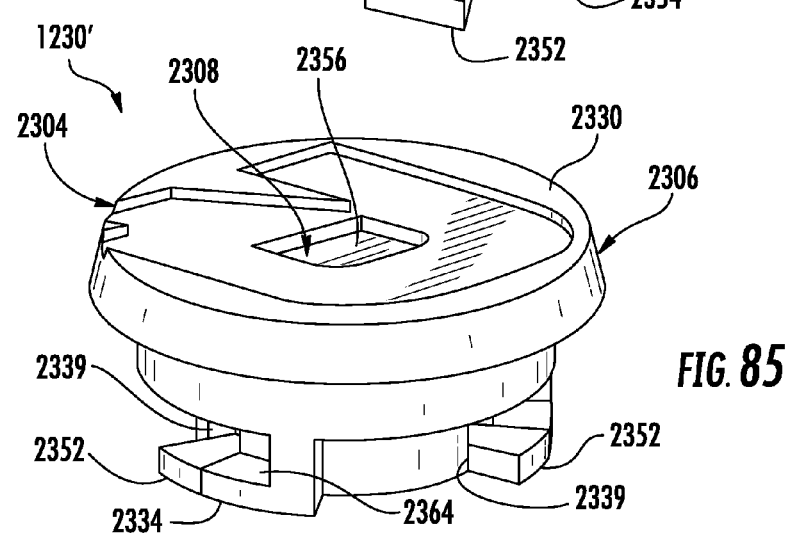
FIG. 85 is a top perspective view of an example end cap comprising the secondary retention mechanism of FIG. 4 connected to the primary cover portion of FIG. 83 with a pushbutton of the secondary retention mechanism being depressed.

Pushbutton 2356 extends from post 2308 through opening 2338 and primary cover portion 2306. FIG. 85 illustrates secondary retention mechanism 2308 connected to primary cover portion 2306 with pushbutton 2356 being depressed. As shown by FIG. 85, such depressment of pushbutton 2356 moves hooks or tabs 2352 within passages 2339 against the bias of spring 2354 (shown in FIG. 84) until tabs 2352 become aligned with bayonet tabs 2334. As a result, tabs 2352 do not block channels 2364 of bayonet tabs 2334.

FIGS. 86A, 86B, 87A and 87B illustrate operation of removable end cap system 1230'. Initially, cover 2304 is inserted into the 2300 such that bayonet hooks 2334 are inserted into gaps 2340 between bayonet hooks 2340. Thereafter, pushbutton 2356 is depressed (as indicated by arrow 2362) against the bias of spring 2354 so as to lower tabs 2352 within passages 2339 into alignment with hooks 2334. As shown by FIGS. 86A and 86B, while pushbutton 2356 remains depressed, cover 2304 is rotated (as indicated by arrow 2364 relative to cup 2300 so as to slide hooks 2334 within slots 2316 beneath hooks 2314 until tabs 2352 are in alignment with or are beneath notches 2318.

Figure 87A:
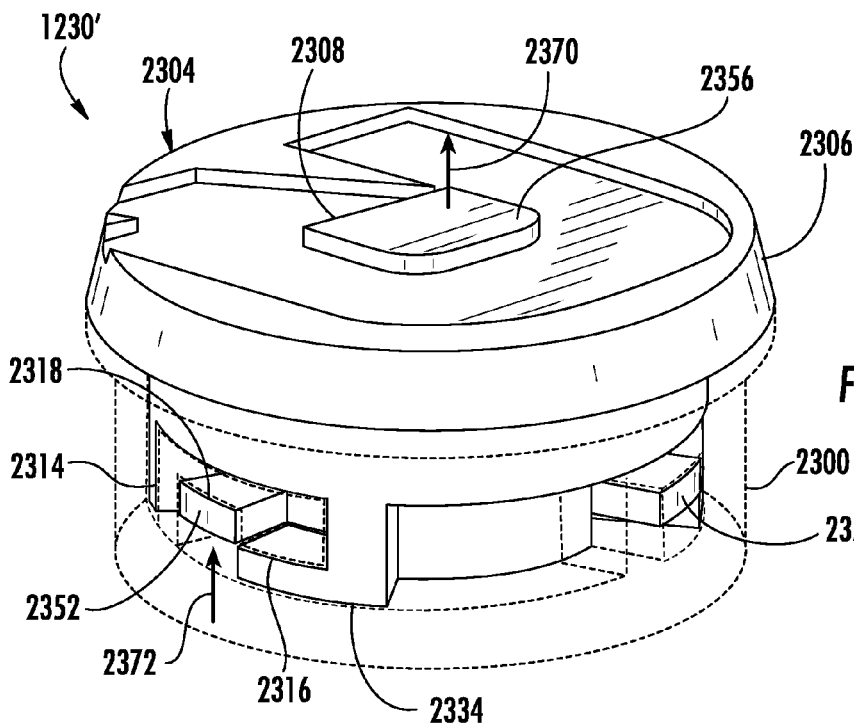
FIG. 87A is a top perspective view of the end cap of FIG. 86A within the cup upon release of the pushbutton with the bayonet tab received within the notch of the bayonet hook of the cup.
Figure 87B:
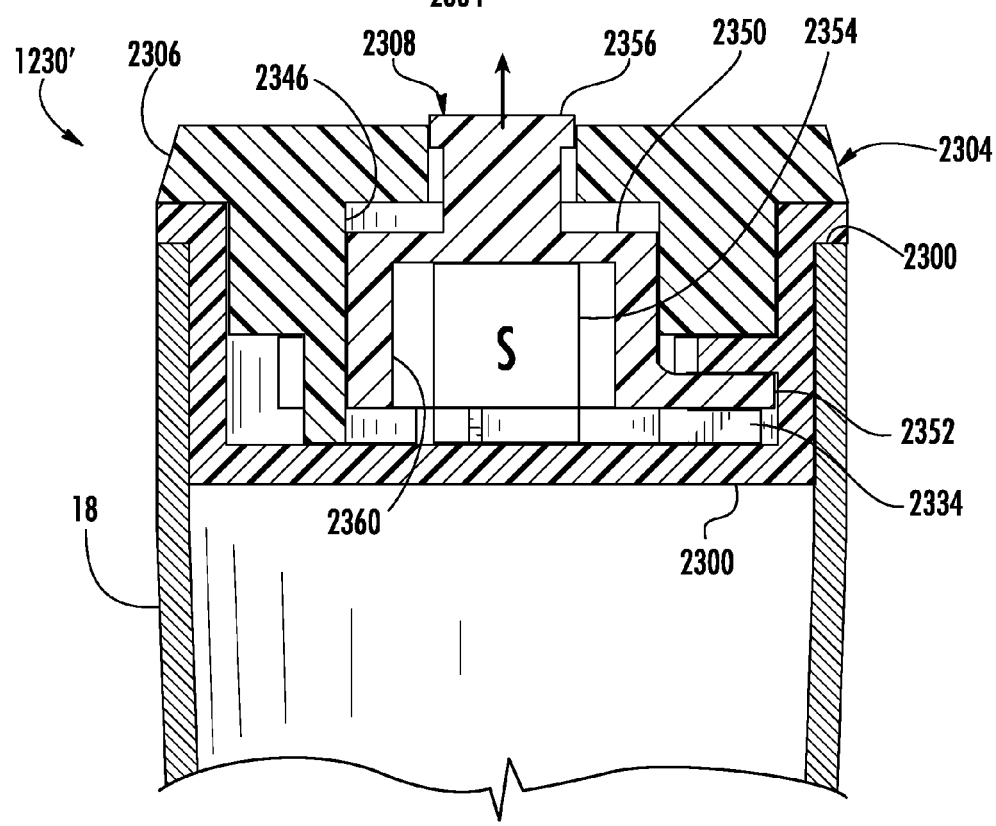
FIG. 87B is a sectional view of the end cap and cup of FIG. 87A.

FIGS. 87A and 87B illustrate release of pushbutton 2356, allowing spring 2354 to resiliently return pushbutton 2356 to an elevated state (as indicated by arrow 2370) and to move tabs 2352 into notch 2318 (as indicated by arrow 2372). While tabs 2352 are received within notches 2318, cover 2304 cannot rotate relative to cup 2300. As a result, secondary retention mechanism 2308 inhibits accidental rotation of cover 2304 and accidental disconnection of cover 2304.

To disconnect cover 2304 for inspection or replacement, the process is reversed. Pushbutton 2356 is once again depressed against the bias of spring 2354 to once again move tabs 2352 out of notch 2318 into alignment with hooks 2334, allowing cover 2304 to be rotated relative to cup 2300. Thereafter, during continued depressant of pushbutton 2356, cover 2304 is rotated relative to cup 2300 to remove hooks 2334 from slots 2316 of bayonet hooks 2314, allowing cover 2304 to be axially separated from cup 2300 and the end of that 1210.

FIGS. 88-92 illustrate replaceable knob system 1228', another implementation of replaceable knobs system 1228. Replaceable knob system 1228' comprises base 2500 (shown in FIG. 88) and knob 2502 (shown in FIGS. 89 and 90). Base 1500 comprises a structure extending from an end of handle 16 and facilitating removal or interchangeable mounting of different knobs, such as knob 2502, to the end of handle 16.

Figure 88:
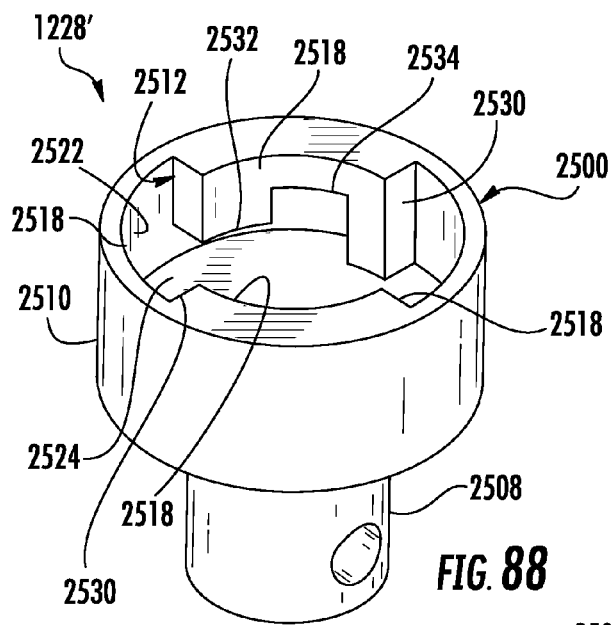
FIG. 88 is a perspective view of an example base of another implementation of the removable knob system of FIG. 45.
Figure 90:
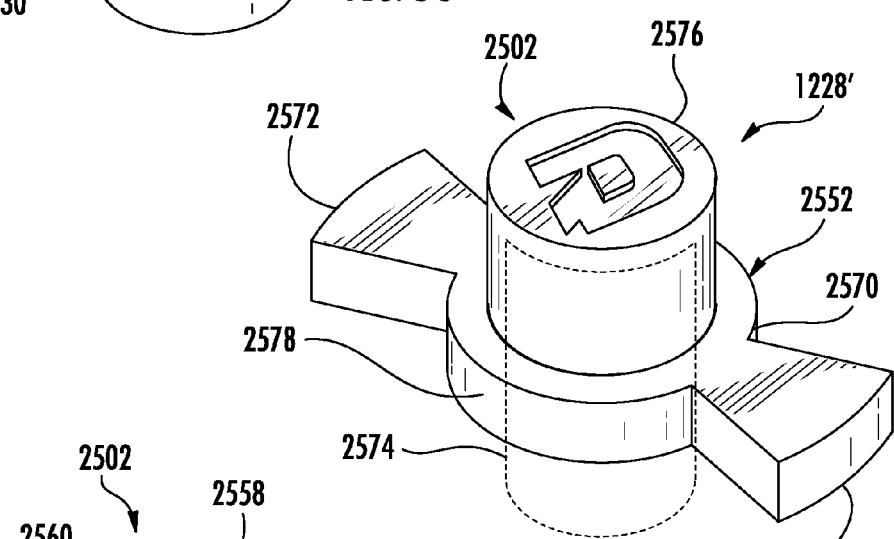
FIG. 90 is a perspective view of an example secondary retention mechanism for use with the head of FIG. 89 and the base of FIG. 88.
Figure 89:
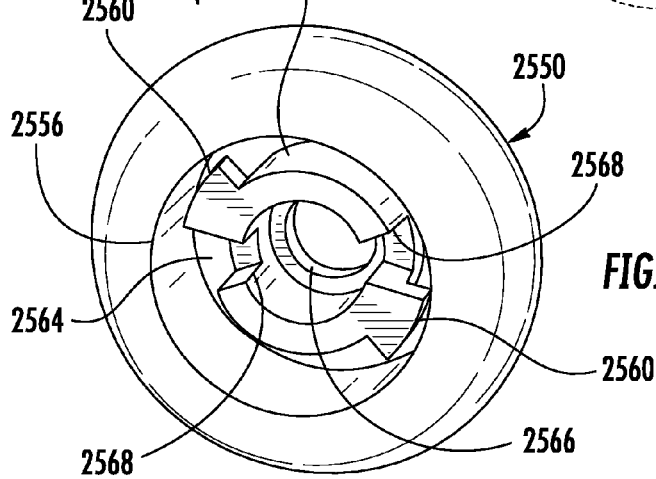
FIG. 89 is a top perspective view of an example head of an example knob for use with the base of FIG. 88.

As shown by FIG. 88, in the example illustrated, base 2500 comprises a body comprising plug 2508, head 2510 and connection mechanism 2512. Plug 2508 comprises that portion of base 2500 configured to be received within handle 16. In one implementation, plug 2508 is cylindrical and is sized to be press fit within handle 16. In one implementation, plug 2508 is additionally or alternatively bonded, fused or welded to handle 16. In yet another implementation, plug 2508 is snap fit within the interior of handle 16. For example, in one implementation, the interior of handle 16 may include one or more teeth angled away from the end of handle 16, whereas the exterior surface of plug 2508 also includes teeth angled in the same direction as the interior teeth of handle 16, wherein one or both of the teeth of handle 16 and plug 2508 resiliently flex during insertion of plug 2508 into handle 16, but flex to a much lesser extent or not all during an attempt to withdraw plug 2508 from handle 16, inhibiting or resisting withdrawal of plug 2508 from handle 16. In yet another implementation, plug 2508 is secured to handle 16 by one of more fasteners passing through the walls of handle 16 and into or through plug 2508.

Head 2510 comprises a structure extending from plug 2508 and supporting connection mechanism 2512. Head 2510 has a diameter wider than plug 2508. In the example illustrated, head 2510 is sized and shaped to be received within a corresponding cavity and knob 1502. Head 2510 is received within knob 2502 such that knob 2502 overlaps a junction of base 2500 and the end of handle 16 to conceal base 2500 and reduce a number of exposed edges or seams.

Connection mechanism 2512 comprises a bayonet-type connection mechanism. In one implementation, connection mechanism 2512 is part of bayonet type connection arrangement similar to the connection shown and described above with respect to FIGS. 70 and 77. In the example illustrated, connection mechanism 2512 is part of a bayonet type connection arrangement similar to the connection shown in FIGS. 80-87B.

As shown by FIG. 88, connection mechanism 2512 comprises cavity 2516 and bayonet hooks 2518. Cavity 2516 extends into head 2510 and is defined by sidewalls 2522 and floor 2524. Bayonet hooks 2518 are formed along sidewalls 2522 above floor 2524. Bayonet hooks 2518 are equally spaced apart from one another by gaps 2530. Bayonet hooks 2518 each form a bayonet slot 2532 and a notch 2534. Although connection mechanism 2512 is illustrated as comprising to equally spaced bayonet hooks 2518, in other implementations, the connection mechanism 2512 may include a greater number of bayonet hooks. Knob 2502 comprises a two-piece knob removably mountable to base 2500. Knob 2502 comprises head 2550 (shown in FIG. 89) and secondary retention mechanism 2552 (shown in FIG. 91). Head 2550 removably mounts to an end of base 2500 and handle 16. Head 2550 comprises a body comprising cavity 2556, post 2558 and bayonet tabs 2560. Cavity 2556 extends on an underside of head 2550 and sized to receive head 2510 of base 2500. Cavity 2556 comprises a floor 2564 through which an opening 2566 is formed. Post 2558 projects from floor 2564 into cavity 2556 from a top side of head. Post 2558 supports bayonet tabs 2560 and comprises passages 2568. Bayonet tabs 2560 radially project outwardly from post 2558 and are configured to be inserted into gaps 2530 and to be rotated within slots 2532 when head when head 2550 is being mounted to base 2500.

Secondary retention mechanism 2552 (shown in FIG. 91) comprises post 2570, bayonet tabs 2572, spring 2574 and pushbutton 2576. Post 2570 comprises a structure supporting bayonet tabs 2572 and pushbutton 2576. Post 2570 comprises an internal cavity 2578, which also extends into pushbutton 256, and receives and contains spring 2574.

Bayonet tabs 2572 extend radially outward from post 2570 and are sized and located so as to extend through channels 2568 when secondary retention mechanism 2502 is inserted into and through head 2550. Bayonet tabs 257 are further configured to be insertable into notch 2534 of bayonet hook 2518 (shown in FIG. 89). Although mechanism 2552 is illustrated as having a pair of opposing tabs 2572, in other implementations, retention mechanism 2552 alternatively comprises a single tab 2572 or greater than two such tabs 2572, wherein post 2568 has corresponding channels 2568.

Spring 2574 (schematically shown) comprises a spring carried within cavity 2578 so as to be captured between mechanism 2552 and floor 2524 of head 2500. Spring 2574 resiliently biases pushbutton 2576 and bayonet tabs 2572 in an upward direction towards floor 2564 of head 2550. Spring 2574 resiliently biases pushbutton 2576 through opening 2566. In the example illustrated, spring 2574 comprises a compression spring. In other implementations, spring 2574 may comprise other types of springs, such as a leaf spring, tension spring and the like, wherein the spring is mounted to resiliently bias pushbutton 256 towards a raised state through opening 2566. Pushbutton 2576 extends from post 2570 and is configured to project through opening 2566 of head 2550 (shown in FIG. 89).

Figure 91:
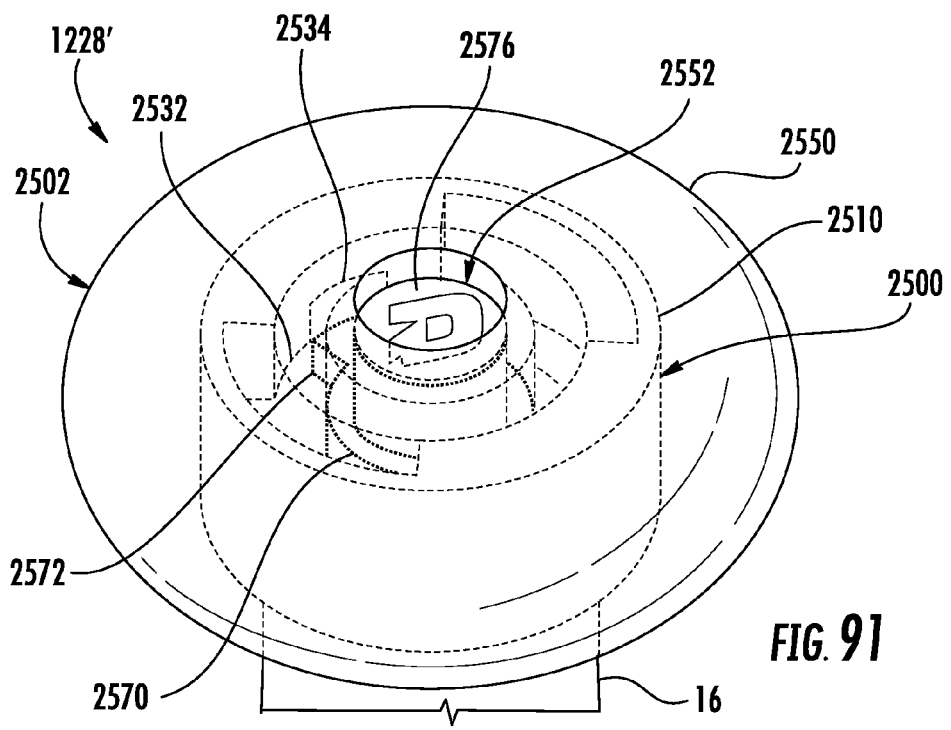
FIG. 91 is a top perspective view of the knob of FIG. 89 mounted upon the handle of the bat of FIG. 37 with a pushbutton of the secondary retention mechanism of the knob being depressed and a locking tab rotated into alignment with an overlying notch of a bayonet hook of the base.
Figure 92:
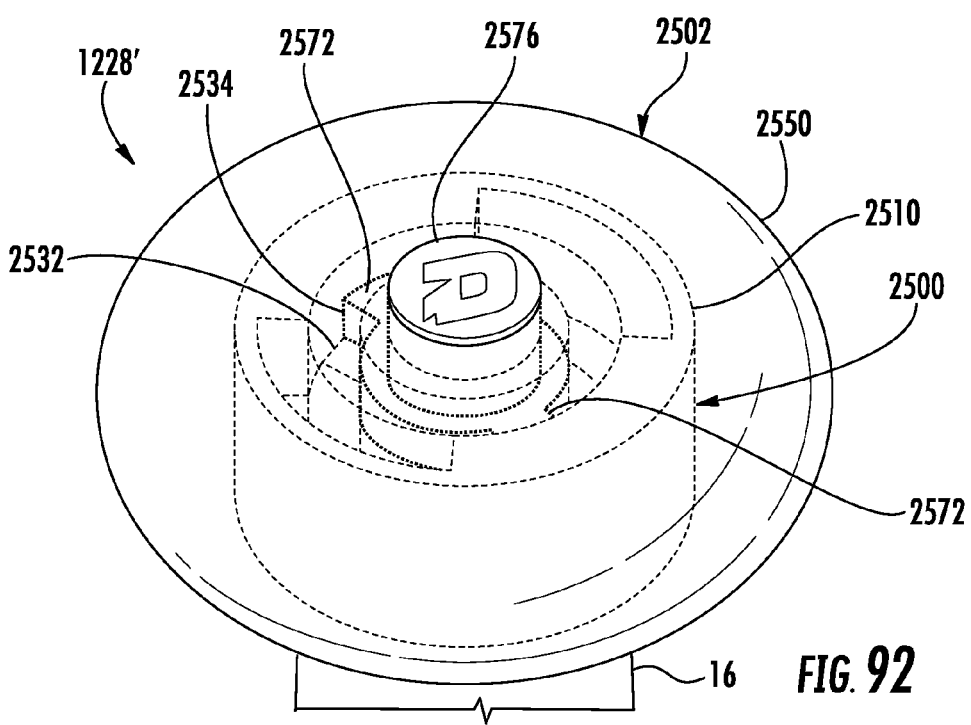
FIG. 92 is a top perspective view of the knob and base of FIG. 92 with the pushbutton being released to allow the locking tab to be received within the notch of the bayonet hook of the base.

FIGS. 91 and 92 illustrate operation of removable knob system 1228'. Initially, cover had 2550 is positioned over base 2500 such that bayonet hooks 2518 are inserted into gaps 2530 between bayonet hooks 2518. Thereafter, pushbutton 2576 is depressed against the bias of spring 2574 so as to lower tabs 2572 within passages 2568 into alignment with hooks 2560. As shown by FIG. 91, while pushbutton 2576 remains depressed, knob 2550 is rotated relative to base 2500 so as to slide hooks 2572 within slots 2532 beneath hooks 2518 until tabs 2572 are in alignment with or are beneath notches 2534.

FIG. 92 illustrates the release of pushbutton 2376, allowing spring 2574 to resiliently return pushbutton 2376 to an elevated state and to move tabs 2572 into notches 2534. While tabs 2572 are received within notches 2534, head 2550 and knob 2502 cannot rotate relative to base 2500. As a result, secondary retention mechanism 2552 inhibits accidental rotation of head 2550 and accidental disconnection of knob 2502.

To disconnect knob 2502 for inspection or replacement, the process is reversed. Pushbutton 2576 is once again depressed against the bias of spring 2574 to once again move tabs 2572 through passages 2568 and out of notches 2534 into alignment with hooks 2560 (the top surfaces of hooks 2560 and the top surfaces of tabs 2572 are coplanar similar to the state of hooks 2334 and tabs 2352 in FIG. 85), allowing head 2550 and knob 2502 to be rotated relative to base 2500. Thereafter, during continued depressment of pushbutton 2576, head 2550 is rotated relative to base 2500 to remove hooks 2560 from slots 2532 of bayonet hooks 2518, allowing head 2550 and knob 2502 to be axially separated from base 2500 and the end of handle 16.

FIG. 93 illustrates a bat customization carrier and customization kit or system 2600. System 2600 comprises carrier 2604, partially assembled that sections 2608A, 2608B (collectively referred to as sections 2608), sections 2610A, 2610B (collectively referred to as sections 2610), replaceable knobs 1802A, 1802B, 1802C, 1804A and replaceable end caps 2104A, 2104B, 2104C and 2104E. In the implementation illustrated, carrier 2604 is formed as a backpack. In other implementations, carrier 2604 can be formed as a carrying case, a sports equipment bag, a handbag, a pouch, a purse, a sac, a duffel, a satchel, a case or other carryall containing and organizing sections 2608, sections 2610, knobs 1802, 1804 and end caps 2104. In the example illustrated, carrier 2604 comprises a backpack comprising main compartment 2610, straps 2612, cover 2614, quick access sleeved compartments 2616, 2618, external knob compartments 2622 and external end cap compartments 2624.

Main compartment 2610 comprises a main internal volume of carrier 2604. Main compartment 2610 is defined by rear panel 2630, front panel 2632, floor 2634 and side panels 2636, 2638 which define the main volume which is accessed through a mouth 2639. Main compartment 2610 provides a volume containing sections 2608A and 2610A. In the example illustrated, interior surfaces of rear panel 2630 within the volume formed by main compartment 2610 include one or more elastic loops or elastic straps 2640 through which sections 2608A and 2610A are inserted and are retained along or against the interior surface of rear panel 2630. In other implementations, such straps 2640 may extend from other interior surfaces within main compartment 2610. In yet other implementations, main compartment 2610 may include elongated sleeves, similar to sleeves 2616, 2618, sewn to one of the internal surfaces of main compartment 2610 within the interior of main compartment 2610 for removably receiving bat sections. The main compartment 2610 can also be configured to include one or more region or sub-compartment for retaining an electronic device, such as, for example, a tablet, laptop computer, or smart phone. In some implementations, straps 2640 can be omitted.

Straps 2612 extend from rear panel 2630 and are configured to extend over a person shoulder such that carrier 2600 may be worn as a backpack. In one implementation, in lieu of comprising two of such straps 2612 at opposite sides of rear panel 2630, carrier 2604 alternate comprise a single strap 2612. In another implementation, the backpack can be shaped in the form of a vest or a jacket. In still other implementations, straps 2612 are omitted.

Cover 2614 comprises a panel to extend over and cover or close the upper mouth 2639 of main compartment 2610. In the example illustrated, cover 2614 comprises a flap extending from rear panel 2630 and having a quick disconnect buckle 2644 for securing cover 2614 to front panel 2632 across the mouth 2639. In other implementations, cover 2614 may extend from other panels, may other configurations and/or maybe secured in a closed state using other mechanism such as latches, buttons, zippers, hook and loop fasteners (VELCRO) and the like.

Quick access sleeves 2616, 2618 comprise sleeves or tubular compartments having bottoms or floors and extending from side panels 2636 and 2638, respectively. Sleeves 2616, 2618 have a length and an opening size to receive sections 2608B and 2610B, respectively. Claims 2616, 2618 have open mouths 2650 which provide quick and easy axis to preassembled sections 2608B and 2610B, allowing a person to quickly withdraw such sections and assemble that 1210 (shown in FIG. 37).

Bat sections 2608 and 2610 comprise preassembled components of different bats 1210A (formed by sections 2608A and 2610A) and 1210B (formed by sections 2608B and 2610B). Each of sections 2608 comprises handle 16, removable knobs system 1228, 1228', and a connector 1244, and a paper 1246 and spacer 1248, all connected as a single interconnected unit or assembly. Each of sections 1210 comprise barrel 18, removable end cap system 1230, 1230', taper 1240 and taper connector 1242 (shown in FIGS. 38, 40, 42 and 44), all connected as a single interconnected unit or assembly. As a result, to assemble a complete bat, such as bat 1210A or 1210B, a person merely needs to insert and a connector 1244 through taper 1240 and interconnection with paper connector 1242.

External knob compartments 2622 and external end cap compartments 2624 comprise individual compartments, pockets or pouches formed and carried along an external surface of front panel 2632 of main compartment 2610. Each of knob compartments 2622 is sized and shaped to contain a single individual replaceable knob, such as knobs 1802 and 1804. Each of end cap compartments 2624 is sized and shaped to contain a single individual replaceable end cap, such as end caps 2104. In one implementation, each of such compartments 2622, 2644 comprises a transparent or translucent window or is entirely transparent or translucent, facilitating viewing of the knobs or end caps within such compartments. In yet another implementation, each of such compartments includes an external label identifying the knob or end cap that is contained within the compartment or indicating the size, weight or other characteristics of the contained knob or end cap. The label or surfaces of the backpack can also include graphical and/or alphanumeric indicia similar to the indicia 2139. As a result, adverse may quickly and easily identify a knob or end cap for replacing existing knob or end cap of bat 1210A or 1210B.

In the example illustrated, each of compartments 2622, 2624 includes an individual closing mechanism 2650, such as the illustrated zippers. In other implementations, Accessory or auxiliary compartments 2622, 2624 comprise other closing mechanism such as hook and loop fasteners, buttons, latches, buckles and the like. In some implementations, in lieu of each individual compartment 2622 having a dedicated closing mechanism, compartments 2622 share a single closing mechanism, such as a single flap extending across all of the openings of compartments 2622. Likewise, in other implementations, in lieu of each individual compartment 2624 having a dedicated cover and closing mechanism, compartments 2624 share a single cover and a single closing mechanism, such as a single flap extending across all of the openings of compartments 2622 and closed by a single closing mechanism such as a single zipper, hook and loop fastener, latch, buckle or the like. FIG. 94 illustrates one backpack design. It is contemplated that other designs of the backpack can also be employed. One or more of the compartments described above can be positioned within the main compartment 2610 as separate regions or sub-compartments.

The bat customization system 2600 allows for a user to transport at least one customizable bat without having a portion of the bat (the handle or the barrel) projecting from the body of the bat as present in existing conventional bat backpacks. The bat customization system 2600 is configured to work with conventional ball bats and with the implementations of customizable bats and bat components discussed above. For example, bat 1210 with customization system 1220 enables the handle to be readily separated from the barrel for easy storage within the carrier or backpack 2604, without the handle or barrel projecting from the carrier. The system 2600 facilitates the performance of bat customization where needed, such as, at the ball field, at the practice facility, at a tournament, training facility or any designated customization location.

While the example embodiments of the invention have been illustrated and described, it will be appreciated that various changes can be made therein without departing from the spirit and scope of the invention. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. An apparatus for engagement with a tubular barrel of a bat having an internal bore, the apparatus comprising:
   a cup fixedly secured to a distal end of the barrel of the bat, the cup having a sidewall and a planar floor, the cup sized such that the sidewall engages an inner surface of the tubular barrel, the entire floor being transparent, translucent, semi-transparent or semi-translucent to facilitate viewing of the internal bore through the floor, the cup defining a cavity and including a first connector portion; and
   at least one cover having a second connector portion cooperating with the first connector portion to releasably secure the cover to the cup over the cavity, the cover, when releasably secured to the cup, occluding view of the floor.

2. The apparatus of claim 1, wherein the first connector portion and the second connector portion comprise a first bayonet connector and a second bayonet connector, respectively.

3. The apparatus of claim 2 further comprising a secondary locking mechanism to retain the cover in a locked position over the cavity.

4. The apparatus of claim 3, wherein the secondary locking mechanism is a fastener releasably coupling the cover to the cup.

5. The apparatus of claim 1 further comprising a plug extending from the cover and insertable into the cavity while the cover is releasably secured to the cup over the cavity.

6. The apparatus of claim 1, further comprising:
   a first plug releasably connected to the cover and extending from the cover so as to be received by the cavity while the cover is releasably secured to the cup over the cavity, the first plug having a first weight; and
a second plug interchangeable with the first plug, the second plug being releasably connectable to the cover so as to extend from the cover into the cavity while the cover is releasably secured to the cup over the cavity, the second plug having a second weight different than the first weight.

7. The apparatus of claim 1, wherein the at least one cover includes at least a first cover and a second cover, and wherein the apparatus further comprises:
a first plug coupled to the first cover and extending from the first cover so as to be received by the cavity while the first cover is releasably secured to the cup over the cavity, the first plug having a first weight; and
a second plug coupled to the second cover, the second plug being releasably connectable to the second cover so as to extend from the second cover into the cavity while the second cover is releasably secured to the cup over the cavity, the second plug having a second weight different than the first weight.

8. The apparatus of claim 1 further comprising:
a second cover interchangeable with the first cover, the second cover having a third connector portion cooperating with the first connector portion to releasably secure the second cover to the cup over the cavity, the first cover having a first weight and the second cover having a second weight different than the first weight.

9. The apparatus of claim 1, wherein the at least one cover includes at least a first cover and a second cover, further comprising a first plug extending from the first cover and a second plug extending from the second cover, wherein the first plug has a first weight and the second plug has a second weight different from the first weight, and wherein second cover is interchangeable with the first cover, and wherein the second cover has a third connector portion to cooperate with the first connector portion to releasably secure the second cover to the cup over the cavity.

10. The apparatus of claim 9, wherein the first plug is formed from a first material and wherein the second plug is formed from a second material different than the first material.

11. The apparatus of claim 9, wherein the first plug has a first length and wherein the second plug has a second length different than the first length.

12. The apparatus of claim 1, wherein the cover extends about an axis to coincide with a centerline of the barrel and wherein the apparatus further comprises:
an assembly tool comprising a body for releasably locking to the cover asymmetric the axis.

13. The apparatus of claim 12, wherein the cover comprises an asymmetric bore and wherein the body comprises a pin to project into the asymmetric bore.

14. The apparatus of claim 1, wherein the cavity defines a depth measured along an axis coinciding with a centerline of the barrel that is at least 1.0 inch.

15. The apparatus of claim 7, wherein the at least first and second covers includes at least the first cover, the second cover and a third cover, and wherein the apparatus further comprises:
a third plug coupled to the third cover and extending from the third cover so as to be received by the cavity while the third cover is releasably secured to the cup over the cavity, the third plug having a third weight, and Wherein the third weight is different from the first and second weights.

16. An apparatus for engagement with a barrel of a bat, the apparatus comprising:
a cup secured for securement to a distal end of the barrel of the bat, the cup defining a cavity and including a first connector portion;
at least one cover having a second connector portion cooperating with the first connector portion to releasably secure the cover to the cup over the cavity, the first connector portion and the second connector portion comprising a first bayonet connector and a second bayonet connector, respectively; and
a secondary locking mechanism to retain the cover in a locked position over the cavity, the secondary locking mechanism comprising:
a locking member; and
a resiliently biased push button operably coupled to the locking member and depressible to release the locking member.

17. An apparatus for engagement with a barrel of a bat, the apparatus comprising:
a cup secured for securement to a distal end of the barrel of the bat, the cup defining a cavity and including a first connector portion; and
at least one cover having a second connector portion cooperating with the first connector portion to releasably secure the cover to the cup over the cavity; and
a wireless transmitter received within the cup and covered by the cover.

18. The apparatus of claim 17 further comprising at least one sensor received within the cup and in communication with the wireless transmitter.

19. An apparatus for engagement with a barrel of a bat, the apparatus comprising:
a cup secured for securement to a distal end of the barrel of the bat, the cup defining a cavity and including a first connector portion;
at least one cover having a second connector portion cooperating with the first connector portion to releasably secure the cover to the cup over the cavity;
a plug extending from the cover and insertable into the cavity, the cover being releasably securable to the cup over the cavity; and
a wireless transmitter and at least one sensor coupled to the cover.

* * * * *